(12) United States Patent
Malikopoulos

(10) Patent No.: US 8,612,107 B2
(45) Date of Patent: Dec. 17, 2013

(54) METHOD, CONTROL APPARATUS AND POWERTRAIN SYSTEM CONTROLLER FOR REAL-TIME, SELF-LEARNING CONTROL BASED ON INDIVIDUAL OPERATING STYLE

(75) Inventor: Andreas A. Malikopoulos, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 909 days.

(21) Appl. No.: 12/455,753

(22) Filed: Jun. 5, 2009

(65) Prior Publication Data
US 2009/0306866 A1 Dec. 10, 2009

Related U.S. Application Data

(60) Provisional application No. 61/060,248, filed on Jun. 10, 2008.

(51) Int. Cl.
*G06F 7/00* (2006.01)
*G06F 17/00* (2006.01)

(52) U.S. Cl.
USPC ............... 701/59; 701/54; 701/58; 701/101; 701/102; 701/430; 701/540

(58) Field of Classification Search
USPC ........ 701/54, 58, 59, 101, 102, 430, 461, 540
See application file for complete search history.

(56) References Cited

U.S. PATENT DOCUMENTS

| | | | | |
|---|---|---|---|---|
| 5,050,714 A | * | 9/1991 | Kurihara et al. | 477/176 |
| 5,532,929 A | * | 7/1996 | Hattori et al. | 701/110 |
| 5,628,290 A | * | 5/1997 | Iida et al. | 123/305 |
| 5,711,712 A | * | 1/1998 | Graf | 477/121 |
| 5,895,435 A | * | 4/1999 | Ohta et al. | 701/59 |
| 6,009,851 A | * | 1/2000 | Iida et al. | 123/339.12 |
| 6,330,877 B1 | * | 12/2001 | Nordin | 123/480 |
| 6,539,299 B2 | * | 3/2003 | Chatfield et al. | 701/104 |

(Continued)

FOREIGN PATENT DOCUMENTS

EP 1780090 A1 * 5/2007 ............. B60K 41/28

OTHER PUBLICATIONS

Atkinson et al. Dynamic Model-Based Calibration Optimization: An Introduction and Application to Diesel Engines, 2005 SAE World Congress, Detroit, Michigan; Apr. 11-14, 2005.*

(Continued)

*Primary Examiner* — Khoi Tran
*Assistant Examiner* — Jorge Peche
(74) *Attorney, Agent, or Firm* — Brooks Kushman P.C.

(57) ABSTRACT

Method, control apparatus and powertrain system controller are provided for real-time, self-learning control based on individual operating style. The method calibrates powertrain system performance in a passenger vehicle in real-time based on individual operating style. The method includes powering the vehicle with the system and generating a sequence of system operating point transitions based on an operating style of an operator of the vehicle during the step of powering. The method further includes learning a set of optimum values of controllable system variables in real-time during the steps of powering and generating based on the sequence of system operating point transitions and predetermined performance criteria for the system. The method still further includes generating control signals based on the set of optimum values to control operation of the system.

7 Claims, 23 Drawing Sheets

(56) References Cited

U.S. PATENT DOCUMENTS

| | | | | |
|---|---|---|---|---|
| 6,671,608 | B2* | 12/2003 | McKenzie et al. | 701/93 |
| 6,862,514 | B2* | 3/2005 | Ehara | 701/102 |
| 6,895,930 | B2* | 5/2005 | Hurley et al. | 123/399 |
| 6,985,808 | B1* | 1/2006 | Kennedy | 701/108 |
| 7,349,794 | B2* | 3/2008 | Malone et al. | 701/112 |
| 7,695,404 | B2* | 4/2010 | Saitoh et al. | 477/92 |
| 7,696,719 | B2* | 4/2010 | Yamaguchi | 320/109 |
| 2002/0111735 | A1* | 8/2002 | McKenzie et al. | 701/114 |
| 2007/0093954 | A1* | 4/2007 | Malone et al. | 701/112 |
| 2007/0213921 | A1* | 9/2007 | Yamaguchi | 701/115 |
| 2007/0270279 | A1* | 11/2007 | Saitoh et al. | 477/110 |
| 2008/0177458 | A1* | 7/2008 | Malone et al. | 701/113 |
| 2009/0069971 | A1* | 3/2009 | Asahara et al. | 701/29 |

OTHER PUBLICATIONS

Munos, RMI, Performance Bounds in Lp-Norm for Approximate Value Iteration, Siam J. Control Optim. vol. 46, No. 2, 2007, pp. 541-561.

Milito, Rodolfo, Adaptive Markov and Semi-Markov Decision Processes, Proceedings of the 27th Conference on Decision and Control, Austin Texas, Dec. 1988, WP7-4:00, pp. 646-651.

Singh, Satinder, et al., Convergence Results for Single-Step On-Policy Reinforcement-Learning Algorithms, pp. 1-17.

Satia, Jay, K., et al., Markovian Decision Processes With Uncertain Transition Probabilities, Operations Research, vol. 21, No. 3, May-Jun. 1973, pp. 728-740.

Kushner, Harold J., et al., Decomposition of Systems Governed by Markov Chains, IEEE Transactions on Automatic Control, vol. AC-19, No. 5, Oct. 1974, pp. 501-507.

Winsel, Thomas, et al., HiL-Based ECU-Calibration of SI Engine with Advanced Camshaft Variability, SAE Technical Paper Series, SAE #2006-01-0613, Detroit, Michigan, Apr. 3-6, 2006, pp. 1-11.

Sellnau, M., et al., 2-Step Variable Valve Actuation: System Optimization and Integration on an SI Engine, SAE Technical Paper Series, SAE #2006-01-0040, Detroit, Michigan, Apr. 3-6, 2006, pp. 1-20.

Cowart, Jim, A Comparison of Transient Air-Fuel Measurement Techniques, SAE Technical Paper Series, SAE #2002-01-2753, Powertrain & Fluid Systems Conference & Exhibition, San Diego, CA, Oct. 21-24, 2002, pp. 1-6.

Birch, Brian J., et al., Electronic Fuel System Development for Air-Cooled Motorcycles, SAE International #2004-32/0059/20044346, pp. 1-9.

Van De Water, Henk, et al., The Certainty Equivalence Property in Stochastic Control Theory, IEEE, 1981, pp. 1080-1087.

Hsu, Kai, et al., Decentralized Control of Finite State Markov Processes, IEEE Transactions on Automatic Control, vol. AC-27, No. 2, Apr. 1982, pp. 426-431.

Schöggl, P., et al., Automated EMS Calibration Using Objective Driveability Assessment and Computer Aided Optimization Methods, SAE 2002 World Congress, Detroit, Michigan, Mar. 4-7, 2002, SAE Technical Paper Series #2002-01-0849, pp. 1-9.

Kumar, P.R., et al., Optimal Adaptive Controllers for Unknown Systems, IEEE, 1981, #FP1-3:00, pp. 1247-1250.

González-Trejo, J.I., et al., Minimax Control of Discrete-Time Stochastic Systems, SIAM J. Control Optim. vol. 41., No. 5, pp. 1626-1659.

Bagnell, J. Andrew, et al., Autonomous Helicopter Control Using Reinforcement Learning Policy Search Methods, 1-6.

Borkar, V., et al., Adaptive Control of Markov Chains, I: Finite Parameter Set, IEEE Transactions on Automatic Control, vol. AC-24, No. 6, Dec. 1979, pp. 953-957.

Xianglong, Yang, et al., Solving Sequential Decision-Making Problems Under Virtual Reality Simulation System, Proceedings of the 2001 Winter Simulation Conference, pp. 905-912.

Koenig, Sven, Minimax Real-Time Heuristic Search, Artificial Intelligence 129, 2001, pp. 165-197.

Shaked U., et al., Minimum Variance Control of Discrete Time Multivariable Armax Systems, SIAM J. Control and Optimization, vol. 24, 3, May 1986, pp. 396-411.

Sutton, Richard S., Implementation Details of the TD ($\lambda$) Procedure for the Case of Vector Predictions and Back Propagation, GTE Laboratories Technical Note TN87-509.1, May 1987, pp. 1-4.

Stoenescu, Tudor M., et al., Decentralized Resource Allocation Mechanisms in Networks: Realization and Implementation, Chapter 13, pp. 225-263.

Barto, Andrew G., et al., Learning to act Using Real-Time Dynamic Programming, Artificial Intelligence 72, 1995, pp. 81-138.

Korf, Richard E., Real-Time Heuristic Search, Artificial Intelligence, pp. 189-211.

Watkins, Christopher J.C.H., et al., Technical Note, Q-Learning, Machine Learning, vol. 8, 1992, pp. 279-292.

Kumar, P.R., et al., Existence of Value and Randomized Strategies in Zero-Sum Discrete-Time Stochastic Dynamic Games, SIAM J. Control and Optimization, vol. 19, No. 5, Sep. 1981, pp. 617-634.

Control System Design Steps, Chapter 1, Introduction, pp. 1-25.

Spaan, Matthijs, et al., Sequential Decision Making Under Uncertainty, Institute for Systems and Robotics, Lisbon, Portugal, Jan. 4, 2007, pp. 1-20.

Vial, J.-Ph., Sequential Decision Making Under Uncertainty: A Mathematical Programming Approach, Mar. 1-4, 2004, pp. 1-51.

Jalali, Ahmad, Adaptive Control of Markov Chains With Local Updates, Systems & Control Letter 14, 1990, pp. 209-218.

Commault, Christian, Further Comments on Aggregation Matrix for the Reduced-Order Continued Fraction Expansion Model of Chen Shieh, IEE Transaction on Automatic Control, vol. AC-24, No. 2, Apr. 1979, pp. 1.

Roepke, Karsten, et al., Efficient Layout and Calibration of Variable Valve Trains, SAE Transactions-Journal of Engines, vol. 110, 2001, SAE 2001-01-0668, pp. 1-13.

Stuhler, Harald, et al., Automated Model-Based GDI Engine Calibration Adaptive Online DoE Approach, SAE 2002 World Congress, Detroit, Michigan, SAE 2002-01-0708, Mar. 3-7, 2002, pp. 1-10.

Brooks, T., et al., Improving Base Engine Calibrations for Diesel Vehicles Through the Use of DoE and Optimization Techniques, Powertrain and Fluid Systems Conference and Exhibition, San Antonio, Texas, USA, SAE 2005-01-3833, Sep. 24-27, 2005, pp. 1-10.

Knafl, Alexander, et al., Dual-Use Engine Calibration: Leveraging Modern Technologies to Improve Performance-Emissions Tradeoff, SAE Word Congress, Detroit, Michigan, SAE 2005-01-1549, Apr. 11-14, 2005, pp. 1-12.

Steiber, Joe, et al., Development of an Engine Test Cell for Rapid Evaluation of Advanced Powertrain Technologies Using Model-Controlled Dynamometers, SAE Transactions—Journal of Passenger Cars—Electronics & Electrical Systems, vol. 115, SAE 2006-01-1409, Apr. 3-6, 2006, pp. 1-8.

Schuette, Herbert, et al., Hardware-in-the-Loop Testing of Engine Control Units—A Technical Survey, SAE 2007 World Congress and Exhibition, Detroit, Michigan, SAE 2007-01-0500, Apr. 16-19, 2007, pp. 1-24.

Philipp, O, et al., Engine ECU Function Development Using Software-in-the-Loop Methodology, SAE 2005 World Congress and Exhibition, Detroit, Michigan, SAE 2005-01-0049, 2005, pp. 1-8.

Caraceni, A., et al., Benefits of Using a Real-Time Engine Model During Engine ECU Development, SAE 2003 World Congress and Exhibition, SAE 2003-01-1049, Mar. 3-6, 2003, pp. 1-7.

Guerrier, Mark, et al., The Development of Model-Based Methodologies for Gasoline IC Engine Calibration, SAE Transactions—Journal of Engines, vol. 113, SAE 2004-01-1466, Mar. 8-11, 2004, pp. 1-24.

Rask, Eric, et al., Simulation-Based Engine Calibration: Tools, Techniques, and Applications, SAE Transactions—Journal of Engines, vol. 113, SAE 2004-01-1264, Mar. 8-11, 2004, pp. 1-14.

Wu, Hansheng, Decentralized Iterative Learning Control for a Class of Large Scale Interconnected Dynamical Systems, Journal of Mathematical Analysis and Applications, vol. 327, 2007, pp. 233-245.

Jankovic, Mrdjan, et al., Fuel Economy Optimization in Automotive Engines, Proceedings of the 2006 American Control Conference, Minneapolis, MN, USA, 2006, pp. 1191-1196.

Hagena, Jonathan R., et al., Transient Diesel Emissions: Analysis of Engine Operation During a Tip-In, SAE 2006 World Congress, Detroit, Michigan, Apr. 3-6, 2006, SAE 2006-01-1151, pp. 1-13.

(56) References Cited

OTHER PUBLICATIONS

Atkinson, Chris, et al., Dynamic Model-Based Calibration Optimization: An Introduction and Application to Diesel Engines, SAE World Congress, Detroit, Michigan, SAE 2005-01-0026, Apr. 11-14, 2005, pp. 1-.12.

Rakopoulos, C.D., et al., The Effect of Various Dynamic, Thermodynamic and Design Parameters on the Performance of a Turbocharged Diesel Engine Operating under Transient Load Conditions, SAE 2004 World Congress and Exhibition, Detroit, Michigan, SAE 2004-01-0926, Apr. 8-11, 2004, pp. 1-17.

Wijetunge, R.S., et al., Dynamic Behavior of a High-Speed, Direct-Injection Diesel Engine, SAE 1999 International Congress and Exposition, Detroit, Michigan, SAE 1999-01-0829, Mar. 1-4, 1999, pp. 1-12.

Clark, Nigel N., et al., Diesel and CNG Transit Bus Emissions Characterization by Two Chassis Dynamometer Laboratories: Results and Issues, SAE Transactions—Journal of Fuels and Lubricants, vol. 108, SAE 1999-01-1469, May 3-6, 1999, pp. 1-14.

Samulski, Michael J., et al., Effects of Steady-State and Transient Operation on Exhaust Emissions from Nonroad and Highway Diesel Engines, SAE Transactions—Journal of Engines, vol. 107, SAE 982044, International Off-Highway and Powerplant Congress and Exposition, Milwaukee, Wisconsin, Sep. 14-16, 1998, pp. 1-15.

Green, Robert M., Measuring the Cylinder-to-Cylinder EGR Distribution in the Intake of a Diesel Engine During Transient Operation, SAE Transactions-Journal of Engines, vol. 109, 2000, SAE 2000-01-2866, International Fall Fuels and Lubricants Meeting and Exposition, Baltimore, Maryland, Oct. 16-19, 2000, pp. 1-12.

Sato, Mitsuo, et al., Learning Control of Finite Markov Chains with Unknown Transition Probabilities, IEEE Transactions on Automatic Control, vol. AC-27, 1982, pp. 502-505.

Sato, Mitsuo, et al., An Asymptotically Optimal Learning Controller for Finite Markov Chains with Unknown Transition Probabilities, IEEE Transactions on Automatic Control, vol. AC-30, 1985, pp. 1147-1149.

Sato, Mitsuo, et al., Learning Control of Finite Markov Chains with an Explicit Trade-off Between Estimation and Control, IEEE Transactions on Systems, Man and Cybernetics, vol. 18, 1988, pp. 677-684.

Kumar, P. R., A Survey of Some Results in Stochastic Adaptive Control, SIAM Journal on Control and Optimization, vol. 23, 1985, pp. 329-380.

Agrawal, Rajeev, et al., Asymptotically Efficient Adaptive Allocation Rules for the Multiarmed Bandit Problem With Switching Cost, IEEE Transactions on Automatic Control, vol. 33, 1988, pp. 899-906.

Agrawal, Rajeev, et al., Asymptotically Efficient Adaptive Allocation Schemes for Controlled Markov Chains: Finite Parameter Space, IEEE Transactions on Automatic Control, vol. 34, 1989, pp. 1249-1259.

Agrawal, Rajeev, et al., Asymptotically Efficient Adaptive Allocation Schemes for Controlled I.I.D. Processes: Finite Parameter Space, IEEE Transactions on Automatic Control, vol. 34, 1989, pp. 258-267.

Graves, Todd, L., et al., Asymptotically Efficient Adaptive Choice of Control Laws in Controlled Markov Chains, SIAM Journal on Control and Optimization, vol. 35, 1997, pp. 715-743.

Agrawal, Rajeev, et al., Certainty Equivalence Control with Forcing: Revisited, Systems & Control Letters 13, Tampa, FL, 1989, pp. 405-412.

Malikopoulos, Andreas A., et al., A State-Space Representation Model and Learning Algorithm for Real-Time Decision-Making Under Uncertainty, Proceedings of the 2007 ASME International Mechanical Engineering Congress and Exposition, Seattle, Washington, Nov. 11-15, 2007, pp. 1-10.

Malikopoulos, Andreas A., et al., A Learning Algorithm for Optimal Internal Combustion Engine Calibration in Real Time, Proceedings of the ASME 2007 International Design Engineering Technical Conferences Computers and Information in Engineering Conference, Las Vegas, Nevada, Sep. 4-7, 2007, pp. 1-10.

Malikopoulos, Andreas A., et al., Real-Time, Self-Learning Optimization of Diesel Engine Calibration, Proceedings of the 2007 Fall Technical Conference of the ASME Internal Combustion Engine Division, Charleston, South Carolina, Oct. 14-17, 2007. [[/ 1-9.

Panait, Liviu, et al., Cooperative Multi-Agent Learning: The State of the Art, Autonomous Agents and Multi-Agent Systems, vol. 11, 2005, pp. 387-434, 2005.

Wheeler, Jr., Richard M., et al., Decentralized Learning in Finite Markov Chains, IEEE Transactions on Automatic Control, vol. 31(6), Jun. 1986, pp. 519-526.

Moore, Andrew W., et al., Prioritized Sweeping: Reinforcement Learning with Less Data and Less Time, Machine Learning, vol. 13, 1993, pp. 103-130.

Scherrer, Bruno, et al., Cooperative Co-Learning: a Model-Based Approach for Solving Multi-Agent Reinforcement Problems, Proceedings of the 14th IEEE International Conference on Tools with Artificial Intelligence, Washington, D.C., 2002, pp. 463-468.

Yagan, Daniel, et al., Coordinated Reinforcement Learning for Decentralized Optimal Control, Proceedings of the 2007 First IEEE International Symposium on Approximate Dynamic Programming and Reinforcement Learning (IEEE Cat. No. 07EX1572), Honolulu, HI, 2007, pp. 296-.

TESIS, <http://www.tesis.de/en/>, pp. 1-2.

Kaelbling, Leslie P., Planning and Acting in Partially Observable Stochastic Domains,Providence, RI, Dec. 17, 1997, pp. 1-42.

Astrom, K. J., Theory and Applications of Adaptive Control—A Survey, Automatica, vol. 19, No. 5, 1983, pp. 471-486.

Fu, Wai-Tat, et al., From Recurrent Choice to Skill Learning: A Reinforcement-Learning Model, Journal of Experimental Psychology: General, vol. 135, No. 2, 2006, pp. 184-206.

Wu, Hansheng, et al., Decentralized Iterative Learning Control Schemes for Large Scale Systems With Unknown Interconnections, IEEE, 2003, pp. 1290-1295.

White, D.J., Dynamic Programming, Markov Chains, and the Method of Successive Approximations, Journal of Mathematical Analysis and Applications, vol. 6, 1963, pp. 373-376.

Wheeler, Jr., Richard M., et al., Learning Models for Decentralized Decision Making, Automatica, vol. 21, No. 4, 1985, pp. 479-484.

Blume, Andreas, et al., Decentralized Learning From Failure, Journal of Economic Theory, vol. 133, 2007, pp. 504-523.

Monahan, George, E., A Survey of Partially Observable markov Decision Processes: Theory, Models, and Algorithms, Management Science, vol. 28, No. 1, Jan. 1982, pp. 1-16.

Cassandra, Anthony, et al., Incremental Pruning: A Simple, Fast, Exact Method for Partially Observable Markov Decision Processes, pp. 1-8.

Butz, Torsten, et al., A Realistic Road Model for Real-Time Vehicle Dynamics Simultation, SAE Technical Paper Series, SAE #2004-01-1068, Mar. 8-11, 2004, pp. 1-7.

Steiber, Joe, et al., Vehicle HIL, The Near Term Solution for Optimizing Engine and Transmission Development, SAE Technical Paper Series, SAE #2005-01-1050, Apr. 11-14, 2005, pp. 1-9.

Maloney, Peter J., An Event-Based Transient Fuel Compensator With Physically Based Parameters, Society of Automotive Engineers, Inc., No. 1999-01-0553, 1999, pp. 1-9.

Ishi, Shin, et al., A Reinforcement Learning Scheme for a Partially-Observable Multi-Agent Game, Machine Learning, vol. 54, 2005, pp. 31-54.

Batten, John, J., et al., Analytical Assessment of Simplified Transient Fuel Tests for Vehicle Transient Fuel Compensation, SAE International No. 2005-01-3894, pp. 1-12.

Malikopoulos, Andreas, A., et al., Optimal Engine Calibration for Individual Driving Styles, SAE International No. 2008-01-1367, pp. 1-10.

Duncan, T.E., et al., Some Results on Ergodic and Adaptive Control of Hidden Markov Models, Proceedings of the 41st IEEE, Conference on Decision and Control, Las Vegas, Nevada, Dec. 2002, pp. 1369-1374.

Weber, Richard, Optimization and Control, pp. i-66.

Yost, Kirk A., et al., The LP/POMDP Marriage: Optimization With Imperfect Information, Jun. 2000, pp. 607-619.

Cassandra, Anthony R., et al., Acting Optimally in Partially Observable Stochastic Domains, Providence, RI, pp. 1-6.

Amann, Manfred, et al., Evaluation of HCCI Engine Potentials in Comparison to Advanced Gasoline and Diesel Engines, Powertrain

(56) References Cited

OTHER PUBLICATIONS and Fluid Systems Conference and Exhibition, Toronto, Ontario, Canada, Sep. 16-19, 2006, SAE 2006-01-3249, pp. 1-12.

Ghauri, Ahmar, et al., Variation of Both Symmetric and Asymmetric Valve Events on a 4-Valve SI Engine and the Effects on Emissions and Fuel Economy, SAE 2000 World Congress, Detroit, Michigan, Mar. 6-9, 2000, SAE 2000-01-1222, pp. 1-17.

Regner, Gerhard, et al, Performance Analysis and Valve Event Optimization for SI Engines Using Fractal Combustion Model, Powertrain and Fluid Systems Conference and Exhibition, Toronto, Ontario, Canada, Sep. 16-19, 2006, SAE 2006-01-3238, pp. 1-20.

Ayeb, Mohamed, et al., eb, M., Theuerkauf, H. J., and Winsel, T., SI Engine Emissions Model Based on Dynamic Networks and D-Optimality, SAE World Congress, Detroit, Michigan, Apr. 11-14, 2005, SAE 2005-01-0019, pp. 1-10.

Brahma, Indranil, et al., Improvement of Neural Network Accuracy for Engine Simulations, Powertrain and Fluid Systems Conference and Exhibition, Pittsburgh, Pennsylvania, Sep. 27-30, 2003, SAE 2003-01-3227, pp. 1-7.

Lowe, David, et al., Validation of Neural Networks in Automotive Engine Calibration, Proceedings of the Fifth International Conference on Artificial Neural Networks, Cambridge, UK, 1997, pp. 221-226.

Meyer, Sven, et al., New Calibration Methods and Control Systems with Artificial Neural Networks, SAE 2002 World Congress, Detroit, Michigan, Mar. 4-7, 2002, SAE 2002-01-1147, pp. 1-9.

Burk, Reinhard, et al., A Contribution to Predictive Engine Calibration Based on Vehicle Drive Cycle Performance, SAE 2003 World Congress, Detroit, Michigan, USA, Mar. 3-6, 2003, SAE 2003-01-0225, pp. 1-7.

Jacquelin, Frederic, et al., Cam Phaser Actuation Rate Performance Impact on Fuel Consumption and NOx Emissions Over the FTP-75 Drive Cycle, SAE 2003 World Congress, Detroit, Michigan, USA, 2003, SAE 2003-01-0023, pp. 1-5.

Gosavi, Abhijit, Reinforcement Learning for Long-Run Average Cost, European Journal of Operational Research, vol. 155, Dec. 6, 200, pp. 1-44.

Sutton, Richard S., Learning to Predict by the Methods of Temporal Difference, Machine Learning, vol. 3, 1988, pp. 9-44.

Kaelbling, Leslie, P., et al., Reinforcement Learning: a Survey, Journal of Artificial Intelligence Research, vol. 4, 1997, pp. 237-285.

Mahadevan, Sridhar, Average Reward Reinforcement Learning: Foundations, Algorithms, and Empirical Results, Machine Learning, vol. 22, 1996, pp. 159-195.

Peng, Jing, et al., Efficient Learning and Planning Within the Dyna Framework, Proceedings of the IEEE International Conference on Neural Networks (Cat. No.93CH3274-8), San Francisco, CA, USA, 1993, pp. 168-174.

Borkar, Vivek., et al., Adaptive Control of Markov Chains. I. Finite Parameter Set, IEEE Transactions on Automatic Control, vol. AC-24, 1979, pp. 953-957.

Borkar, Vivek., et al., Identification and Adaptive Control of Markov Chains, SIAM Journal on Control and Optimization, vol. 20, 1982, pp. 470-489.

Kumar, P. R., Adaptive Control With a Compact Parameter Set, SIAM Journal on Control and Optimization, vol. 20, 1982, pp. 9-13.

Kumar, P.R., et al., A New Family of Optimal Adaptive Controllers for Markov Chains, IEEE Transactions on Automatic Control, vol. AC-27, No. 1, Feb. 1982, pp. 137-146.

Kumar, P. R., et al., Optimal Adaptive Controllers for Unknown Markov Chains, IEEE Transactions on Automatic Control, vol. AC-27, 1982, pp. 765-774.

Mandl, P., Estimation and Control in Markov Chains, Adv., Appl. Prob. vol. 6, 1974, pp. 40-60.

* cited by examiner

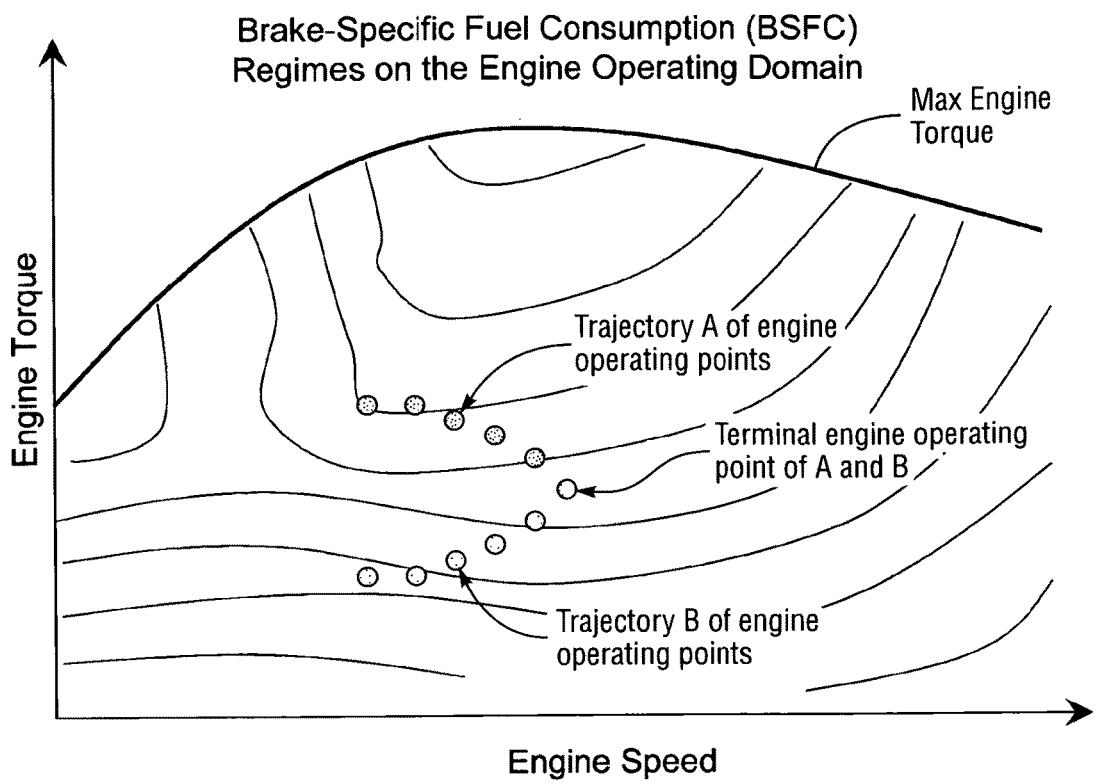
Fig. 1.1
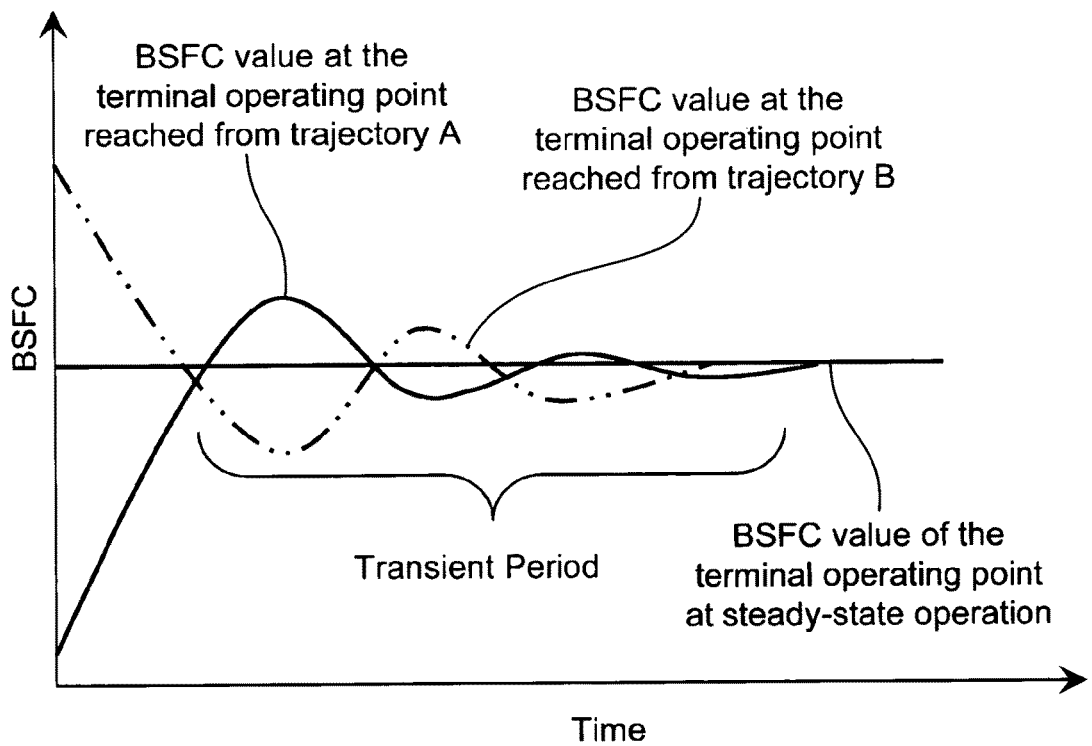
Fig. 1.2

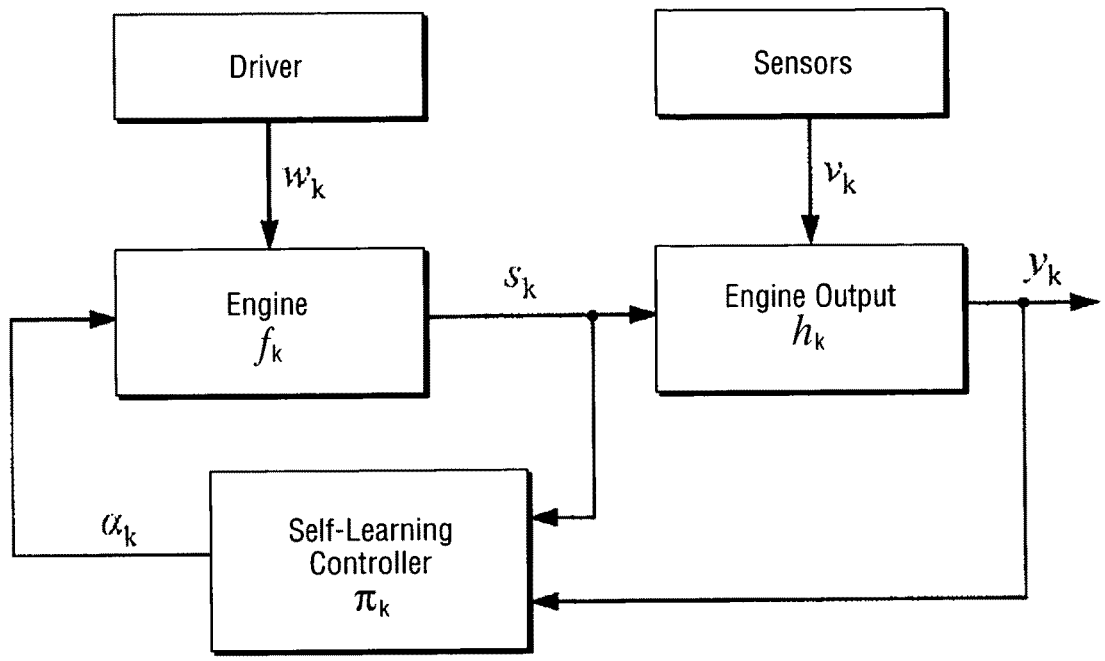
Fig. 2.1
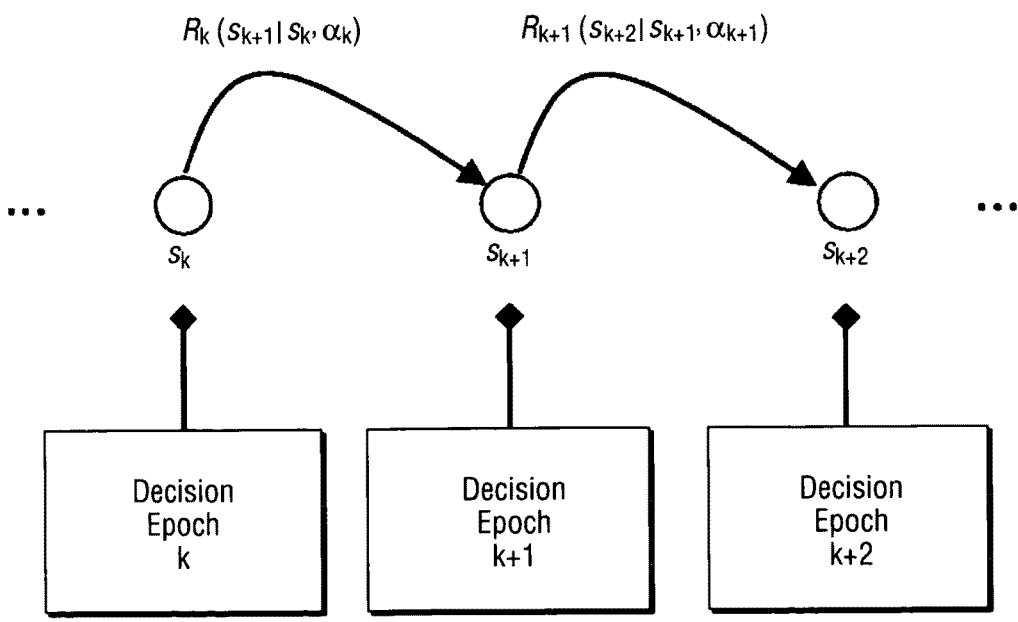
Fig. 2.2

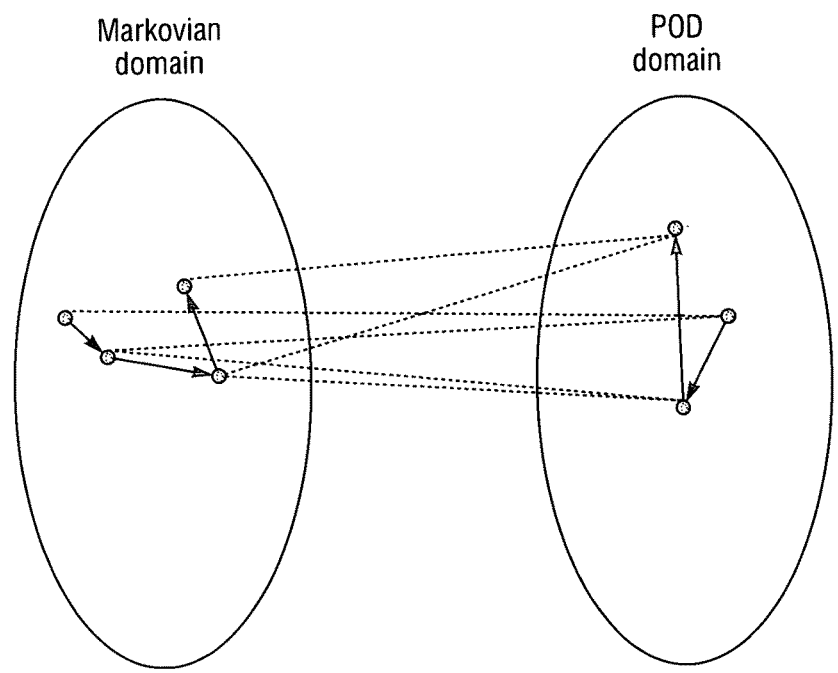
Fig. 3.1
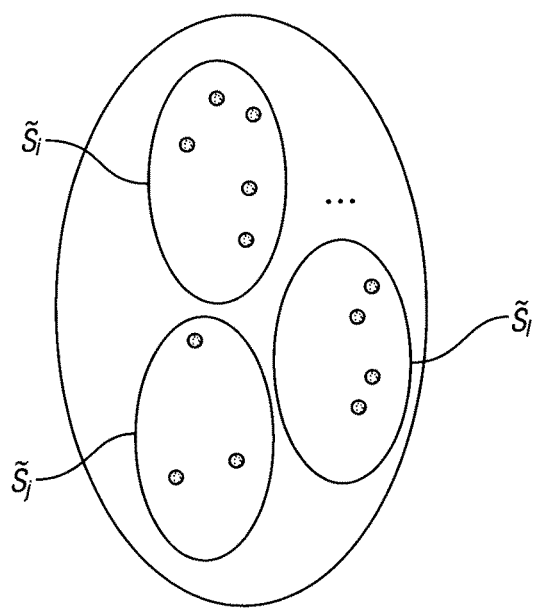
Fig. 3.2

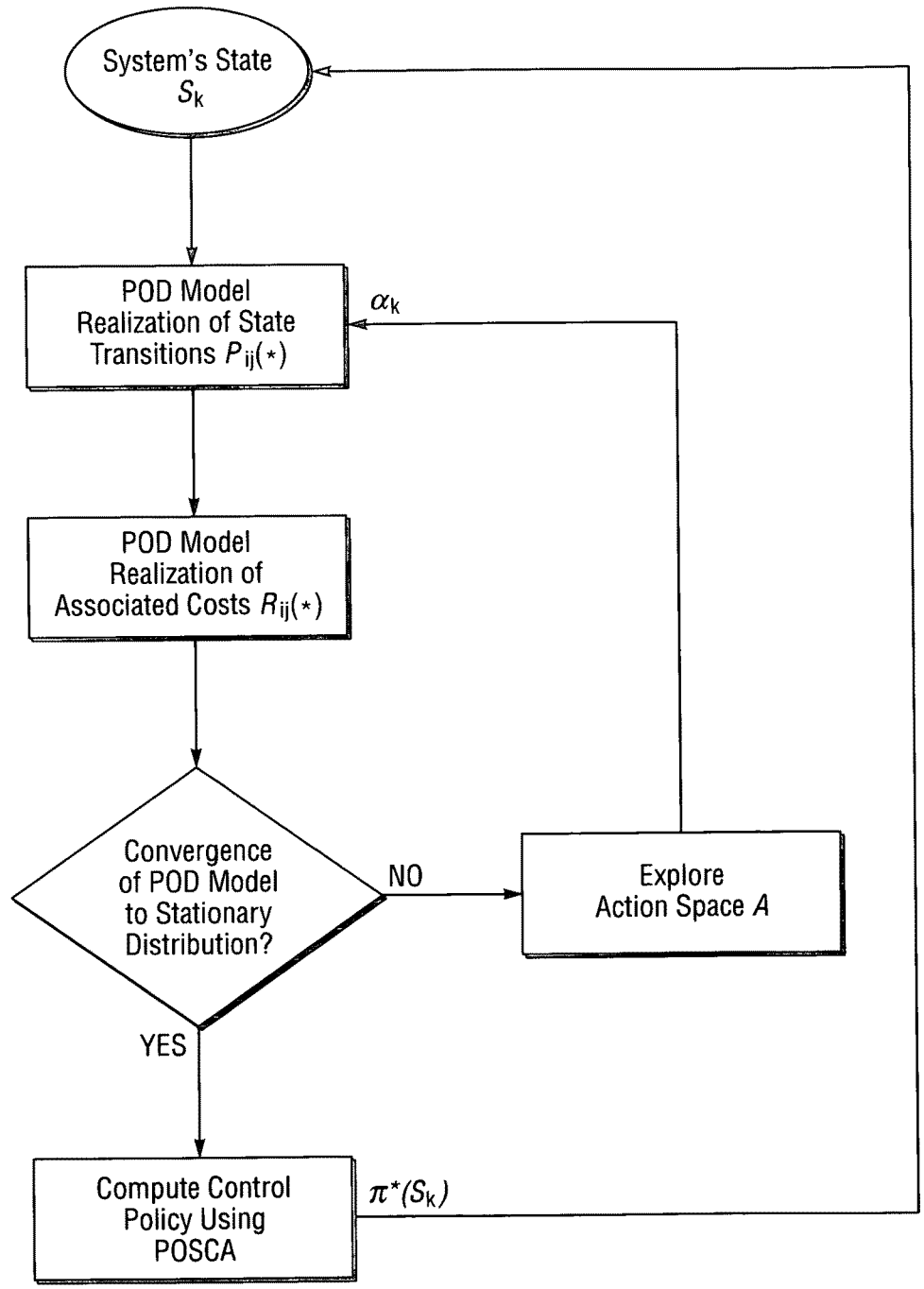
Fig. 4.1

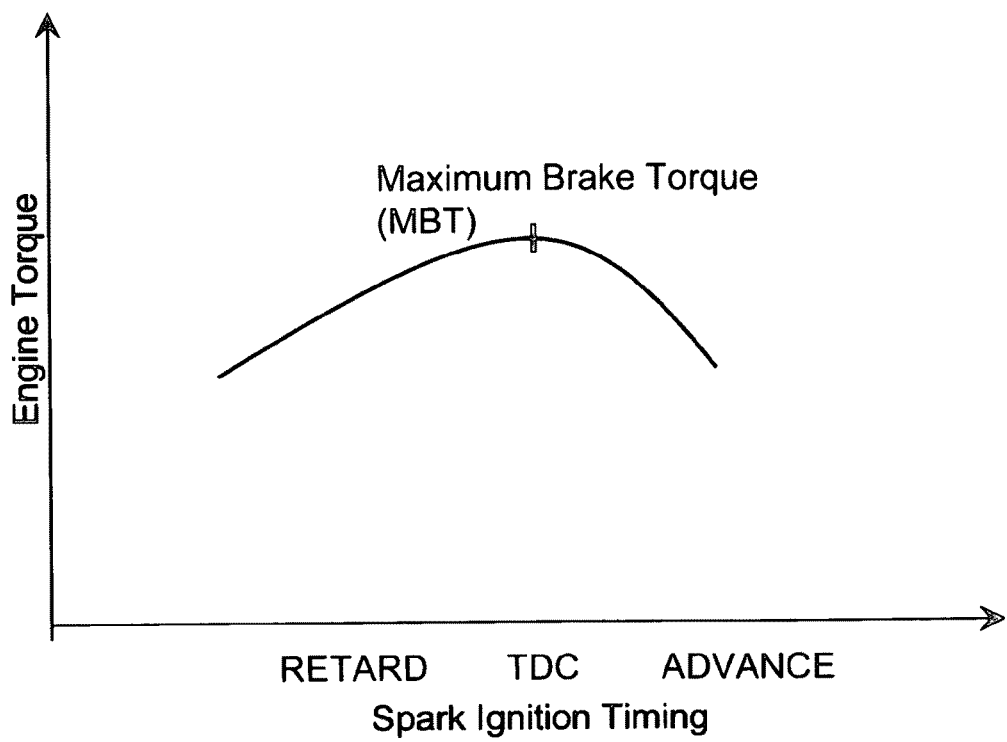
Fig. 4.2
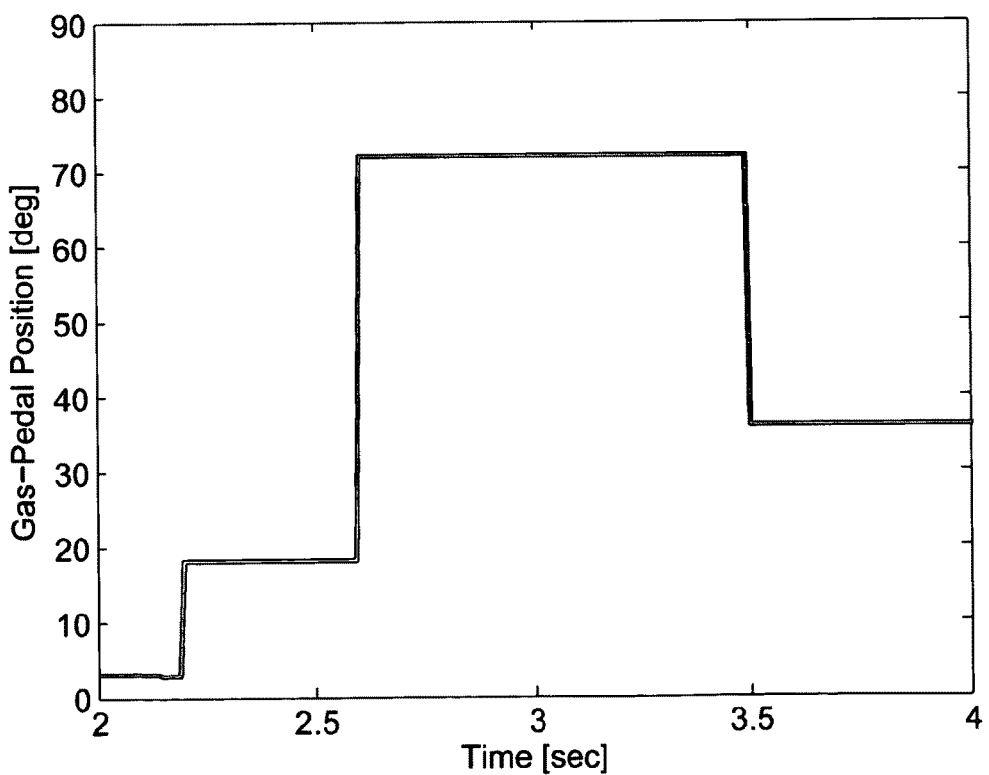
Fig. 4.3

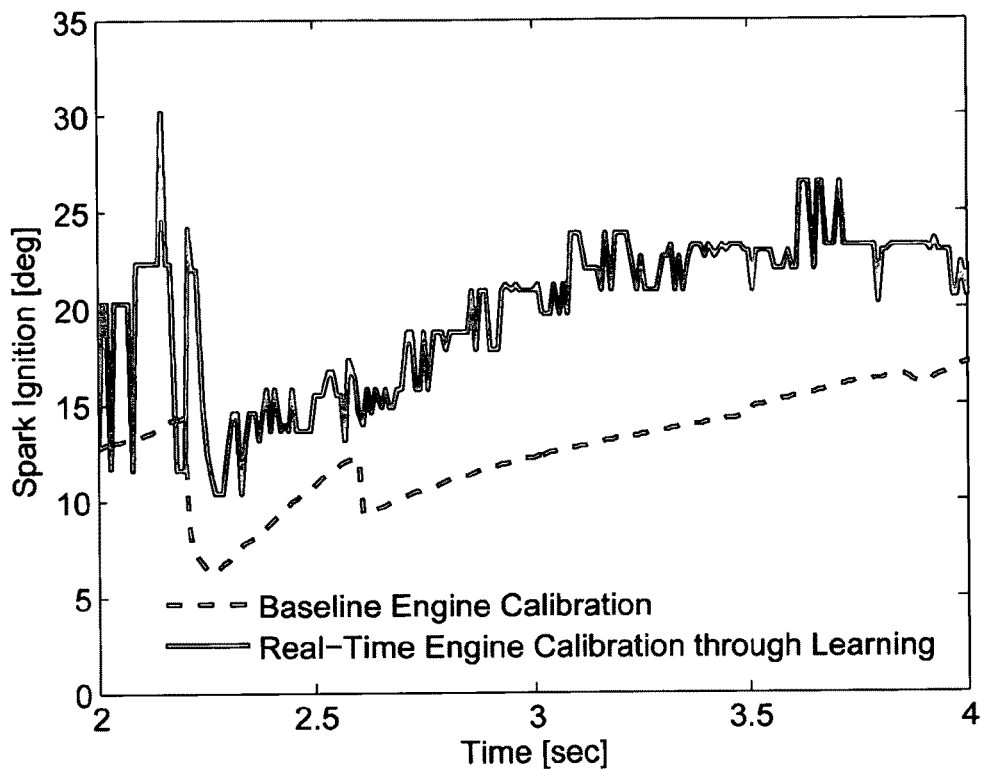
Fig. 4.4
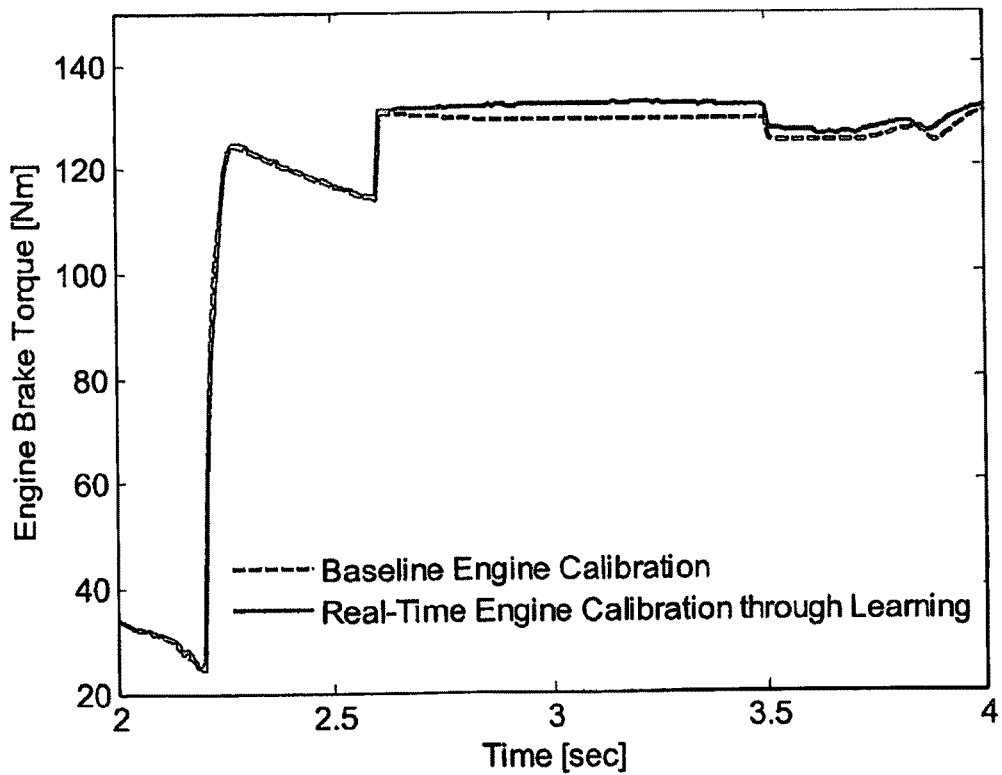
Fig. 4.5

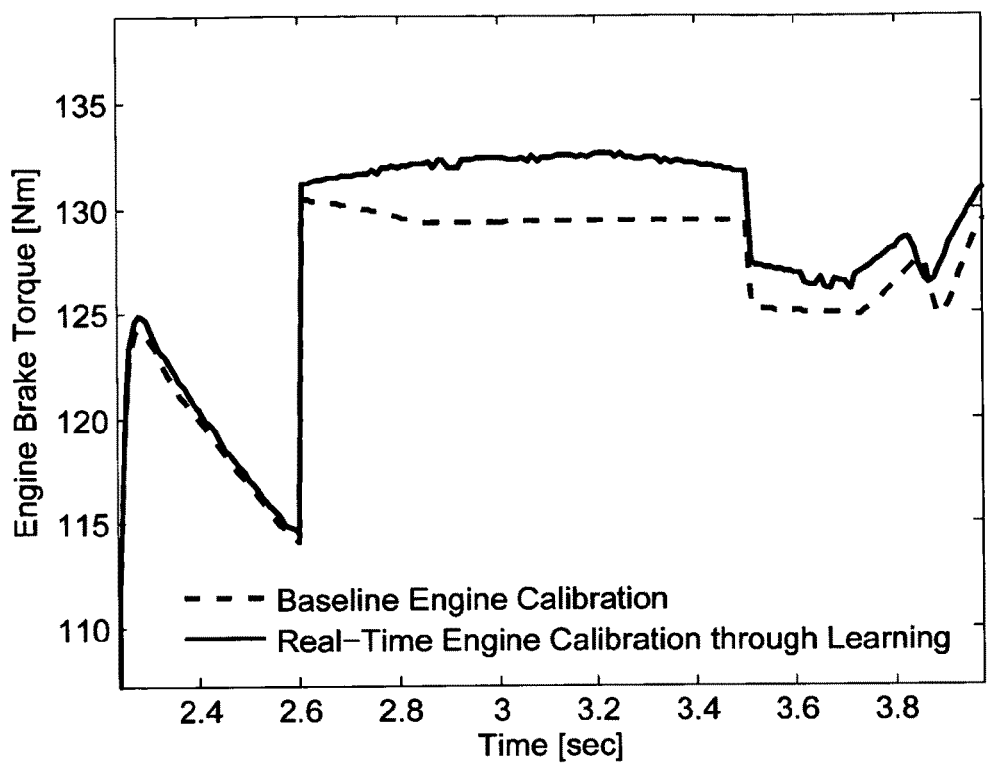
*Fig. 4.6*
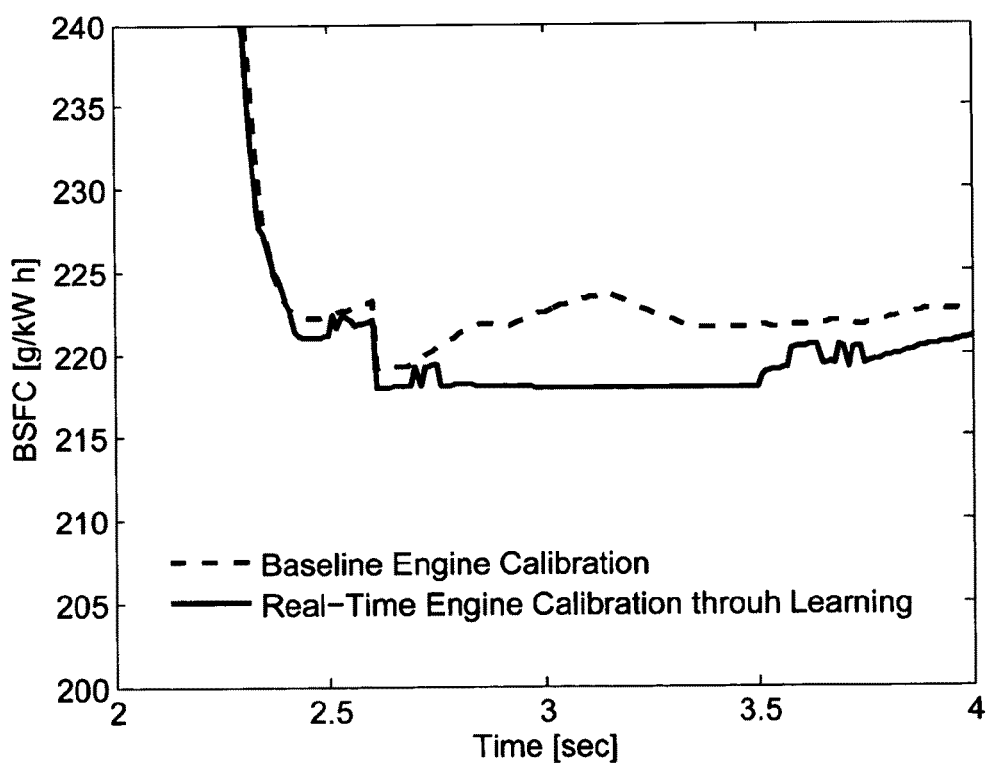
*Fig. 4.7*

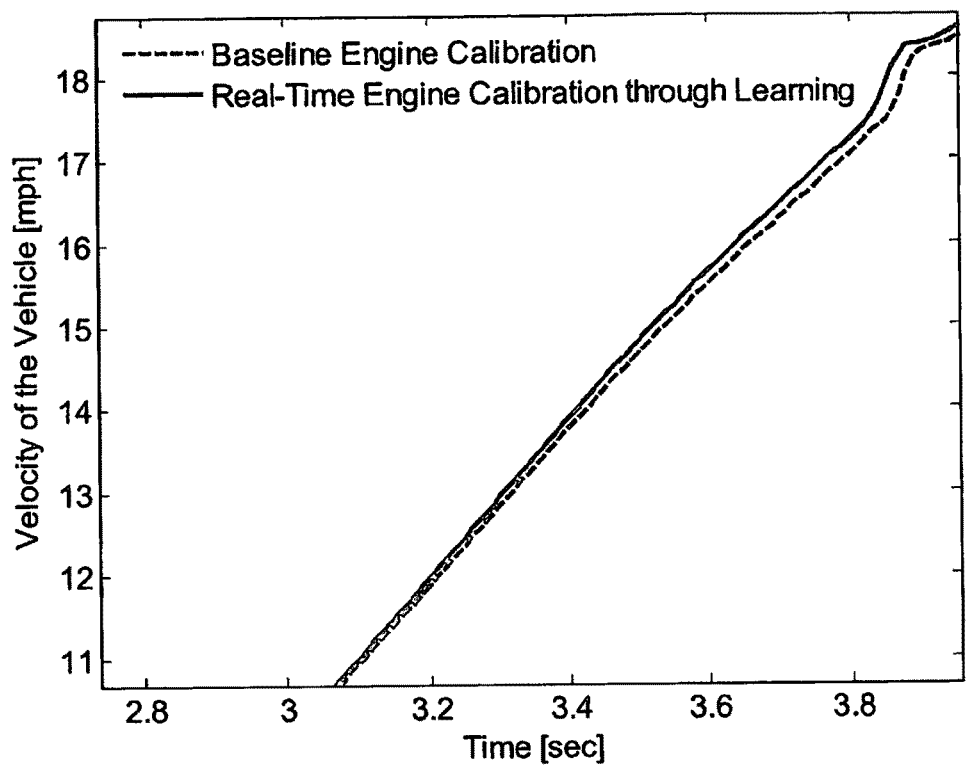
*Fig. 4.8*
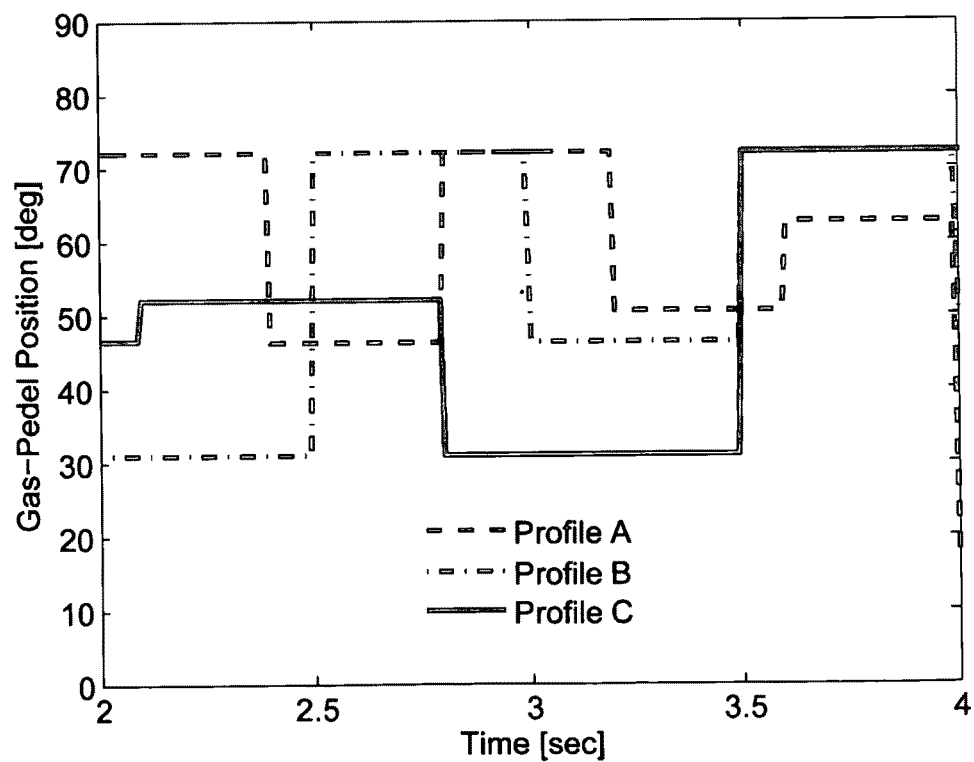
*Fig. 4.9*

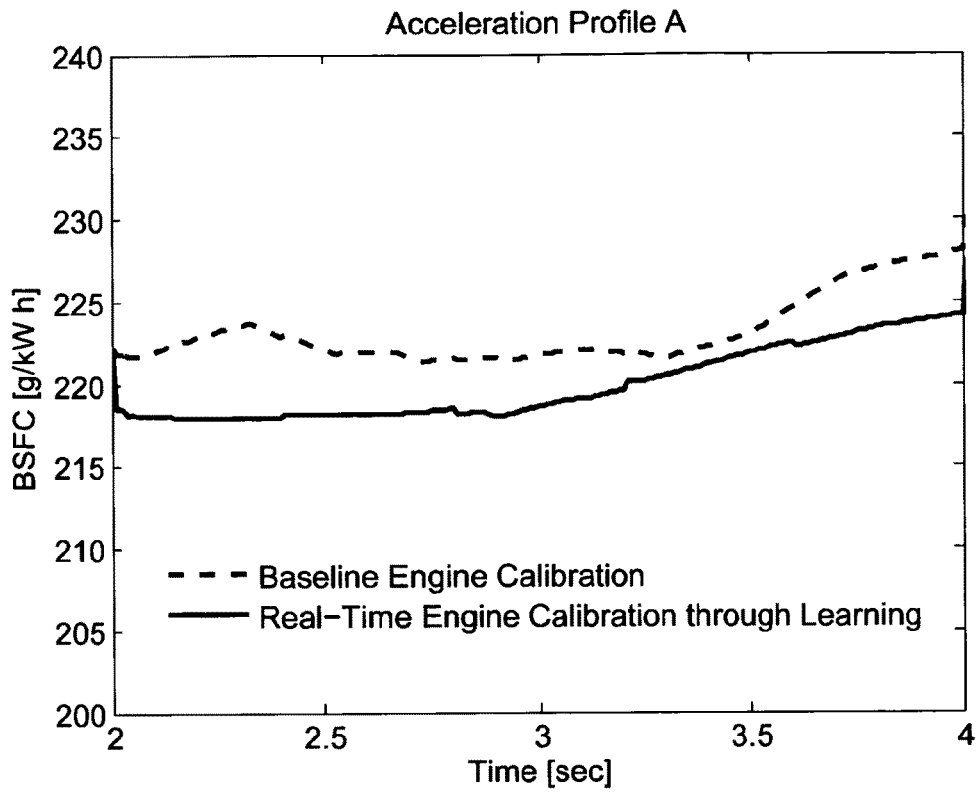
*Fig. 4.10*
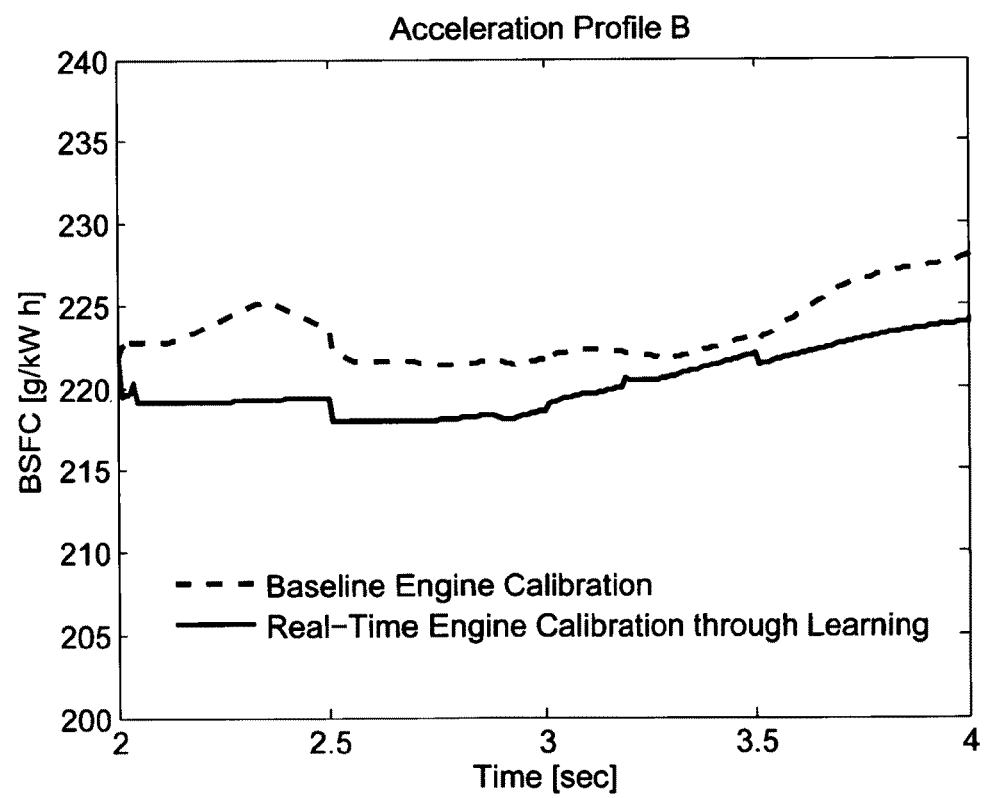
*Fig. 4.11*

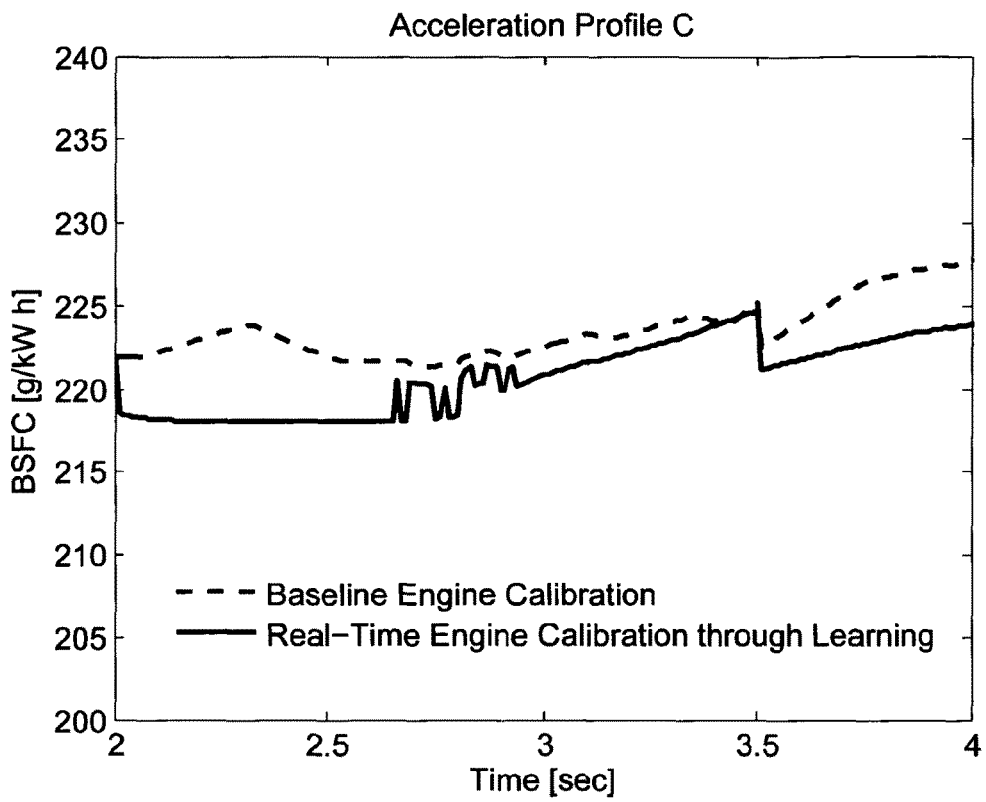
Fig. 4.12
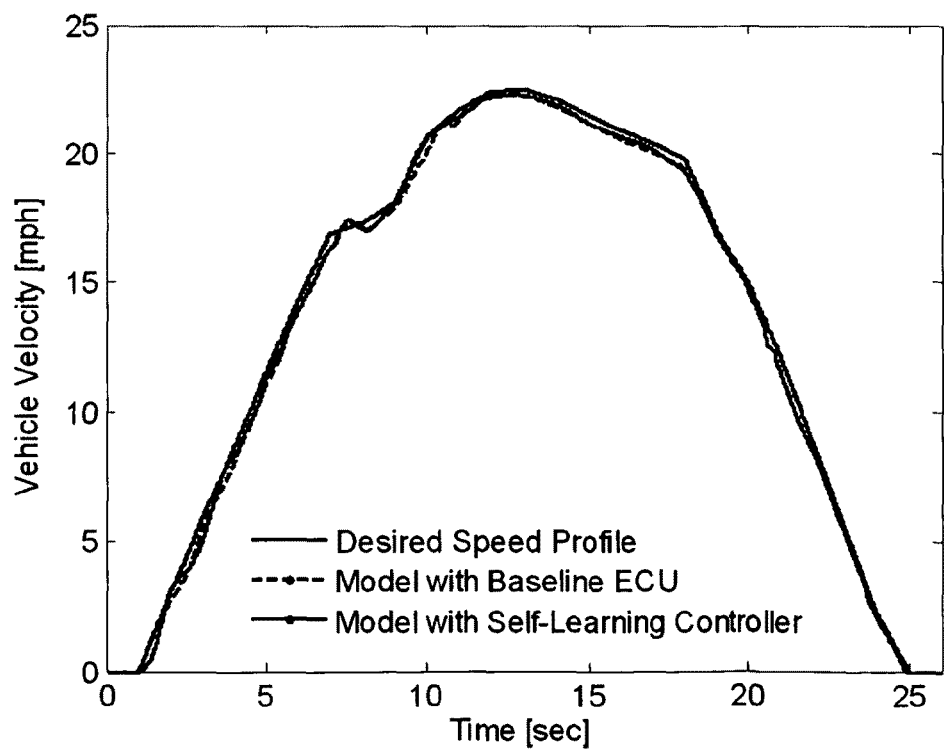
Fig. 4.13

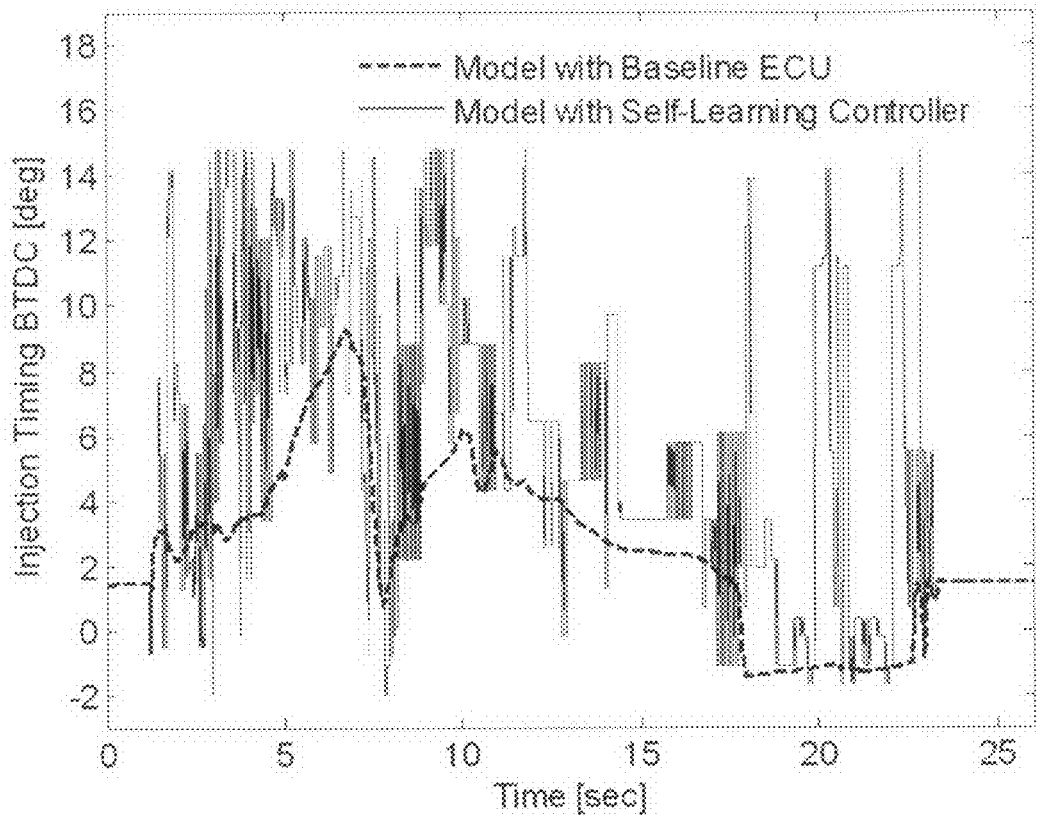
Fig. 4.14
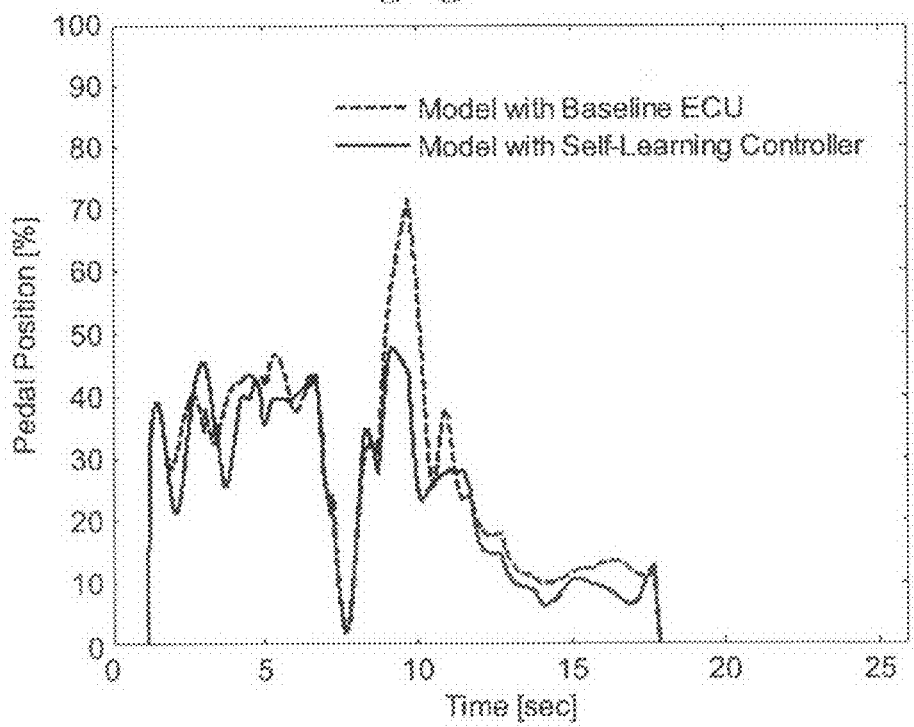
Fig. 4.15

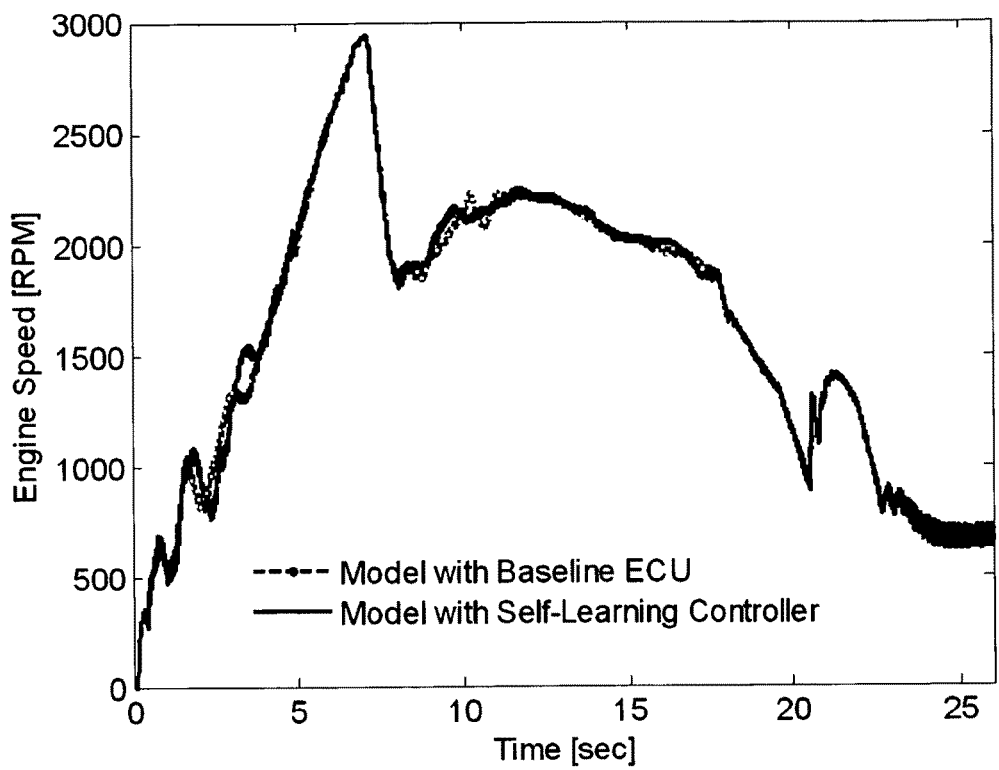
Fig. 4.16
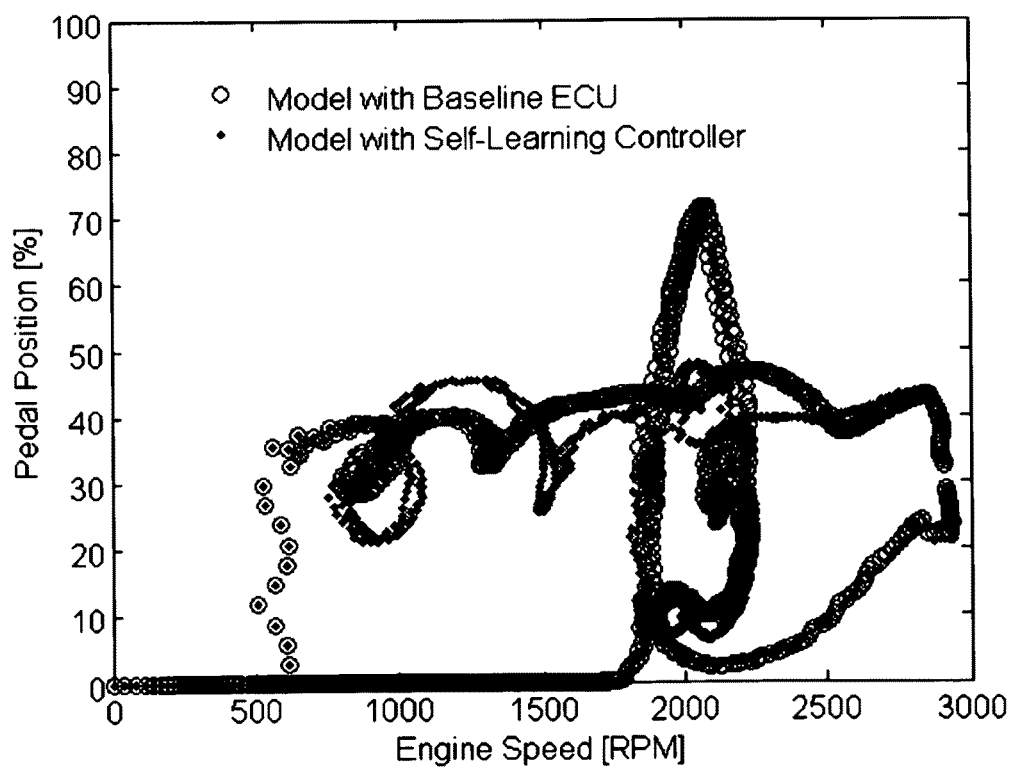
Fig. 4.17

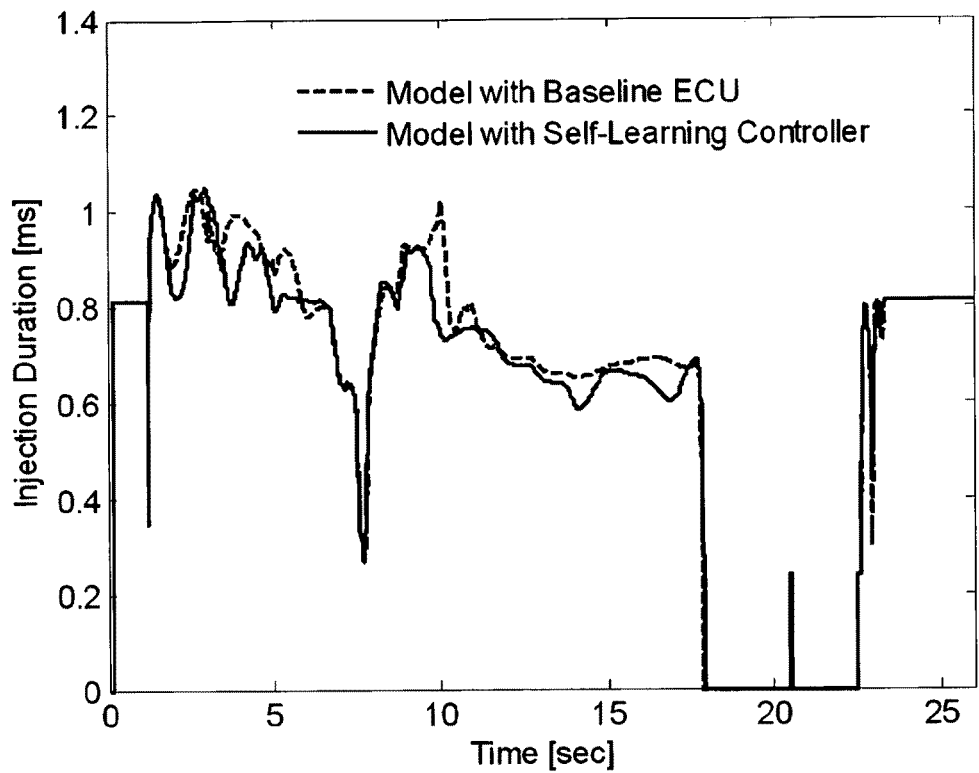
*Fig. 4.18*
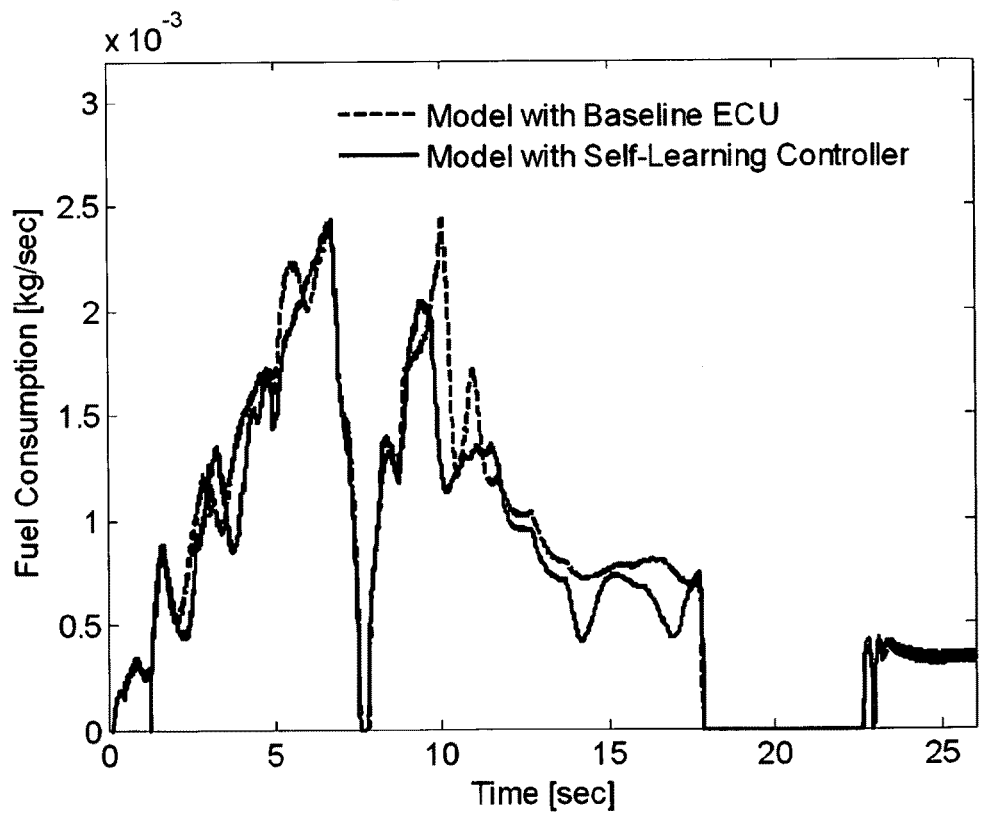
*Fig. 4.19*

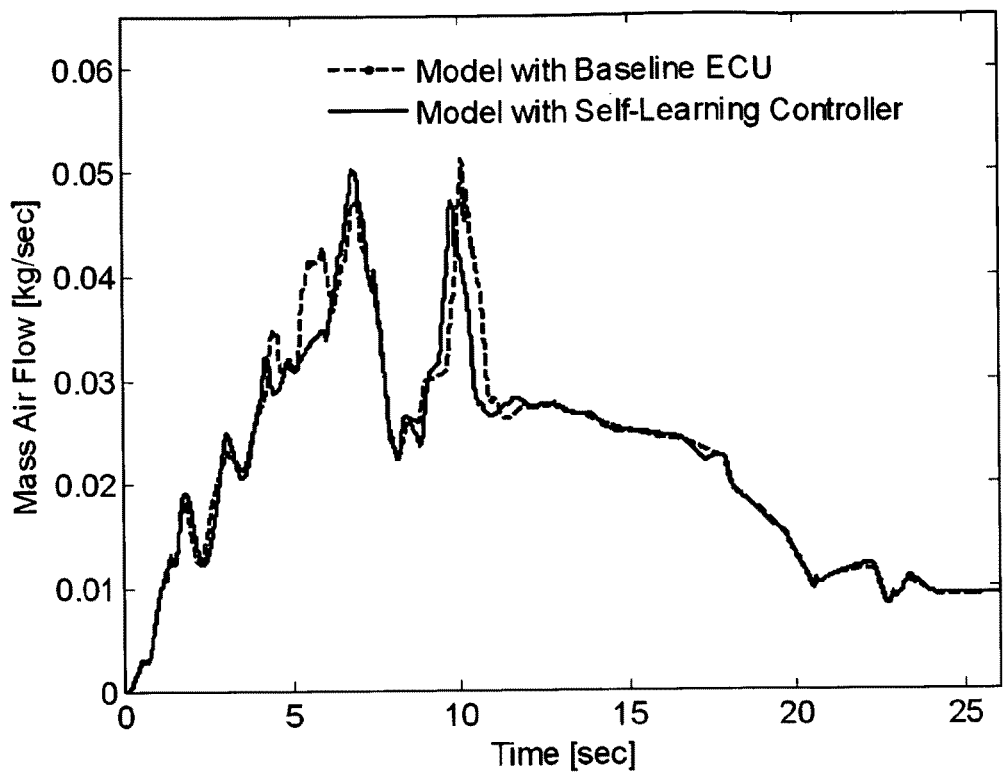
*Fig. 4.20*
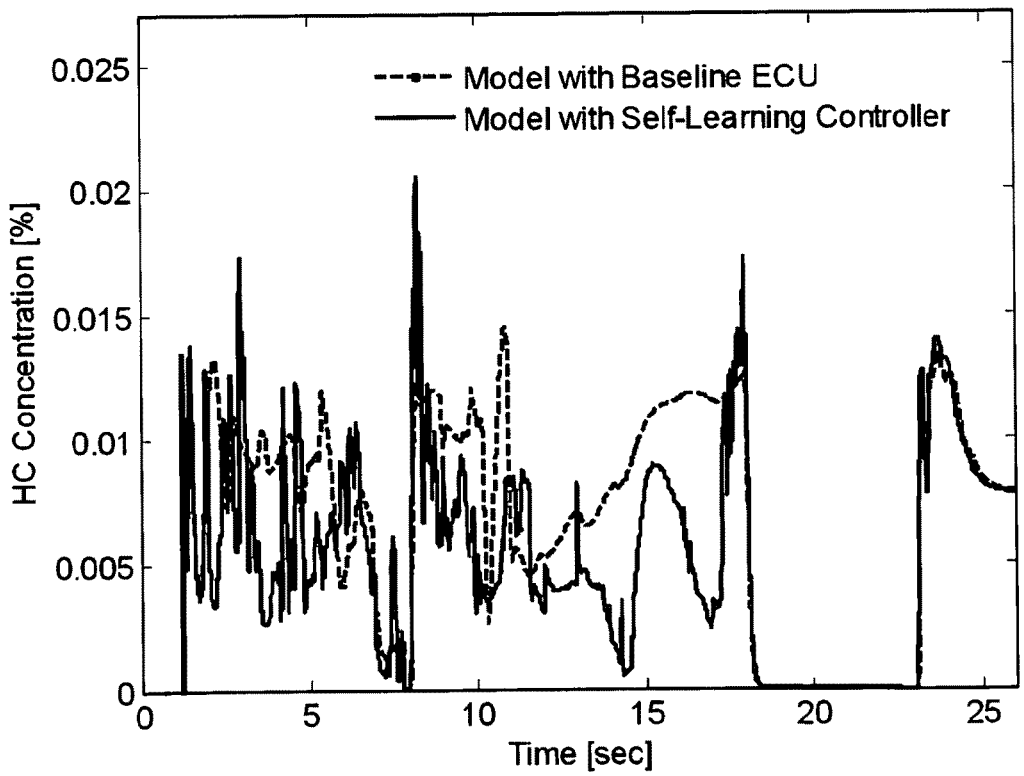
*Fig. 4.21*

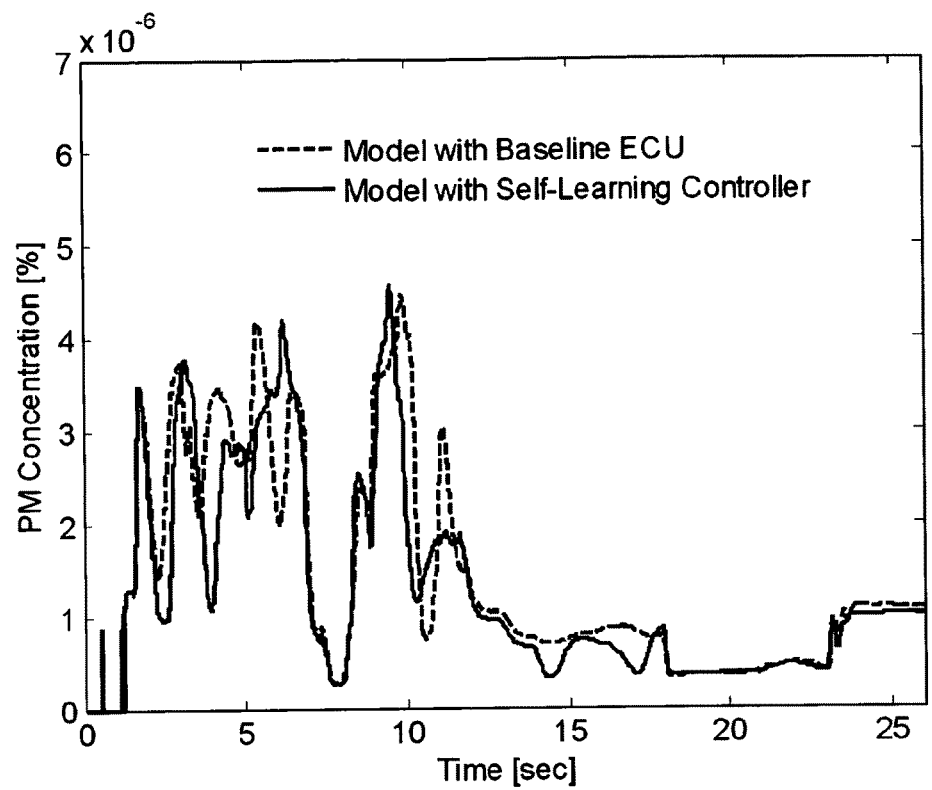
Fig. 4.22
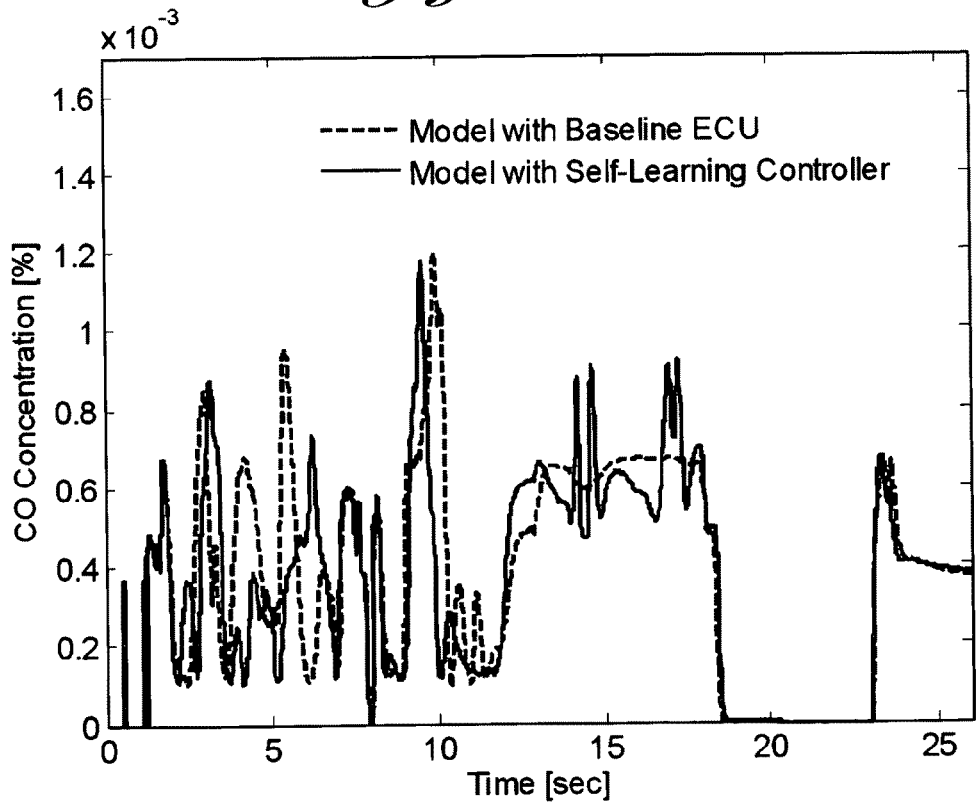
Fig. 4.23

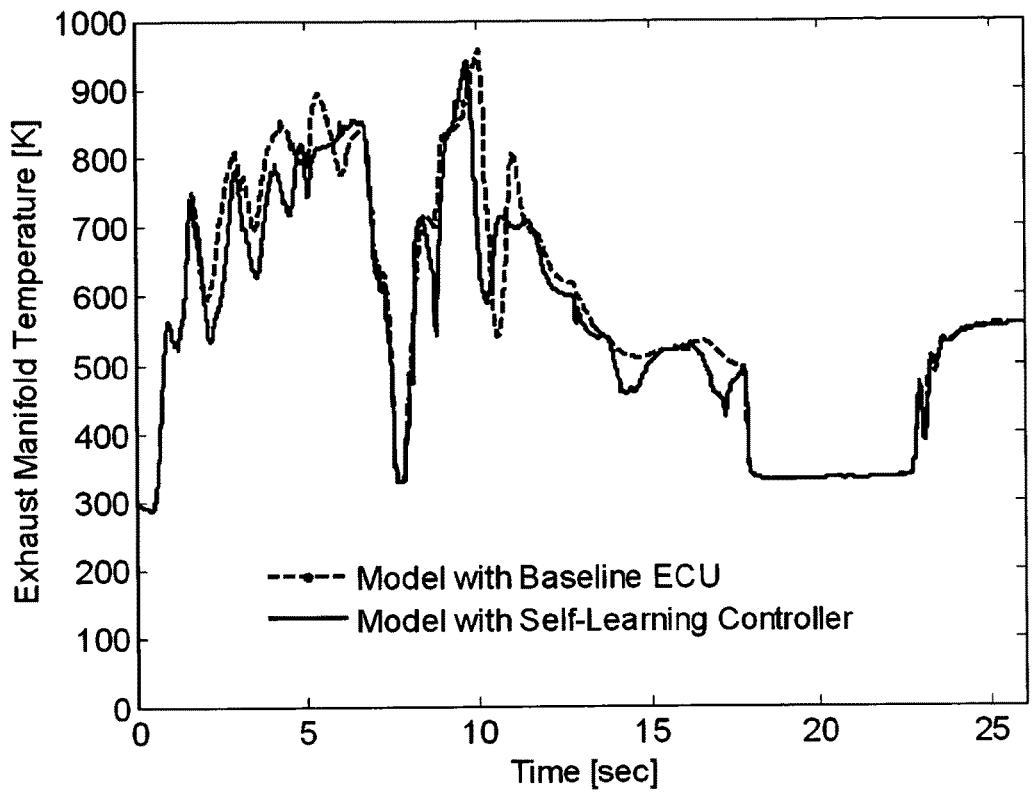
Fig. 4.24
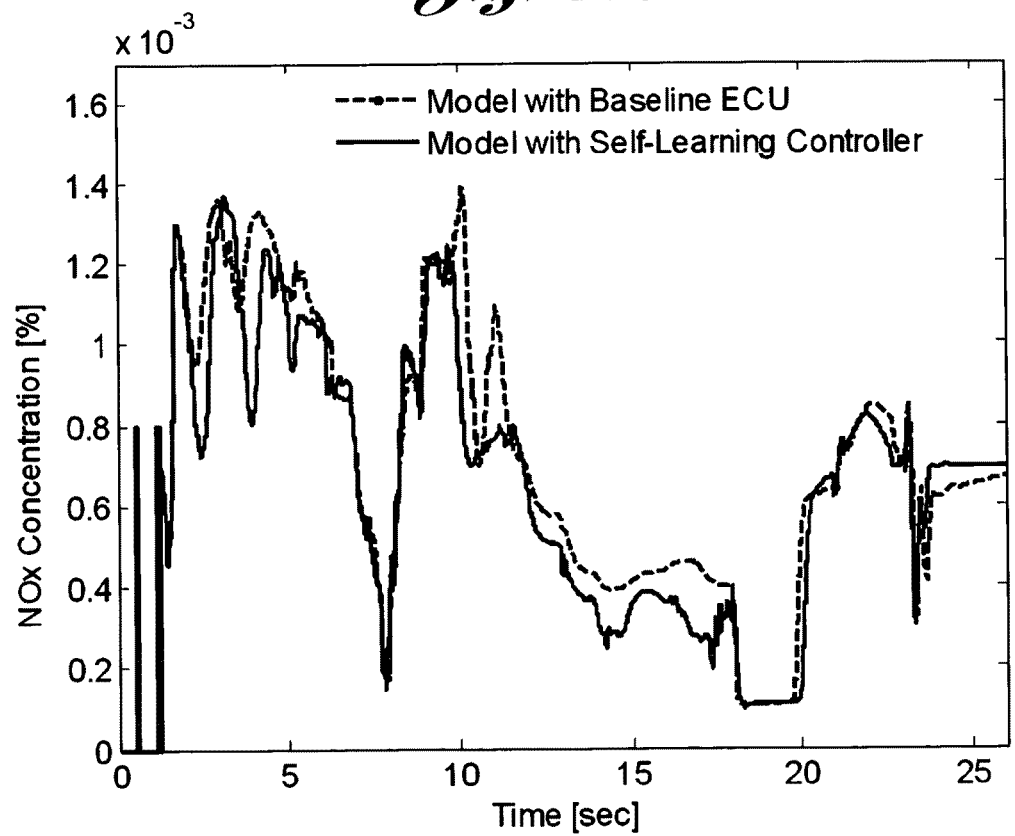
Fig. 4.25

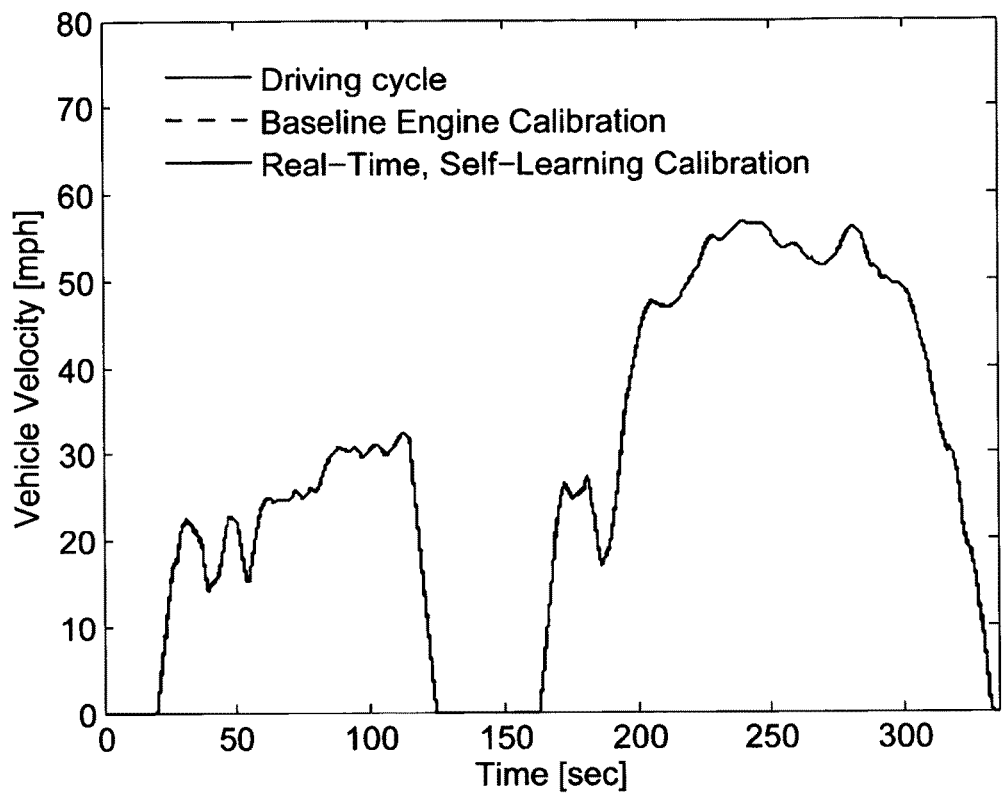
*Fig. 5.1*
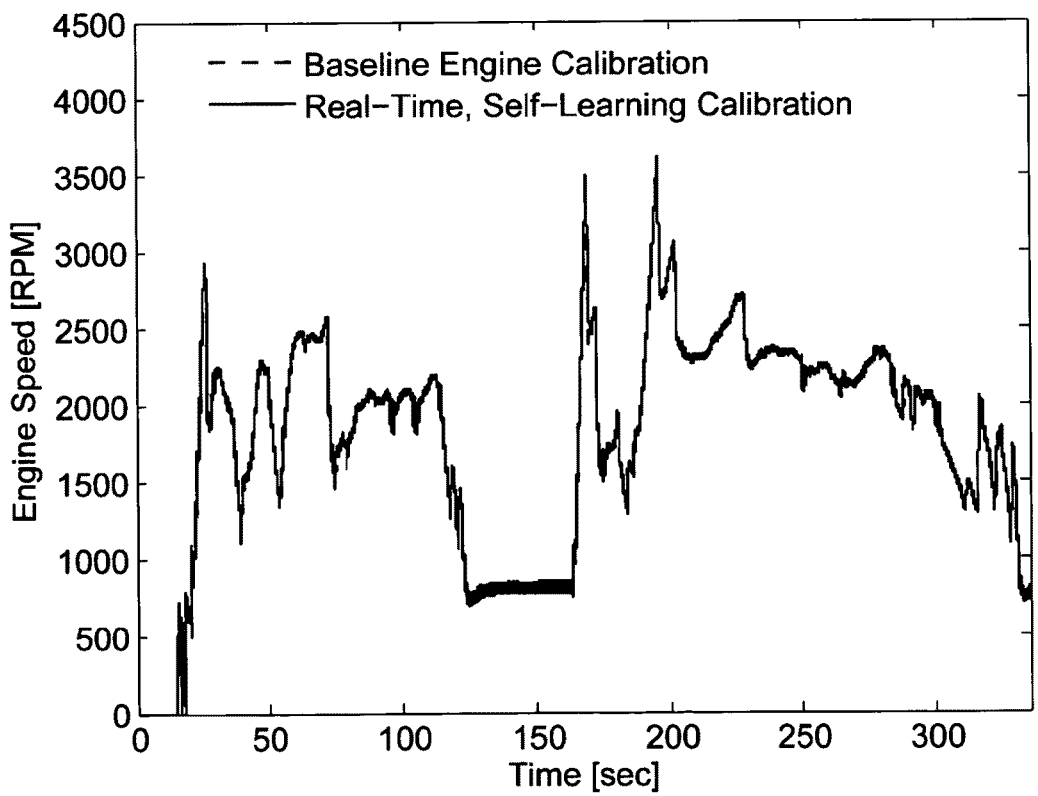
*Fig. 5.2*

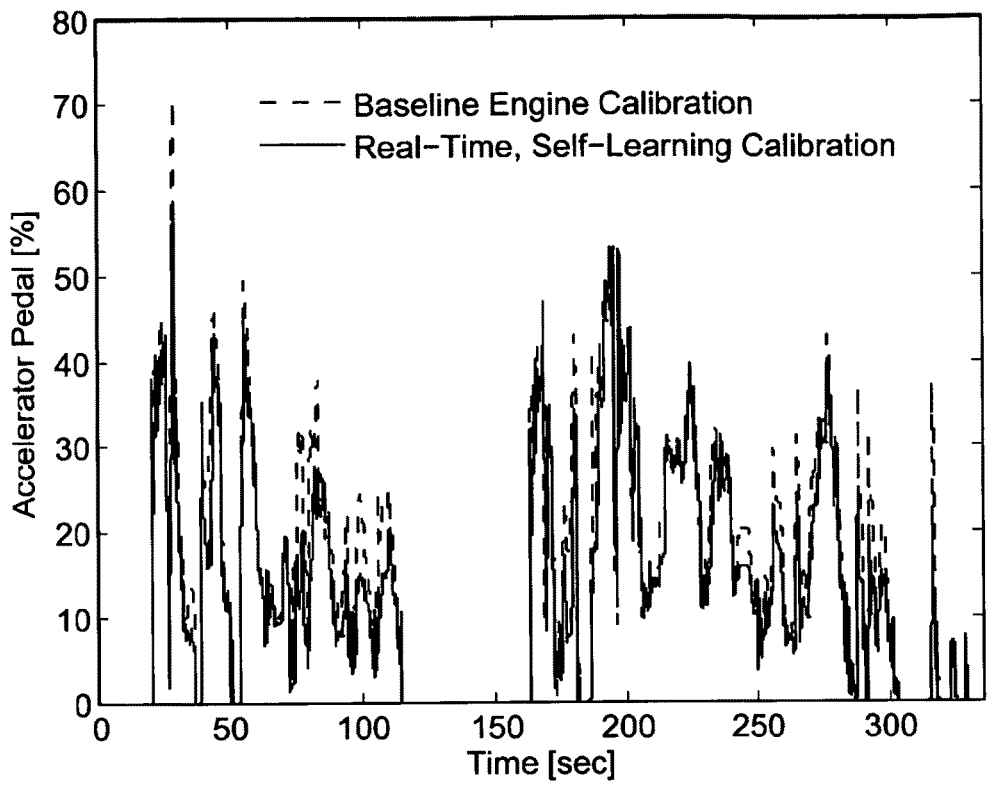
Fig. 5.3
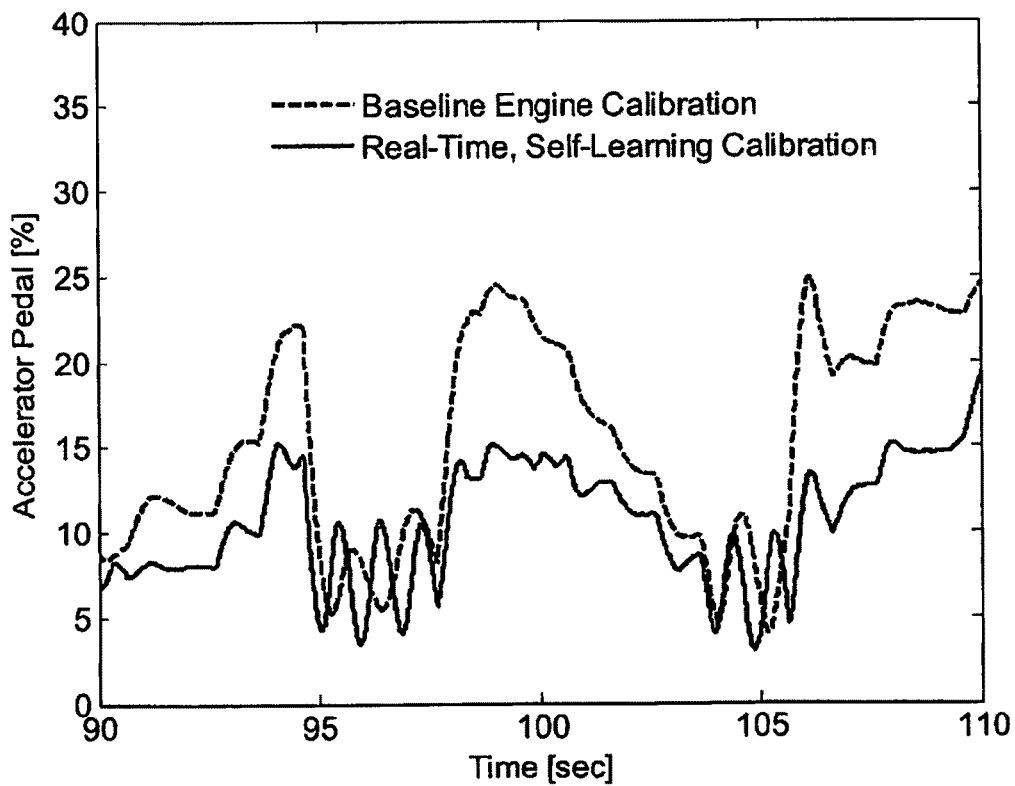
Fig. 5.4

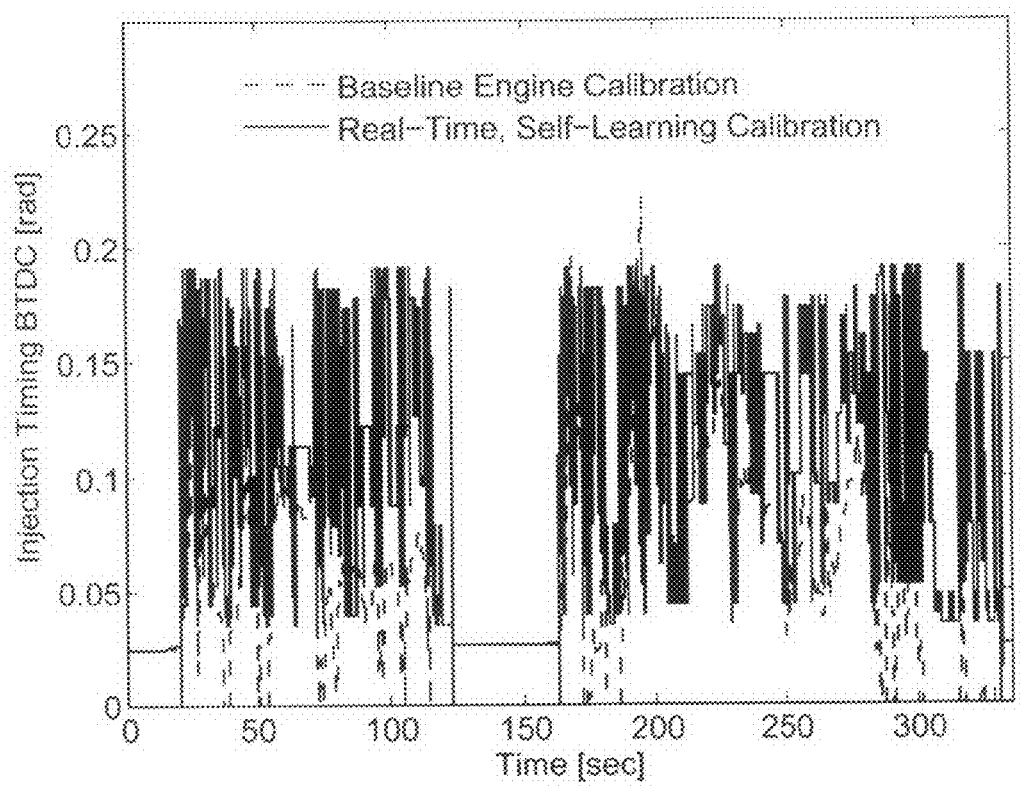
Fig. 5.5
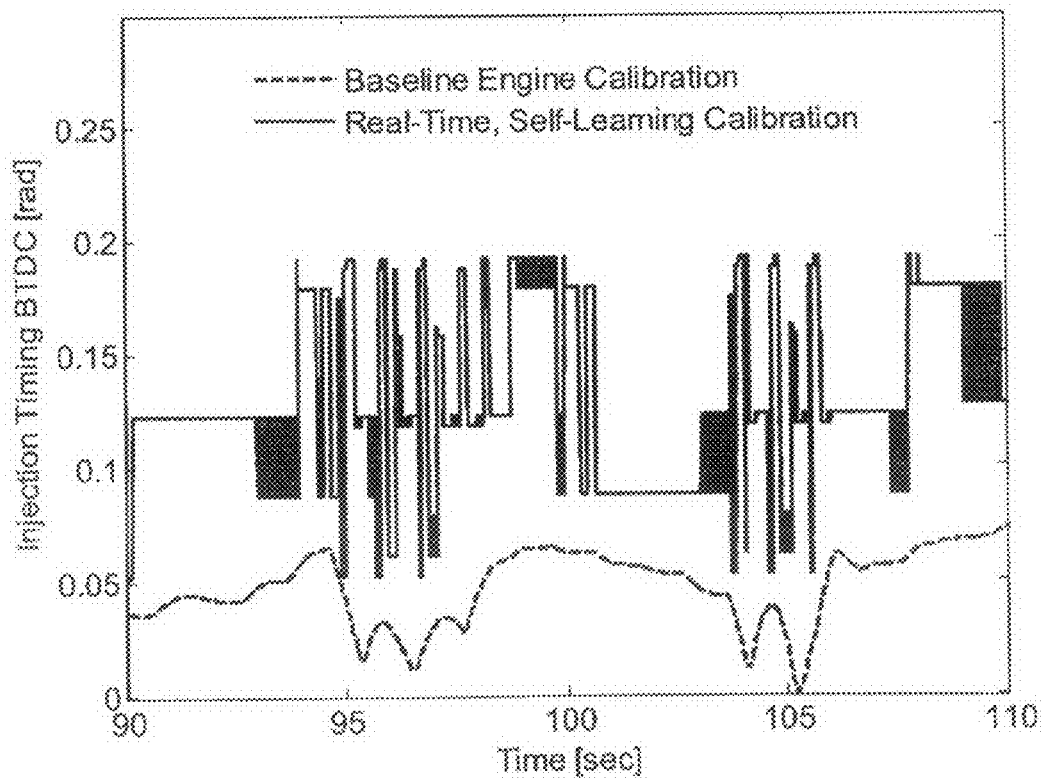
Fig. 5.6

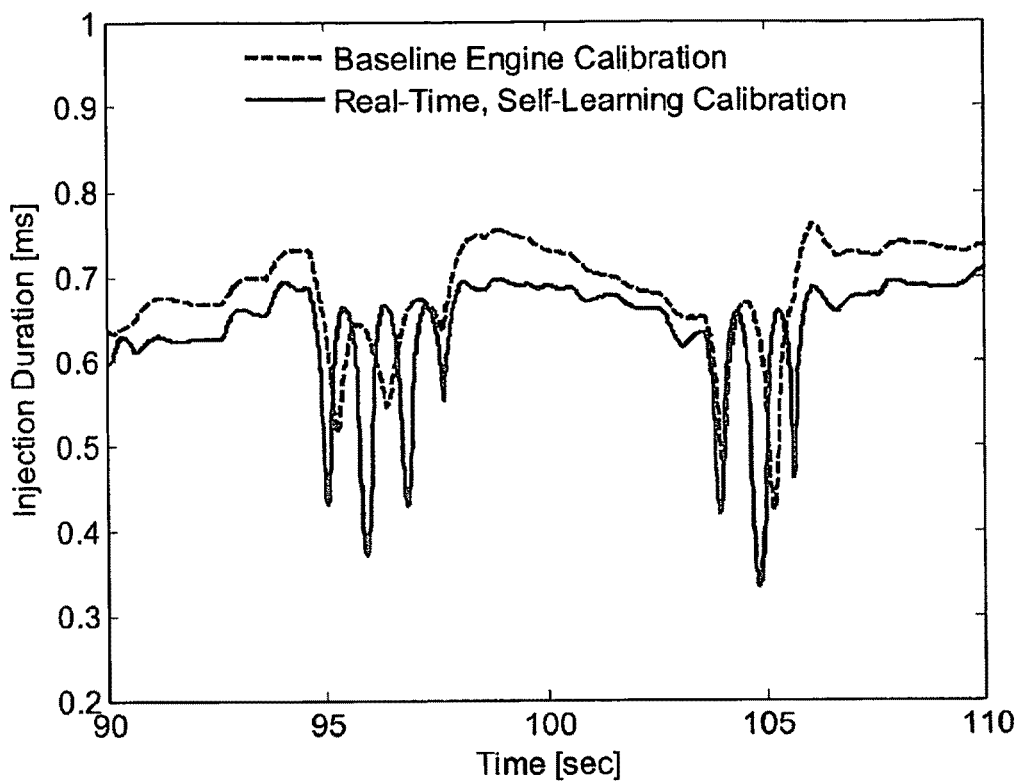
Fig. 5.7
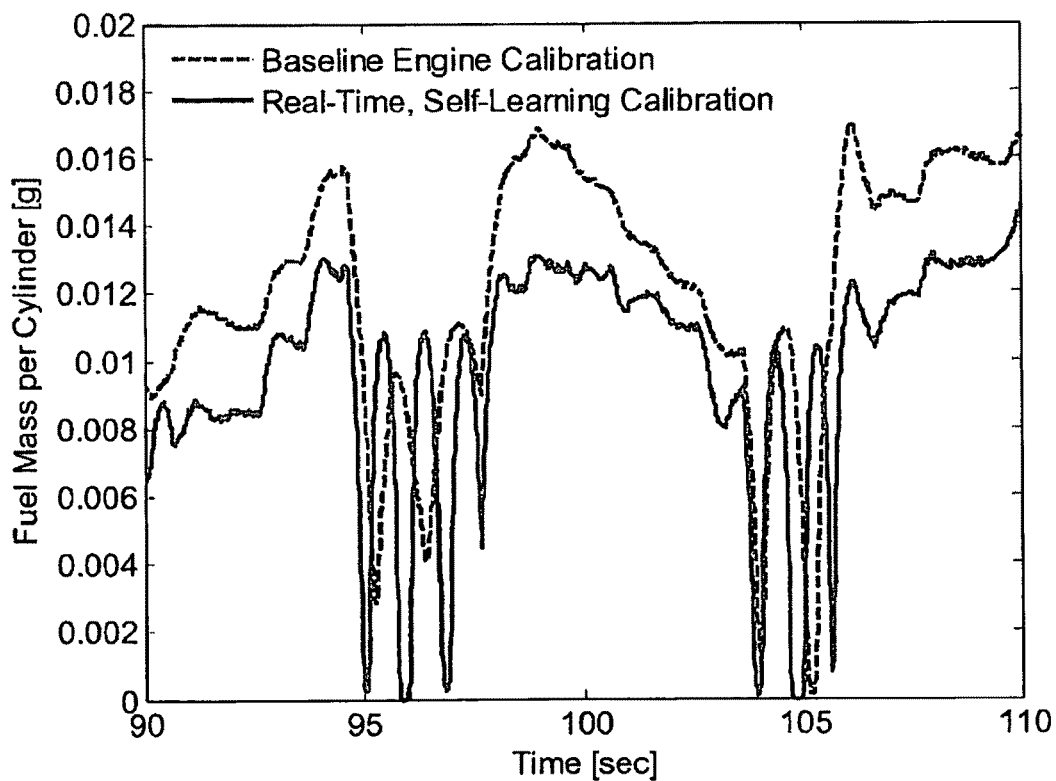
Fig. 5.8

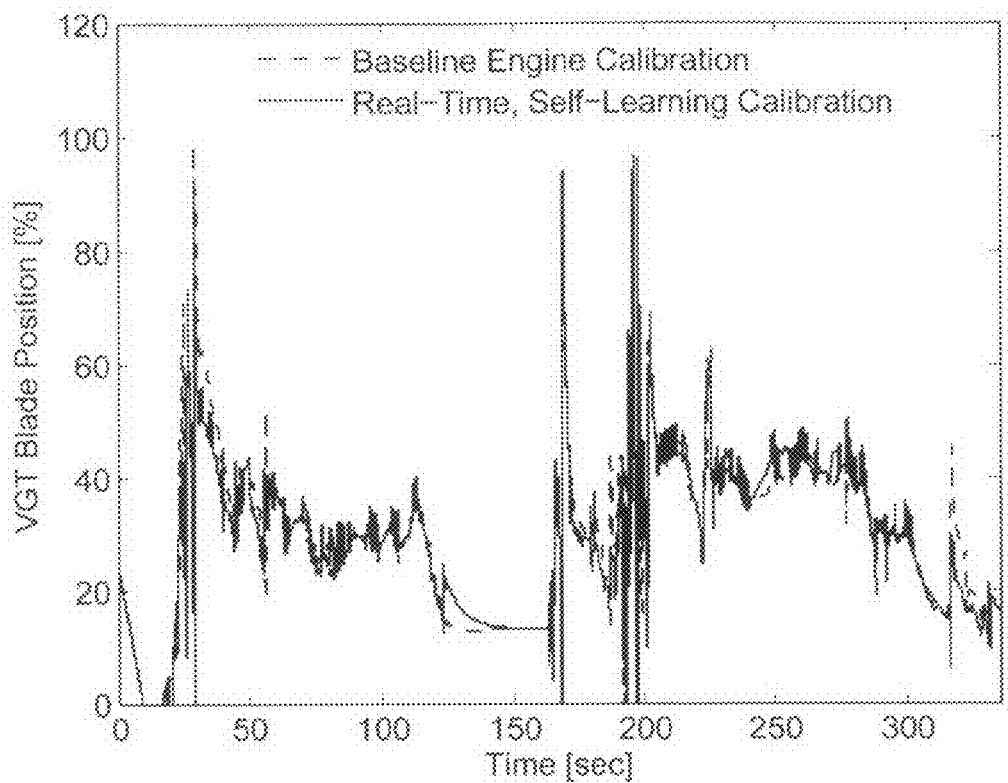
Fig. 5.9
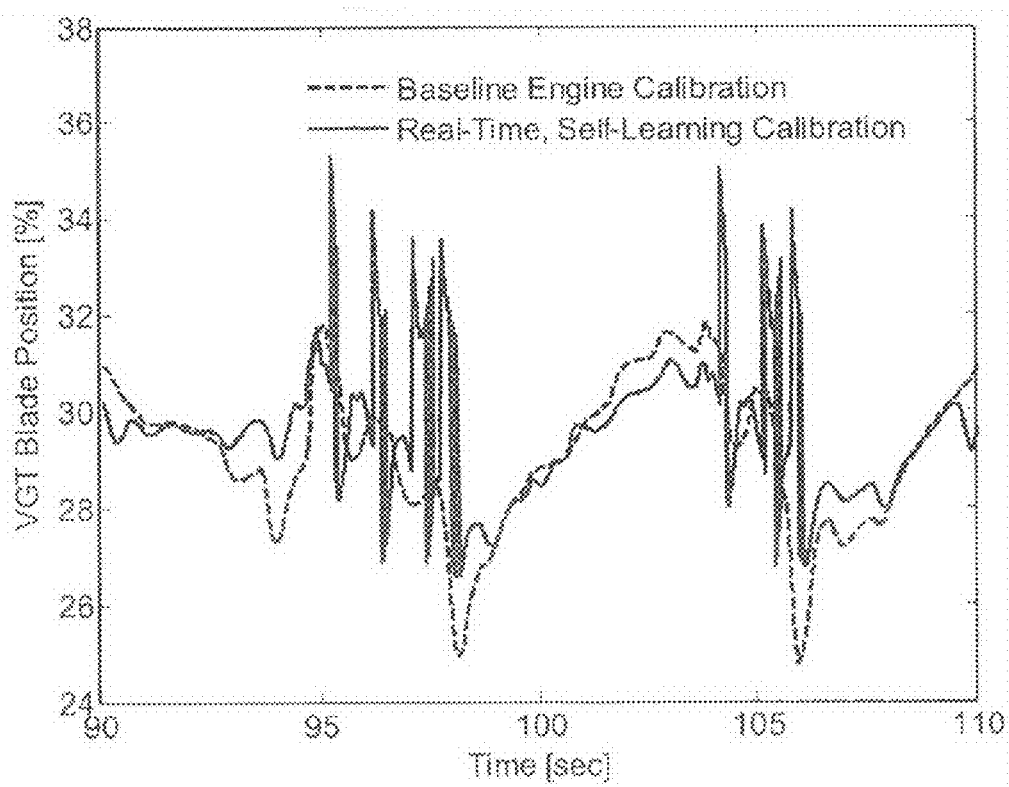
Fig. 5.10

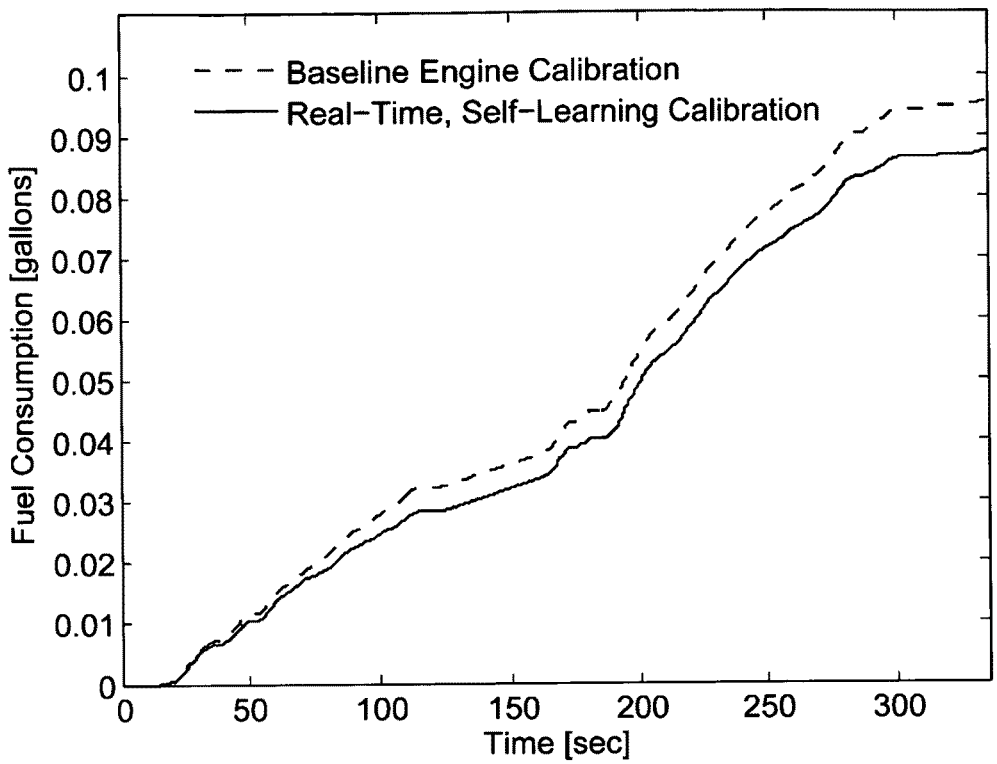
Fig. 5.11
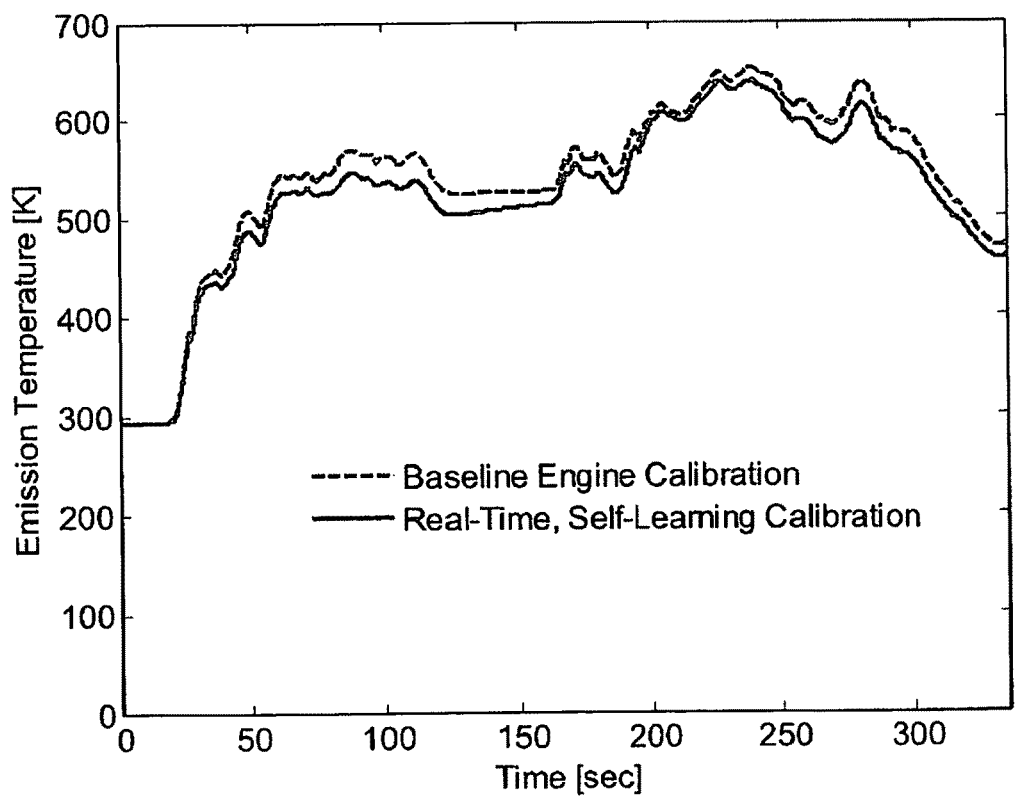
Fig. 5.12

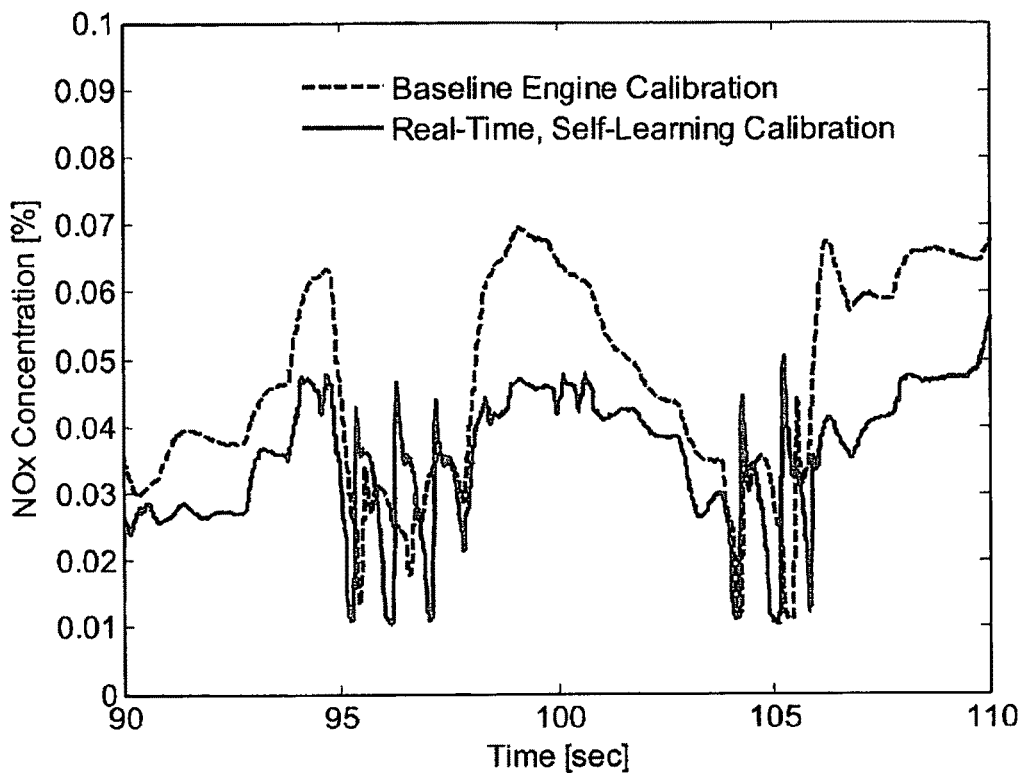

Fig. 5.13

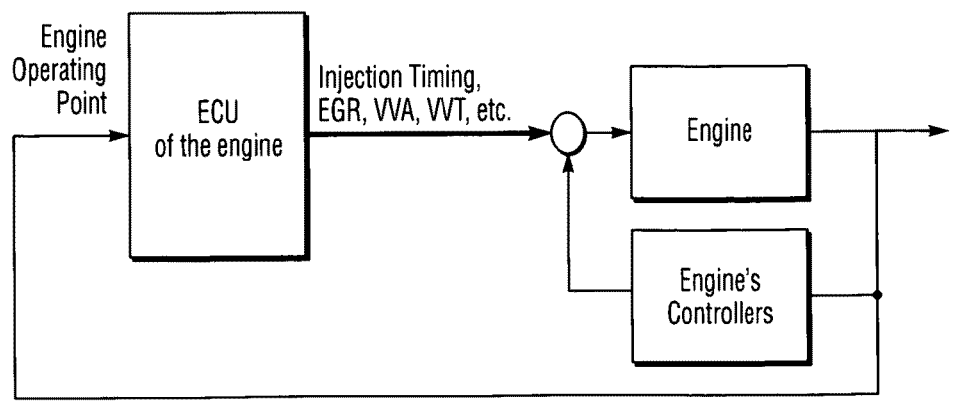

The Electronic Control unit (ECU) of an engine incorporates static correlation maps (derived during engine calibration process and suited for low fuel consumption, emissions, etc) between engine operating conditions (operating point) and values of the controllable variables, e.g., Injection timing, EGR, VVT, VVA, etc. So for each engine operating point the ECU provides the optimal set values (reference points) of these variables.

Fig. 6

METHOD, CONTROL APPARATUS AND POWERTRAIN SYSTEM CONTROLLER FOR REAL-TIME, SELF-LEARNING CONTROL BASED ON INDIVIDUAL OPERATING STYLE

CROSS-REFERENCE TO RELATED APPLICATION

This application claims the benefit of U.S. provisional application entitled "Method And System For Real-Time, Self-Learning Identification And Stochastic Optimal Control Of Advanced Powertrain Systems" filed Jun. 10, 2008 and having Ser. No. 61/060,248.

BACKGROUND OF THE INVENTION

1. Field of the Invention

This invention relates to methods, control apparatuses and powertrain system controllers for real-time, self-learning control based on individual operating style.

2. Background Art

Fossil fuels are an unsustainable resource and our planet has only a finite number of deposits. We have already used half of that reserve just in the past two centuries. At current rates of consumption, the world's remaining oil will be used up in forty years. Two-thirds of the oil used around the world currently goes to power transportation vehicles, of which half goes to passenger cars and light trucks. Being conscious of our fuel use will help to conserve resources for future generations. Transportation also involves the combustion of fossil fuels to produce energy translated into motion. Pollution is created from incomplete carbon reactions, unburned hydrocarbons, or other elements present in the fuel or air during combustion. Concerns about the impact of country's transportation habits on our environment are fully justified. Studies have shown that tailpipe emissions from cars and trucks account for almost a third of the air pollution in the United States.

Increasing demand for improving fuel economy and reducing emissions without sacrificing performance has induced significant research on and investment in advanced internal combustion engine technologies. These technologies, such as fuel injection systems, variable geometry turbocharging, variable valve actuation, and exhaust gas recirculation, have introduced a number of new engine variables that can be controlled to optimize engine operation. In particular, the determination of the optimal values of these variables, referred to as engine calibration, have been shown to be critical for achieving high engine performance and fuel economy while meeting emission standards. Consequently, engine calibration is defined as a procedure that optimizes one or more engine performance criteria, e.g., fuel economy, emissions, or engine performance with respect to the engine controllable variables.

State-of-the-art calibration methods generate a static tabular relationship between the optimal values of the controllable variables and steady state engine operating points or particular driving conditions and testing (e.g., the vehicle's speed profiles for highway and city driving). This relationship is incorporated into the electronic control unit (ECU) of the engine to control engine operation, so that optimal values of the specified criteria are maintained. While the engine is running, values in the tabular relationships are interpolated to provide the values of the controllable variables for each engine operating point. These calibration methods, however, seldom guarantee optimal engine operation for common driving habits (e.g., stop and go driving, speeding, rapid acceleration and rapid braking). Each individual driving style is different and rarely meets those driving conditions of testing for which the engine has been calibrated to operate optimally. For years, consumers have complained that their new cars simply can't achieve the gas mileage estimates displayed on the window sticker or featured in advertisements.

The following U.S. patent documents are related to this invention: U.S. Pat. Nos. 6,539,299; 6,985,808; 6,895,930 and 2009/0069971.

SUMMARY OF THE INVENTION

An object of at least one embodiment of the invention is to provide a method and system for making the engine of a vehicle an autonomous intelligent system capable of learning the optimal values of the controllable variables in real time while the driver drives the vehicle.

The following nomenclature is used consistently herein:

k Discrete time steps (decision epochs)
$s_k$ System state at time k
$y_k$ System output at time k
$w_k$ Disturbance at time k
$v_k$ Measurement error at time k
$a_k$ Control action at time k
S State space
A Control space
W Disturbance space
$A(\bullet)$ Feasible action set
$f$ Function in the state equation
h Function in the observation equation
$\pi$ Control policy
$\mu$ Control functions
$J^\pi$ Cost corresponding to a control policy $\pi$
$z^k$ System observation at time k
$P^\pi(\bullet|\bullet)$ Conditional distribution of states for a given control policy $\pi$
$R(\bullet|\bullet)$ State transition cost
$P(\bullet,\bullet)$ Transition probability matrix
$R(\bullet,\bullet)$ Transition cost matrix
$M^\theta$ Family of models parameterized by the parameter $\theta$
$\hat{\theta}_k$ Estimation of the parameter at time k
$\theta^\circ$ True parameter
$\Theta$ Parameter set
$T_1$ First entrance time of the state
$T_n$ nth entrance time of state
$\mu_i$ Mean recurrence time of state i
$\tilde{S}$ Predictive Optimal Decision-making (POD) domain
$\tilde{S}_i$ Predictive Representation Node (PRN) for each state i
$\overline{R}_i(\bullet|\bullet)$ Predictive Representation Node (PRN) value for each state i
$R_{PRN}{}^i$ Predictive Representation Node (PRN) expected evaluation function for each state i
$\mu_{\tilde{S}_i}$ Mean recurrence time of each Predictive Representation Node (PRN)
$\rho$ Vector of the stationary distribution of the chain
$I_c$ Indicator function of a given set C
V Number of visits of the chain
$\overline{V}$ Mean number of visits of the chain
$\tilde{\pi}$ Lookahead control policy by the Predictive Optimal Stochastic Control Algorithm (POSCA)
J Accumulated cost incurred by dynamic programming
$\tilde{J}$ Accumulated cost incurred by the Predictive Optimal Stochastic Control Algorithm (POSCA)
$\overline{J}$ Lookahead cost incurred by the Predictive Optimal Stochastic Control Algorithm (POSCA)
$\Gamma$ Strategic form game
r Player in a strategic form game $R^r$ Payoff function for each player r in a strategic form game
$A^r$ Set of feasible strategies for each player r
$a^r$ Strategy for each player r in a strategic form game
$R'_r$ Mapping of the payoff functions in decentralized learning In carrying out the above object and other objects of the present invention, a method for calibrating powertrain system performance in a passenger vehicle in real-time based on individual operating style is provided. The method includes powering the vehicle with the system. The method further includes generating a sequence of system operating point transitions based on an operating style of an operator of the vehicle during the step of powering. The method still further includes learning a set of optimum values of controllable system variables in real-time during the steps of powering and generating based on the sequence of system operating point transitions and predetermined performance criteria for the system. The method further includes generating control signals based on the set of optimum values to control operation of the system.

The step of learning may include the step of learning first and second controllable system variables of the set in parallel phases.

The method may further include providing a base set of system operating points and corresponding values of the controllable system variables. The step of learning may also be based on the base set.

The step of learning may be at least partially performed utilizing a decentralized learning control algorithm.

The step of learning may be at least partially performed utilizing a predictive optimal stochastic control algorithm.

The system may include an internal combustion engine and the vehicle may be one of a land traversing vehicle, watercraft and aircraft.

The step of learning may be at least partially performed utilizing a lookahead algorithm.

Further in carrying out the above object and other objects of the present invention, a control apparatus for a powertrain system which powers a passenger vehicle wherein system performance is calibrated in real-time based on individual operating style is provided. The apparatus includes means for generating a sequence of system operating point transitions based on an operating style of an operator of the vehicle while the system is powering the vehicle. The apparatus further includes a self-learning controller for learning a set of optimum values of controllable system variables in real-time while the system is powering the vehicle based on the sequence of system operating point transitions and predetermined performance criteria for the system. The method still further includes means for generating control signals based on the set of optimum values to control operation of the system.

The self-learning controller may learn first and second controllable system variables of the set in parallel phases.

The apparatus may further include a base set of system operating points and corresponding values of the controllable system variables. The self-learning controller may learn the set of optimum values based on the base set.

The self-learning controller may learn based on a decentralized learning control algorithm.

The self-learning controller may learn based on a predictive optimal stochastic control algorithm.

The system may include an internal combustion engine. The vehicle may be one of a land traversing vehicle, watercraft and aircraft.

The self-learning controller may learn based on a lookahead algorithm.

Still further in carrying out the above object and other objects of the present invention, a powertrain system controller including a processor and a storage device having processor-readable code embodied thereon for programming the processor to perform a method is provided. The method includes generating a sequence of system operating point transitions based on an operating style of an operator of the vehicle while the system is powering a passenger vehicle. The method further includes learning a set of optimum values of controllable system variables in real-time during the step of generating based on the sequence of system operating point transitions and predetermined performance criteria for the system. The method still further includes generating control signals based on the set of optimum values to control operation of the system.

The step of learning may include the step of learning first and second controllable system variables of the set in parallel phases.

The storage device may contain a processor-readable base set of system operating points and corresponding values of the controllable system variables. The step of learning may also be based on the base set.

The step of learning may be at least partially performed utilizing a decentralized learning control algorithm.

The step of learning may be at least partially performed utilizing a predictive optimal stochastic control algorithm.

The system may include an internal combustion engine. The vehicle may be one of a land traversing vehicle, watercraft and aircraft.

The step of learning may be at least partially performed utilizing a lookahead algorithm.

At least one embodiment of the invention includes a self-learning controller that can be integrated with the engine of a vehicle. While the driver drives the vehicle, this controller learns how to adjust the engine's calibration to the driver's individual driving style, optimizing specified performance criteria, e.g., fuel economy, pollutant emissions, engine power, etc. State-of-the-art methods for engine calibration are implemented for specific driving conditions and testing. But since individual driving styles differ and rarely meet those conditions for which the engine has been calibrated to operate optimally, this invention adapts the engine's operation to the driver so that maximum performance criteria can be met.

At least one embodiment of the invention allows the engine to learn the optimal values of the engine variables in real time while the driver drives the vehicle. The engine progressively perceives the driver's driving style and eventually learns to operate optimally. The longer the engine runs during a particular driving style, the better the engine's specified performance criteria will be. The engine's ability to learn its optimum calibration is not limited, however, to a particular driving style. The engine can learn to operate optimally for different drivers, although the drivers should indicate their identities through a button located in the vehicle's console or simply through their car keys before starting the vehicle. The engine can then adjust its operation to be optimal for a particular driver based on what it has learned in the past regarding his/her driving style. At least one embodiment of the invention fully exploits the engine's given technology in terms of the maximum specified performance criteria that can be achieved. It aims to provide an answer to the following question: For an engine with a given technology, what are the maximum fuel economy and minimum pollutant emissions that the driver can get with his/her driving habits?

Current state-of-the-art engine calibration methods require the driver to drive sensibly, i.e., to avoid speeding, rapid acceleration, and rapid braking, for optimal fuel consumption and pollutant emissions. What is new about at least one embodiment of the invention is that it makes the engine learn to operate optimally with respect to the driver. This new technology makes the engine of a vehicle an autonomous system that can learn to realize its optimal operation for the driver's individual driving style while running the vehicle. Two factors distinguish at least one embodiment of the invention: (1) every driver can realize optimal fuel economy and pollutant emissions as fully as possible; (2) the engine will operate optimally for any other driver (e.g., a family member) who indicates his or her identity before starting the vehicle.

Individual actions can make a substantial difference in reducing global energy consumption and damage to the environment. At least one embodiment of the invention takes full advantage of an existing engine technology to achieve the minimum possible fuel consumption and pollutant emissions. High efficiency cars can enhance energy security and avert future damage to the environment. Furthermore, it can save money spent for gasoline, an important financial consideration for almost all of us.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1.1—Two trajectories A, and B, of engine operating points ending at the same operating point;
FIG. 1.2—BSFC value of the terminal engine operating point as reached from trajectories A, and B;
FIG. 2.1—The stochastic system model adapted for the engine calibration problem;
FIG. 2.2—Sequential decision-making problem;
FIG. 3.1—Construction of the POD domain;
FIG. 3.2—Partition of POD through the PRNs;
FIG. 4.1—Implementation of POD model and POSCA;
FIG. 4.2—Effect of spark ignition timing on the engine brake torque at constant engine speed;
FIG. 4.3—Gas-pedal position rate representing a driver's driving style;
FIG. 4.4—Spark ignition timing over the driving style;
FIG. 4.5—Engine brake torque;
FIG. 4.6—Engine brake torque (zoom-in);
FIG. 4.7—BSFC comparison between the baseline and self-learning calibration;
FIG. 4.8—Velocity of the two vehicles carrying the engine with baseline and self-learning calibration;
FIG. 4.9—Three different acceleration profiles;
FIG. 4.10—BSFC comparison between the baseline and self-learning calibration (Acceleration profile A);
FIG. 4.11—BSFC comparison between the baseline and self-learning calibration (Acceleration profile B);
FIG. 4.12—BSFC comparison between the baseline and self-learning calibration (Acceleration profile C);
FIG. 4.13—Desired speed profile;
FIG. 4.14—Injection timing;
FIG. 4.15—Pedal position rate;
FIG. 4.16—Engine speed;
FIG. 4.17—Engine operating point transitions;
FIG. 4.18—Injection duration;
FIG. 4.19—Fuel consumption;
FIG. 4.20—Mass air flow into the cylinders;
FIG. 4.21—HC concentration of emissions;
FIG. 4.22—PM Concentration;
FIG. 4.23—CO concentration of emissions;
FIG. 4.24—Exhaust manifold temperature;
FIG. 4.25—$NO_x$ concentration of emissions;
FIG. 5.1—Segment of the FTP-75 driving cycle;
FIG. 5.2—Engine speed;
FIG. 5.3—Gas-pedal position rate representing a driver's driving style;
FIG. 5.4—Gas-pedal position rate representing a driver's driving style (zoom-in);
FIG. 5.5—Injection timing;
FIG. 5.6—Injection timing (zoom-in);
FIG. 5.7—Fuel mass injection duration (zoom-in);
FIG. 5.8—Fuel mass injected per cylinder (zoom-in);
FIG. 5.9—VGT vane position;
FIG. 5.10—VGT vane position (zoom-in);
FIG. 5.11—Fuel consumption for the driving cycle;
FIG. 5.12—Emission temperature in the exhaust manifold;
FIG. 5.13—$NO_x$ concentration of emissions (zoom-in); and
FIG. 6 is a schematic block diagram illustrating the Electronic Control Unit (ECU) of an engine incorporating static correlation maps (derived during engine calibration process and suited for low fuel consumption, emissions, etc.) between engine operating conditions (operating point) and values of the controllable variables, e.g., injection timing, EGR, VVT, VVA, etc.; for each engine operating point the ECU provides the optimal set values (reference points) of these variables.

DETAILED DESCRIPTION OF THE PREFERRED EMBODIMENT(S)

TABLE OF CONTENTS

| | |
|---|---|
| CHAPTER 1 | |
| 1.1 Motivation | 18 |
| 1.2 Advancements in Engine Electronic Control Units | 19 |
| 1.3 State-of-the-Art Engine Calibration Methods | 20 |
| 1.3.1 Design of Experiments | 21 |
| 1.3.2 Dynamic Model-Based Calibration Systems | 21 |
| 1.3.3 Calibration using Artificial Neural Networks | 22 |
| 1.3.4 Simulation-Based Calibration Systems | 23 |
| 1.4 Objective of at Least One Embodiment of the Invention | 23 |
| 1.5 Outline | 24 |
| CHAPTER 2 | |
| SYSTEM IDENTIFICATION AND STOCHASTIC CONTROL | 25 |
| 2.1 Modeling Engine Operation as a Stochastic Process | 26 |
| 2.2 Sequential Decision-Making Problems Under Uncertainty | 27 |
| 2.2.1 Deterministic System Model | 28 |
| 2.2.2 Stochastic System Model | 30 |
| 2.3 Markov Decision Process | 33 |
| 2.3.1 The Cost of a Markov Control Policy | 34 |
| 2.4 Dynamic Programming Algorithm | 36 |
| 2.4.1 Optimal Control Policy | 37 |
| 2.5 Engine Identification and Stochastic Control: Problem Definition | 37 |
| CHAPTER 3 | |
| REAL-TIME, SELF-LEARNING SYSTEM IDENTIFICATION | 39 |
| 3.1 Reinforcement Learning Algorithms | 46 |
| 3.2 Identification and Stochastic Adaptive Control | 48 |
| 3.3 Finite State Controlled Markov Chains | 52 |
| 3.3.1 Classification of States in a Markov Chain | 53 |
| 3.4 The Predictive Optimal Decision-Making Computational Model | 55 |
| 3.4.1 Construction of the POD State Space Representation | 56 |
| 3.4.2 Self-Learning System Identification | 58 |
| 3.4.3 Stationary Distributions and the Limit Theorem | 60 |
| 3.4.4 Convergence of POD Model | 62 |
| 3.5 Concluding Remarks | 67 |
| CHAPTER 4 | |
| REAL-TIME STOCHASTIC CONTROL | 67 |
| 4.1 The Predictive Optimal Stochastic Control Algorithm | 69 |
| 4.1.1 Performance Bound of POSCA | 71 |

TABLE OF CONTENTS
-continued

| | |
|---|---|
| 4.2 Real-Time, Self-Learning Optimization of Engine Calibration | 76 |
| 4.3 Application: Self-Learning Spark Ignition in a Gasoline Engine | 78 |
| 4.3.1 Simulation Results | 80 |
| 4.4 Application: Self-Learning Injection Timing in a Diesel Engine | 81 |
| 4.4.1 Simulation Results | 81 |
| 4.5 Concluding Remarks | 83 |
| CHAPTER 5 DECENTRALIZED LEARNING | 84 |
| 5.1 Decentralized Learning in Finite Markov Chains | 87 |
| 5.2 Game Theory | 89 |
| 5.3 The Decentralized Learning Control Scheme in POD Domain | 90 |
| 5.3.1 Existence of a Nash Equilibrium | 92 |
| 5.4 Decentralized Learning in Engine Calibration | 94 |
| 5.5 Application: Decentralized Learning in a Diesel Engine | 96 |
| 5.5.1 Simulation Results | 97 |
| 5.6 Concluding Remarks | 98 |
| CONCLUSIONS | 99 |
| 6.1 Summary | 99 |
| 6.2 Summary of Contributions | 101 |

CHAPTER 1

The following references are referenced in this Chapter:

[1] Roepke, K. and Fischer, M., "Efficient Layout and Calibration of Variable Valve Trains," SAE Transactions—Journal of Engines, v. 110, 2001, SAE 2001-01-0668.

[2] Stuhler, H., Kruse, T., Stuber, A., Gschweitl, K., Piock, W., Pfluegl, H., and Lick, P., "Automated Model-Based GDI Engine Calibration Adaptive Online DoE Approach," SAE 2002 World Congress, Detroit, Mich., Mar. 3-7, 2002, SAE 2002-01-0708.

[3] Brooks, T., Lumsden, G., and H. Blaxill, "Improving Base Engine Calibrations for Diesel Vehicles Through the Use of DoE and Optimization Techniques," Powertrain and Fluid Systems Conference and Exhibition, San Antonio, Tex., USA, Sep. 24-27, 2005, SAE 2005-01-3833.

[4] Knafl, A., Hagena, J. R., Filipi, Z. S., and Assanis, D. N., "Dual-Use Engine Calibration: Leveraging Modern Technologies to Improve Performance-Emissions Tradeoff," SAE Word Congress, Detroit, Mich., Apr. 11-14, 2005, SAE 2005-01-1549.

[5] Steiber, J., Trader, A., Reese, R., Bedard, M., Musial, M., and Treichel, B., "Development of an Engine Test Cell for Rapid Evaluation of Advanced Powertrain Technologies Using Model-Controlled Dynamometers," SAE Transactions—Journal of Passenger Cars—Electronics & Electrical Systems, v. 115, 2006, SAE 2006-01-1409.

[6] Schuette, H. and Ploeger, M., "Hardware-in-the-Loop Testing of Engine Control Units—A Technical Survey," SAE 2007 World Congress and Exhibition, Detroit, Mich., Apr. 16-19, 2007, SAE 2007-01-0500.

[7] Philipp, O., Buhl, M., Diehl, S., Huber, M., Roehlich, S., and Thalhauser, J., "Engine ECU Function Development Using Software-in-the-Loop Methodology," SAE 2005 World Congress and Exhibition, Detroit, Mich., 2005, SAE 2005-01-0049.

[8] Caraceni, A., Cristofaro, F. D., Ferrana, F., and Scala, S., "Benefits of Using a Real-Time Engine Model During Engine ECU Development," SAE 2003 World Congress and Exhibition, Mar. 3-6, 2003, SAE 2003-01-1049.

[9] Guerrier, M. and Cawsey, P., "The Development of Model-Based Methodologies for Gasoline IC Engine Calibration," SAE Transactions—Journal of Engines, v. 113, 2004, SAE 2004-01-1466.

[10] Rask, E. and Sellnau, M., "Simulation-Based Engine Calibration: Tools, Techniques, and Applications," SAE Transactions—Journal of Engines, v. 113, 2004, SAE 2004-01-1264.

[11] Wu, H., "Decentralized Iterative Learning Control for a Class of Large Scale Interconnected Dynamical Systems," Journal of Mathematical Analysis and Applications, vol. 327, pp. 233-45, 2007.

[12] Jankovic, M. and Magner, S., "Fuel Economy Optimization in Automotive Engines," Proceedings of the 2006 American Control Conference, Minneapolis, Minn., USA, 2006.

[13] Hagena, J. R., Filipi, Z. S., and Assanis, D. N., "Transient Diesel Emissions: Analysis of Engine Operation During a Tip-In," SAE 2006 World Congress, Detroit, Mich., Apr. 3-6, 2006, SAE 2006-01-1151.

[14] Atkinson, C. and Mott, G., "Dynamic Model-Based Calibration Optimization: An Introduction and Application to Diesel Engines," SAE World Congress, Detroit, Mich., Apr. 11-14, 2005, SAE 2005-01-0026.

[15] Rakopoulos, C. D., Giakoumis, E. G., Hountalas, D. T., and Rakopoulos, D. C., "The Effect of Various Dynamic, Thermodynamic and Design Parameters on the Performance of a Turbocharged Diesel Engine Operating under Transient Load Conditions," SAE 2004 World Congress and Exhibition, Detroit, Mich., Apr. 8-11, 2004, SAE 2004-01-0926.

[16] Wijetunge, R. S., Brace, C. J., Hawley, J. G., Vaughan, N. D., Horroocks, R. W., and Bird, G. L., "Dynamic Behavior of a High-Speed, Direct-Injection Diesel Engine," SAE Transactions—Journal of Engines, v. 108, 1999, SAE 1999-01-0829.

[17] Clark, N. N., Gautam, M., Rapp, B. L., Lyons, D. W., Graboski, M. S., McCormick, R. L., Alleman, T. L., and National, P. N., "Diesel and CNG Transit Bus Emissions Characterization by Two Chassis Dynamometer Laboratories: Results and Issues," SAE Transactions—Journal of Fuels and Lubricants, v. 108, 1999, SAE 1999-01-1469.

18] Samulski, M. J. and Jackson, C. C., "Effects of Steady-State and Transient Operation on Exhaust Emissions from Nonroad and Highway Diesel Engines," SAE Transactions—Journal of Engines, v. 107, 1998, SAE 982044.

[19] Green, R. M., "Measuring the Cylinder-to-Cylinder EGR Distribution in the Intake of a Diesel Engine During Transient Operation," SAE Transactions—Journal of Engines, v. 109, 2000, SAE 2000-01-2866.

[20] Clarke, G. M. and Kempson, R. E., Introduction to the Design and Analysis of Experiments, Hodder Arnold, November 1996.

[21] Hicks, C. R. and Turner, K. V., Fundamental Concepts in the Design of Experiments, $5^{th}$ edition, Oxford University Press, USA, March 1999.

[22] Diamond, W. J., Practical Experiment Designs: for Engineers and Scientists, $3^{rd}$ edition, John Wiley & Sons, February 2001.

[23] Montgomery, D. C., Design and Analysis of Experiments, $4^{th}$ edition, John Wiley and Sons, 1997.

[24] Papalambros, P. Y. and Wilde, D. J., Principles of Optimal Design: Modeling and Computation, 2nd edition, Cambridge University Press, July 2000.

[25] Edwards, S. P., Grove, D. M., and Wynn, H. P., Statistics for Engine Optimization, $1^{st}$ edition, John Wiley & Sons Canada, December 2000.

[26] Amann, M., Buckingham, J., and Kono, N., "Evaluation of HCCI Engine Potentials in Comparison to Advanced Gasoline and Diesel Engines," Powertrain and Fluid Sys-

[27] Ghauri, A., Richardson, S. H., and Nightingale, C. J. E., "Variation of Both Symmetric and Asymmetric Valve Events on a 4-Valve SI Engine and the Effects on Emissions and Fuel Economy," SAE 2000 World Congress, Detroit, Mich., Mar. 6-9, 2000, SAE 2000-01-1222.

[28] Regner, G., Teng, H., Wieren, P. V., Park, J. I., Park, S. Y., and Yeom, D. J., "Performance Analysis and Valve Event Optimization for SI Engines Using Fractal Combustion Model," Powertrain and Fluid Systems Conference and Exhibition, Toronto, Ontario, Canada, Sep. 16-19, 2006, SAE 2006-01-3238.

[29] Ayeb, M., Theuerkauf, H. J., and Winsel, T., "SI Engine Emissions Model Based on Dynamic Neural Networks and D-Optimality," SAE World Congress, Detroit, Mich., Apr. 11-14, 2005, SAE 2005-01-0019.

[30] Brahma, I., He, Y., and Rutland, C. J., "Improvement of Neural Network Accuracy for Engine Simulations," Powertrain and Fluid Systems Conference and Exhibition, Pittsburgh, Pa., Sep. 27-30, 2003, SAE 2003-01-3227.

[31] Lowe, D. and Zapart, K., "Validation of Neural Networks in Automotive Engine Calibration," Proceedings of the Fifth International Conference on Artificial Neural Networks, pp. 221-6, Cambridge, UK, 1997.

[32] Meyer, S. and Greff, A., "New Calibration Methods and Control Systems with Artificial Neural Networks," SAE 2002 World Congress, Detroit, Mich., Mar. 4-7, 2002, SAE 2002-01-1147.

[33] Burk, R., Jacquelin, F., and Wakeman, R., "A Contribution to Predictive Engine Calibration Based on Vehicle Drive Cycle Performance," SAE 2003 World Congress, Detroit, Mich., USA, Mar. 3-6, 2003, SAE 2003-01-0225.

[34] Jacquelin, F., Burk, R., and Wakeman, R. J., "Cam Phaser Actuation Rate Performance Impact on Fuel Consumption and $NO_x$ Emissions Over the FTP-75 Drive Cycle," SAE 2003 World Congress, Detroit, Mich., USA, 2003, SAE 2003-01-0023.

1.1 Motivation

Current calibration methods generate a static tabular relationship between the optimal values of the controllable variables and steady-state operating points or specific driving conditions (e.g., vehicle speed profiles for highway and city driving). This relationship is incorporated into the electronic control unit (ECU) of the engine to control engine operation. While the engine is running, values in the tabular relationships are interpolated to provide the values of the controllable variables for each engine operating point. These calibration methods, however, seldom guarantee optimal engine operation for common driving habits (e.g., stop and go driving, rapid acceleration, or rapid braking). Each individual driving style is different and rarely meets those driving conditions of testing for which the engine has been calibrated to operate optimally. Consumers often complain that their new cars simply cannot achieve the gas mileage estimate displayed on the window sticker or featured in advertisements.

1.2 Advancements in Engine Electronic Control Units

Advanced internal combustion engine technologies have led to increased opportunities for use of Electronic Control Units (ECUs). Current ECUs perform a variety of control tasks using engine calibration static maps that provide the values of several controllable variables. These values are then used as references by actuators to maintain optimal engine operation. In traditional ECU development processes, engine calibration maps are generated experimentally by extensive steady-state engine operation and step function changes of engine speed and load [1-4]. This is usually accompanied by simple transient operation limited by dynamometer capabilities and simulation technologies [5]. However, steady-state and simple transient engine operation is only partially indicative of actual engine operation in a vehicle. Increased sophistication of ECUs coupled with engine technologies can lead to significant calibration improvements.

Advances in computing technology have enabled simulation-based methods such as Hardware in the Loop (HiL) and Software in the Loop (SiL) test systems [6, 7]. HiL systems have been widely utilized as powerful methods for implementing engine calibration maps. These systems involve a real-time simulation engine model and a vehicle system connected to the ECU hardware. HiL systems allow the ECU development through simulation of powertrain components and vehicle system. SiL systems are more recent approaches, in which the engine model is integrated with the ECU software, and run on a computer [8]. SiL allows selective tests of single calibration tasks and separate modules of the ECU early in the development process. An essential requirement of HiL and SiL systems is the availability of an engine model capable of generating physical and consistent outputs of a combustion engine based on actual inputs.

1.3 State-of-the-Art Engine Calibration Methods

HiL and SiL systems aim to provide automated software tools for generating and validating calibration maps during the ECU development process. Various methods for deriving these maps at steady-state and limited transient engine operation have been extensively reported in the literature [9-12]. These efforts have been valuable in understanding steady-state operation, and optimizing fuel economy and emissions in the last years [13]. However, continuously optimal engine operation has not yet been possible. State-of-the-art engine calibration methods rely on static correlations for steady-state operating points accompanied by transient vehicle testing. The calibration process, its duration, and its cost grow exponentially with the number of controllable variables, and optimal calibration for the entire feasible engine operating domain cannot be guaranteed. Even for engines with simple technologies, achievement of optimal calibration may become impractical [10]. In addition, current calibration methods cannot guarantee optimal engine operation in transient cases encountered in driving styles of different drivers [14]. Transient operation constitutes the largest segment of engine operation over a driving cycle compared to the steady-state one [15, 16]. Fuel consumption and emissions during transient operation are extremely complicated [16], vary significantly with each particular driving cycle [17, 18], and are highly dependent upon the calibration [18, 19]. Engine operating points, during the transient period before their steady-state value is reached, are associated with different Brake-Specific Fuel Consumption (BSFC) values, depending on the directions, as shown in FIG. 1.1, from which they have been arrived, illustrated qualitatively in FIG. 1.2. Pollutant emissions such as $NO_x$, and particulate matters, demonstrate the same qualitative behavior, as shown by Hagena et al. [13].

1.3.1 Design of Experiments

Exhaustive investigation of the controllable variables with respect to all potential engine operating points requires a huge amount of testing. With the increasing number of these variables in current engine technologies, the required effort for testing grows exponentially. Design of Experiments (DoE) [20-23] is typically used to reduce the scope of the experiments required to derive the optimal engine calibration correlation under steady-state operating conditions. The main objective of this method is to expedite dynamometer tests significantly using a smaller subset of tests. This subset is utilized either in implementing engine calibration experimentally or in developing mathematical models for evaluating engine output. Using these models, optimization methods can determine the engine calibration static correlations between steady-state operating points and the controllable engine variables [24].

DoE has been widely used as the baseline calibration method for the last several years. Major applications include catalyst system optimization [25], optimization of variable valve trains for performance and emissions [26-28], and implementation of dynamic model-based engine calibrations. DoE employs statistics to generate a matrix of test points to explore the behavior or a physical system. The method relies on statistical data to determine a set of models that describe the system responses when some variables vary. In applying DoE to engine calibration, the objective is to define the coefficients of polynomial equations that can represent engine output over the range of the various controllable variables.

1.3.2 Dynamic Model-Based Calibration Systems

Dynamic model-based calibration methods utilize high-fidelity dynamic engine models. The data required to develop these models are obtained by operating the engine through a set of transient dynamometer tests while the engine calibration is perturbed in real time by a reconfigurable rapid prototyping control system. The predictive engine model produced in this fashion utilizes a combination of equation-based and neural network methods. DoE-experimental calibration is well suited only for steady-state engine operation over some driving cycle. In contrast, dynamic modeling produces a transient or dynamic engine model capable of predicting engine operating cycle. The steady-state optimal engine calibration can be produced from the transient engine model as a sub-set of the transient engine operation. Guerrier et al. [9] employed DoE and advanced statistical modeling to develop empirical models to enhance the powertrain control module calibration tables. Stuhler et al. [2] implemented a standardized and automated calibration environment, supporting the complexity of gasoline direct injection engines, for an efficient calibration process using an online DoE to decrease the calibration cost. Rask et al. [10] developed a dynamic-based calibration method to rapidly generate optimized maps for a V6 engine equipped with two-step variable valve actuation and intake cam phasing. Engine models employed in dynamic model-based calibration methods can predict engine output over transient operation within the data utilized to calibrate the models. However, not all the correlations of optimal values of the controllable engine variables associated with the transient operating points can be quantified explicitly; to pre-specify the entire transient engine operation is impractical, and thus, engine calibration correlations cannot be optimized for these cases a priori.

1.3.3 Calibration Using Artificial Neural Networks

Various approaches have been proposed for using artificial neural networks (ANNs) to promote modeling and calibration of engines [11, 29-32]. Neural networks are non-linear statistical data modeling tools. They can be used to model complex relationships between inputs and outputs or to find patterns in data. ANNs are application-specific and exhibit unpredictable behavior when previously unfamiliar data are presented to them. These difficulties increase if a nonlinear dynamic presentation of a system is to be realized, because of the increasing number of possibilities related to the dynamics and the interactions between the input signals. ANNs are suited for formulating objective functions, evaluating the specified engine performance indices with respect to the controllable engine variables and, thus, deriving the engine calibration correlations. They are computationally efficient for optimization requiring hundreds of function evaluations. However, optimal engine calibration for the entire engine operating domain is seldom guaranteed even for steady-state operating points. Moreover, the correlations between optimal values of the controllable engine variables and the transient operating points, overall, cannot be quantified explicitly, prohibiting a priori optimal engine calibration.

1.3.4 Simulation-Based Calibration Systems

Efforts in addressing transient operation have focused on simulation-based methods to derive calibration maps for transients of particular driving cycles. Burk et al. [33] presented the necessary procedures required to utilize co-simulation techniques with regard to predicting engine drive cycle performance for a typical vehicle. Jacquelin et al. [34] utilized analytical tools to run the FTP-75 driving cycle through pre-computed engine performance maps, depending on engine speed, load, intake and exhaust cam centerline positions. Atkinson et al. [14] implemented a dynamic system to provide optimal calibration for transient engine operation of particular driving cycles. These methods utilize engine models sufficiently accurate to portray fuel economy and feed-gas emissions during transient engine operation. However, identifying all possible transients, and thus deriving optimal values of the controllable variables through calibration maps for those cases a priori, is infeasible.

1.4 Objective of at Least One Embodiment of the Invention

Work towards implementing the theory and the algorithmic implementation that allow the engine of a vehicle to become an autonomous intelligent system is disclosed herein. The engine should be able to realize in real time its optimal calibration with respect to both steady-state and transient operating points designated by the driver's driving style.

The problem of deriving the optimal values of the controllable variables for engine operating point transitions compromises of two major sub-problems. The first concerns exploitation of the information acquired from the engine operation to identify its behavior, that is, how an engine representation can be built by observing engine operating point transitions. In control theory, this is addressed as a state estimation and system identification problem. The second concerns assessing the engine output with respect to alternative values of the controllable variables (control policies), and selecting those that optimize specified engine performance indices. This forms a stochastic control problem. In this context, the engine is treated as a controlled stochastic system and engine calibration is formulated as a sequential decision-making problem under uncertainty.

The objective is to make the engine capable of learning the optimal values of the engine variables in real time while the driver drives the vehicle. The engine progressively perceives the driver's driving style and eventually learns the optimal calibration for this driving style. The longer the engine runs during a particular driving style, the better the engine's specified performance criteria will be. The engine's ability to learn its optimum operation is not limited, however, to a particular driving style. The engine can learn to operate optimally for different drivers, although the drivers should indicate their identities before starting the vehicle. The engine can then adjust its calibration to be optimal for a particular driver based on what it has learned in the past regarding his/her driving style.

The ultimate goal of the invention disclosed herein is to fully exploit the engine's given technology in terms of the maximum specified performance criteria, e.g., engine power, fuel economy, and pollutant emissions that can be achieved. It aims to provide an answer to the following question: For an engine with a given technology, what are the maximum performance criteria that a driver can get with respect to his/her driving habits?

1.5 Outline

This application is organized as follows. Chapter 2 presents the theory for building computational models suitable for real-time sequential decision-making under uncertainty. These models are essential traits of any intelligent or rational system that selects control actions after every perception, so that a long-term reward (cost) is maximized (minimized). Efforts in implementing these models are reviewed in that chapter. Chapter 3 portrays a real-time computational learning model suitable to solve the state estimation and system identification sub-problem. Chapter 4 introduces the algorithmic structure of the decision-making mechanism suitable for real-time implementation. The algorithm solves the stochastic control sub-problem by utilizing accumulated data acquired over the learning process of the computational model. The increase of the problem's dimensionality, when more than one controllable variable is considered, is addressed by a decentralized learning control scheme presented in Chapter 5. This scheme draws from multi-agent learning research in a range of areas, including reinforcement learning, and game theory, to coordinate optimal behavior among the various controllable variables. The engine is considered as a cooperative multi-agent system, in which the subsystems, i.e., controllable variables, are treated as autonomous rational agents who strive interactively and jointly to optimize engine performance indices. In Chapter 6, the contributions are summarized. Relevant references are included at the end of each chapter.

CHAPTER 2

System Identification and Stochastic Control

The following references are referenced in this Chapter:
[1] Bertsekas, D. P., Dynamic Programming and Optimal Control (Volumes. 1 and 2), Athena Scientific, September 2001.
[2] Bertsekas, D. P. and Shreve, S. E., Stochastic Optimal Control: The Discrete-Time Case, $1^{st}$ edition, Athena Scientific, February 2007.
[3] Bertsekas, D. P. and Tsitsiklis, J. N., Neuro-Dynamic Programming (Optimization and Neural Computation Series), $1^{st}$ edition, Athena Scientific, May 1996.
[4] Kumar, P. R. and Varaiya, P., Stochastic Systems, Prentice Hall, June 1986.
[5] Kemeny, J. G. and Snell, J. L., Finite Markov Chains, $1^{st}$ edition, Springer, Dec. 5, 1983.
[6] Krishnan, V., Probability and Random Processes, $1^{st}$ edition, Wiley-Interscience, Jul. 11, 2006.
[7] Puterman, M. L., Markov Decision Processes: Discrete Stochastic Dynamic Programming, 2nd Rev. edition, Wiley-Interscience, 2005.
[8] Bellman, R., Dynamic Programming. Princeton, N.J., Princeton University Press, 1957.

This chapter presents the underlying theory for building computational models suitable for real-time sequential decision-making under uncertainty. The engine is treated as a controlled stochastic system and engine calibration is formulated as a sequential decision-making problem under uncertainty. The goal is to make the engine an autonomous intelligent system that can select the values of the controllable variables in real time, for each engine operating point transition, which optimize specified engine performance criteria. In essence, we seek an optimal calibration that can be achieved for steady-state and transient engine operating points resulting from the driver's driving style.

2.1 Modeling Engine Operation as a Stochastic Process

Engines are streamlined syntheses of complex physical processes determining a convoluted dynamic system. They are operated with reference to engine operating points and the values of various engine controllable variables. At each operating point, these values highly influence engine performance criteria, e.g., fuel economy, emissions, or acceleration. This influence becomes more important at engine operating point transitions designated partly by the driver's driving style and partly by the engine's controllable variables. Consequently, the engine is a system whose behavior is not completely foreseeable, and its future evolution (operating point transitions) depends on the driver's driving style.

We seek a method to derive the optimal values of the controllable variables for each engine operating point transition that optimize engine performance criteria. These values are selected at points of time referred to as decision epochs (or stages), when the time domain can be either discrete or continuous. In our case, discrete time is employed because of the discreteness in the values of the controllable variables (control actions). The engine output is sampled at the decision epochs.

The engine performance criteria are treated as controlled random functions, the engine is treated as a controlled stochastic system, and engine operation is modeled as a stochastic process. The problem of engine calibration is thus reformulated as a sequential decision-making problem under uncertainty. The goal is to select the values of the controllable variables for each engine operating point in real time that optimize the random functions representing the engine performance criteria.

2.2 Sequential Decision-Making Problems Under Uncertainty

Sequential decision models [1, 2] are mathematical abstractions of situations in which decisions must be made in several decision epochs while incurring a certain cost (or reward) at each epoch. Each decision may influence the circumstances under which future decisions will be made, and thus, the decision maker must balance his/her desire to minimize (maximize) the cost (reward) of the present decision against his/her desire to avoid future situations where high cost is inevitable.

An example of a decision-making process involves portfolio management. An investor must balance his/her desire to achieve immediate return against a desire to avoid investments in areas where low long-term yield is probable. The current decision will depend also on his/her assessment of the areas with high long-term profit. This assessment is a problem of state estimation, and the decision to be made by the decision maker is formulated as a stochastic control problem, which requires a solution of the estimation problem first. The prediction of areas with high profit can be expressed as the conditional expectation $E\{r_{k+1}|r_k\}$ of the next period's value given the present period's value. Consequently, the state estimation problem requires the knowledge of the probability distribution of the value of the areas to be invested. The estimation of the relevant probability distribution is the problem of identification (or system identification). In most situations of decision-making in a stochastic environment, the problems of identification, estimation, and control are all tied together. The deterministic and stochastic system models aim to provide the mathematical framework for analysis of the sequential decision-making problem in deterministic and stochastic environments, respectively.

2.2.1 Deterministic System Model

A broadly applicable model of discrete-time deterministic optimal control of a dynamic system over a finite number of stages $M \in \mathbb{N}$ (a finite horizon) has two principal features: (a) an underlying discrete-time dynamic system, and (b) a cost function that is additive over time. The dynamic system expresses the evolution of the system's "state," under the influence of decisions made at discrete instances of time. The deterministic dynamic system [3] is described by the general system equation $$s_{k+1} = f_k(s_k, a_k), k = 0, 1, \ldots, M-1, \tag{2.1}$$

where $s_k \in \mathbb{R}^n$ is the column vector of system's states, which belong to some state space $S$, and $a_k \in \mathbb{R}^m$ is the input at time $k$; $a_k$ represents the vector of control actions chosen by the decision maker from some feasible action set $A(s_k)$, which is a subset of some control space $A$. The system output is represented by the equation $$y_k = h_k(s_k, a_k), k = 0, 1, \ldots, M-1, \tag{2.2}$$

where $y_k \in \mathbb{R}^p$.

Without loss of generality, the following discussion will refer to the one-dimensional deterministic system model, namely, $$s_{k+1} = f_k(s_k, \alpha_k), k = 0, 1, \ldots, M-1, \tag{2.3}$$

$$y_k = h_k(s_k, \alpha_k). \tag{2.4}$$

An important property of the system described by Eq. (2.3) is that the current state $s_k$ and the sequence of control actions $a_k, a_{k+1}, \ldots, a_{k+m}$ determine the state $s_{k+m+1}$ independently of the past values of state and control actions $s_{k-1}, s_{k-2}, \ldots$, $a_{k-1}, a_{k-2}, \ldots$, that is, there is a function $f_{k+m+1,k}$ such that $$s_{k+m+1} = f_{k+m+1,k}(s_k, a_k, \ldots, a_{k+m}). \tag{2.5}$$

The cost incurred at the kth decision epoch is given by a function $c(s_k, a_k)$. We seek a finite sequence of functions $\pi = \{\mu_0, \mu_1, \ldots, \mu_{M-1}\}$, defined as a control policy, which minimizes the total cost over M decision epochs. The functions $\mu_k$ specify the control $a_k = \mu(s_k)$ that will be chosen when at kth decision epoch the state is $s_k$. Consequently, the total cost corresponding to a policy $\pi = \{\mu_0, \mu_1, \ldots, \mu_{M-1}\}$, and initial state $s_0$ is given by $$J^\pi(s_0) = \sum_{k=0}^{M-1} c(s_k, \mu(s_k)), \tag{2.6}$$

where the states $s_1, s_2, \ldots, s_{M-1}$ are generated from $s_0$ and $\pi$ via the systems equation $$s_{k+1} = f_k(s_k, \mu(s_k)), k = 0, 1, \ldots, M-1. \tag{2.7}$$

At each initial state $s_0$ and $\pi$, there is a corresponding sequence of control actions $a_0, a_1, \ldots, a_{M-1}$, where $a_k = \mu(s_k)$ and $s_k$ is generated by Eq. (2.7). An alternative formulation of the problem includes the selection of a sequence of control actions, rather than a policy $\pi$, minimizing the following total cost $$J(s_0) = \sum_{k=0}^{M-1} c(s_k, a_k). \tag{2.8}$$

The deterministic optimal control problem is representative of a plethora of sequential decision-making problems of practical interest, and it constitutes the basis of the stochastic system model.

2.2.2 Stochastic System Model

The stochastic system model [3, 4] establishes the mathematical framework for the representation of dynamic systems such as engines that evolve stochastically over time. The discrete-time stochastic optimal control problem is obtained from the deterministic problem when the system includes a stochastic disturbance or noise at time $k$, $w_k$, in its portrayal. Consequently, Eq. (2.3) is replaced by the equation $$s_{k+1} = f_k(s_k, a_k, w_k), k = 0, 1, \ldots, M-1. \tag{2.9}$$

The sequence $\{w_k, k \geq 0\}$ is a stochastic process with a given probability law; that is, the joint probability distribution of the random variables $w_0, w_1, \ldots, w_k$ is known for each $k$. When the state is not directly observed, it is necessary to augment the state Eq. (2.9) with the equation $$y_k = h_k(s_k, v_k), k = 0, 1, \ldots, M-1, \tag{2.10}$$

where $y_k$ is the observation or system's output and $v_k$ is the measurement error or noise. The sequence $\{v_k, k \geq 0\}$ is a stochastic process with known probability distribution. If in Eq. (2.10) $h_k(s_k, v_k) = s_k$, then the system is completely observed, namely, $y_k = s_k$, whereas if $y_k \neq s_k$ the system is partially observed.

The system's state $s_k$ depends upon the input sequence $a_0, a_1, \ldots, a_{M-1}$ as well as the random variables $w_0, w_1, \ldots, w_k$, Eq. (2.9). Consequently, $s_k$ is a random variable; the system output $y_k = h_k(s_k, v_k)$ is a function of the random variables $s_0, s_1, \ldots, v_0, v_1, \ldots$, and thus, is also a random variable. Similarly, the sequence of control actions $a_k = \mu(s_k)$, $\{a_k, k \geq 0\}$, constitutes a stochastic process.

Definition 2.1 [4]. The random variables $s_0, w_0, w_1, \ldots$, $v_0, v_1 \ldots$, are addressed as basic random variables, since the sequences $\{s_k, k \geq 0\}$ and $\{a_k, k \geq 0\}$ are constructed from them.

As shown in the previous section, the deterministic system model, Eq. (2.3), imposes the property that the state $s_{k+1}$ at time $k+1$ is completely determined once $s_k$ and $a_k$ are known. It is desirable for the stochastic system model, Eq. (2.9), to retain an analogous property by imposing a condition directly on the basic random variables. That is, whether the conditional probability distribution of $s_{k+1}$ given $s_k$ and $a_k$ is independent of previous values of states and control actions. Suppose the control policy $\pi = \{\mu_0, \mu_1, \ldots, \mu_{M-1}\}$ is employed. The corresponding stochastic processes $\{s_k^\pi, k \geq 0\}$, $\{y_k^\pi, k \geq 0\}$ and $\{a_k^\pi, k \geq 0\}$ are defined by $$s_{k+1}^\pi = f_k(s_k^\pi, a_k^\pi, w_k), s_0^\pi = s_0,$$

$$y_k^\pi = h_k(s_k^\pi, v_k). \tag{2.11}$$

Suppose further that the values realized by the random variables $s_k$ and $a_k$ are known. These values are insufficient to determine the value of $s_{k+1}$ since $w_k$ is not known. The value of $s_{k+1}$ is statistically determined by the conditional distribution of $s_{k+1}$ given $s_k$ and $a_k$, namely $$P_{s_{k+1}|s_k, a_k}^\pi(\bullet|s_k, a_k). \tag{2.12}$$

For any subset $S_{k+1}$, that is, the state space at time $k+1$, and from Eq. (2.11), we have $$P_{s_{k+1}|s_k, a_k}^\pi(S_{k+1}|s_k, a_k) = P_{w_k|s_k, a_k}^\pi(W_k|s_k, a_k), \tag{2.13}$$

where $W_k := \{w | f_k(s_k, a_k, w) \in S_k\}$.

The interpretation of Eq. (2.13) is that the conditional probability of reaching the state space $S_{k+1}$ at time $k+1$ given $s_k$ and $a_k$ is equal to the probability of being at the disturbance space $W_k$ at time $k$. Suppose that the previous values of the random variables $s_m$ and $a_m$, $m \leq k-1$ are known. The conditional distribution of $s_{k+1}$ given these values will be $$P_{s_{k+1}|s_k,a_k}^{\pi}(S_{k+1}|s_k,\ldots,s_0,a_k,\ldots,a_0) = P_{w_k|s_k,a_k}^{\pi}(W_k|s_k,\ldots,s_0,a_k,\ldots,a_0). \tag{2.14}$$

The conditional probability distribution of $s_{k+1}$ given $s_k$ and $a_k$ can be independent of the previous values of states and control actions, if it is guaranteed that for every control policy $\pi$, $w_k$ is independent of the random variables $s_m$ and $a_m$, $m \leq k-1$.

Kumar and Varaiya [4] proved that this property is imposed under the following assumption.

Assumption 2.1. The basic random variables $s_0$, $w_0, w_1, \ldots, v_0, v_1, \ldots$, are all independent.

Assumption 2.1 imposes a condition directly to the basic random variables which eventually yields that the state $s_{k+1}$ depends only on $s_k$ and $a_k$. Moreover, the conditional probability distributions do not depend on the control policy $\pi$ can be dropped $$P_{s_{k+1}|s_k,a_k}^{\pi}(s_{k+1}|s_k,\ldots,s_0,a_k,\ldots,a_0) = P_{w_k|s_k,a_k}^{\pi}(s_{k+1}|s_k,a_k),$$

$$\text{or } P_{s_{k+1}|s_k,a_k}(s_{k+1}|s_k,\ldots,s_0,a_k,\ldots,a_0) = P_{s_{k+1}|s_k,a_k}(s_{k+1}|s_k,a_k). \tag{2.15}$$

A stochastic process $\{s_k, k \geq 0\}$ satisfying the condition of Eq. (2.15) is called a Markov Process and the condition is addressed as a Markov property.

Definition 2.2 [5]. A Markov process is a random process $\{s_k, k \geq 0\}$ with the property that given the values of the process from time zero up through the current time, the conditional probability of the value of the process at any future time depends only on its value at the current time. That is, the future and past are conditionally independent given the present.

Definition 2.3 [6]. When the state of a Markov process is discrete, then the process is called a Markov chain.

A large class of sequential decision-making problems under uncertainty can be modeled as a Markov Decision Process (MDP). MDP [7] provides the mathematical framework for modeling decision-making in situations where outcomes are partly random and partly under the control of the decision maker. Decisions are made at points of time referred to as decision epochs, and the time domain can be either discrete or continuous.

2.3 Markov Decision Process

The Markov decision process model consists of five elements: (a) decision epochs; (b) states; (c) actions; (d) the transition probability matrix; and (e) the transition cost (or reward) matrix. In this framework, the decision maker is faced with the problem of influencing system behavior as it evolves over time, by making decisions (choosing actions). The objective of the decision maker is to select the course of action (control policy) which causes the system to perform optimally with respect to some predetermined optimization criterion. Decisions must anticipate costs (or rewards) associated with future system states-actions.

At each decision epoch k, the system occupies a state $s_k = i$ from the finite set of all possible system states S.

$$S = \{1, 2, \ldots, N\}, N \in \mathbb{N}. \tag{2.16}$$

In this state $s_k \in S$, the decision maker has available a set of allowable actions, $a_k \in A(s_k)$, $A(s_k) \subseteq A$, where A is the finite action space $$A = \cup_{s_k \in S} A(s_k). \tag{2.17}$$

The decision-making process occurs at each of a sequence of decision epochs $k = 0, 1, 2, \ldots, M$, $M \in \mathbb{N}$. At each epoch, the decision maker observes a system's state $s_k = i$, $i \in S$, and executes an action $a_k \in A(s_k)$, from the feasible set of actions $A(s_k) \subseteq A$ at this state. At the next epoch, the system transits to the state $s_{k+1} = j$, $j \in S$ imposed by the conditional probabilities $p(s_{k+1} = j | s_k = i, a_k)$, designated by the transition probability matrix $P(\cdot, \cdot)$. The conditional probabilities of $P(\cdot, \cdot)$, $p: S \times A \to [0,1]$, satisfy the constraint $$\sum_{j=1}^{N} p(s_{k+1} = j | s_k = i, a_k) = 1, \tag{2.18}$$

where N is the cardinality of S, $N = |S|$.

Following this state transition, the decision maker receives a cost associated with the action $a_k$, $R(s_{k+1} = j | s_k = i, a_k)$, $R: S \times A \to \mathbb{R}$ as imposed by the transition cost matrix $R(\cdot, \cdot)$.

2.3.1 The Cost of a Markov Control Policy

The solution to an MDP can be expressed as an admissible control policy so that a given performance criterion is optimized over all admissible policies $\pi$. An admissible policy consists of a sequence of functions $$\pi = \{\mu_0, \mu_1, \ldots, \mu_{M-1}\}, \tag{2.19}$$

where $\mu_k$ maps states $s_k$ into actions $a_k = \mu_k(s_k)$ and is such that $\mu_k(s_k) \in A(s_k), \forall s_k \in S$.

A Markov policy $\pi$ determines the probability distribution of state process $\{s_k, k \geq 0\}$ and the control process $\{a_k, k \geq 0\}$. Different policies will lead to different probability distributions. In optimal control problems, the objective is to derive the optimal control policy that minimize (maximize) the accumulated cost (reward) incurred at each state transition per decision epoch. If a policy $\pi$ is fixed, the cost incurred by $\pi$ when the process starts from an initial state $s_0$ and up to the time horizon M is $$J^{\pi}(s_0) = \sum_{k=0}^{M-1} R_k(s_{k+1} = j | s_k = i, a_k), \tag{2.20}$$

$$\forall i, j \in S, \forall a_k \in A(s_k).$$

The accumulated cost $J_{\pi}(s_0)$ is a random variable since $s_k$ and $a_k$ are random variables. Hence the expected accumulated cost of a Markov policy is given by $$J^{\pi}(s_0) = \underset{\substack{s_k \in S \\ a_k \in A(s_k)}}{E} \left\{ \sum_{k=0}^{M-1} R_k(S_{k+1} = j | s_k = i, a_k) \right\} = \underset{\substack{s_k \in S \\ a_k \in A(s_k)}}{E} \left\{ \sum_{k=0}^{M-1} R_k(s_{k+1} = j | s_k = i, \mu_k(s_k)) \right\}. \tag{2.21}$$

The expectation is with respect to the probability distribution of $\{s_k, k \geq 0\}$ and $\{a_k, k \geq 0\}$ determined by the Markov policy $\pi$. Eq. (2.21) can readily be evaluated in terms of the transition probability matrix as follows:

$$J^{\pi}(s_0) = \sum_{k=0}^{M-1} \sum_{j=1}^{N} P_k(s_{k+1} = j | s_k = i, a_k) \cdot R_k(s_{k+1} = j | s_k = i, a_k). \tag{2.22}$$

Consequently, the control policy that minimizes Eq. (2.22) is defined as the optimal Markov policy $\pi^*$. Dynamic programming (DP) has been widely employed as the principal method for computing global optimal policies in sequential decision-making problems under uncertainty. Algorithms, such as value iteration, policy iteration, and linear programming, have been extensively utilized in solving deterministic and stochastic optimal control problems, Markov and semi-Markov decision problems, min-max control problems, and sequential games. While the nature of these problems may vary significantly, their underlying structures are very similar.

2.4 Dynamic Programming Algorithm

The Dynamic Programming (DP) [8] algorithm rests on the principle of optimality. The principle of optimality states the following fact [1]. Let $\pi^* = \{\mu^*_0, \mu^*_1, \ldots, \mu^*_{M-1}\}$ be an optimal policy for a finite decision-making problem, and assume that, when using $\pi^*$, a given state $s_k = i$ occurs at time k with positive probability. Consider the sub-problem whereby the process occupies the state $s_k = i$ at time k and wishes to minimize the accumulated cost from time k to time M, namely, $$\underset{\substack{s_k \in S \\ a_k \in A(s_k)}}{E} \left\{ R_M(s_M) + \sum_{k=0}^{M-1} R_k(s_{k+1} \mid s_k, a_k) \right\}, \quad (2.23)$$

where $R_M(s_M) = R_M(s_{M+1} \mid s_M, a_M)$.

Then the truncated policy $\{\mu^*_k, \mu^*_{k+1}, \ldots, \mu^*_{M-1}\}$ is optimal for the sub-problem.

The principle of optimality essentially suggests that an optimal policy can be constructed in piecemeal fashion, first constructing an optimal policy for the "tail subproblem" involving the last decision epoch, then extending the optimal policy to the "tail sub-problem" involving the last two decision epochs, and continuing in this manner until an optimal policy for the entire problem is derived. The DP algorithm is founded on the principle of backward induction. It proceeds sequentially, by solving all the tail subproblems of a given number of decision epochs, utilizing the solution of the tail subproblems of shorter number of decision epochs. The DP algorithm is stated as follows. For every initial state $s_0$, the optimal cost $J^{\pi^*}(s_0)$, given by Eq. (2.22), of the sequential decision-making problem under uncertainty is equal to $J_0(s_0)$, given by the last step of the following algorithm, which proceeds backward in time from the decision epoch M−1 to decision epoch 0:

$$J_M(s_M) = R_M(s_M) = R_M(s_{M+1} \mid s_M, a_M), \quad (2.24)$$

$$J_k(s_k) = \min_{a_k \in A(s_k)} \underset{s_k \in S}{E} \{R_M(s_M) + J_{k+1}(f_k(s_k, a_k, w_k))\},$$

$$k = 0, 1, \ldots, M-1.$$

2.4.1 Optimal Control Policy

The optimal policy $\pi^* = \{\mu^*_0, \mu^*_1, \ldots, \mu^*_M\}$ for the finite horizon problem can be derived by $$\pi^* = \underset{\pi \in \Pi}{\arg\min} J_0(s_0). \quad (2.25)$$

The finite-horizon model is appropriate when the decision-maker's "lifetime" is known, namely, the terminal epoch of the decision-making sequence. For problems with a very large number of decision epochs, however, the infinite-horizon model is more appropriate. In this context, the overall expected undiscounted cost is:

$$J_0(s_0) = \lim_{M \to \infty} \min_{\pi \in \Pi} J_0(s_0). \quad (2.26)$$

This relation is valuable computationally and analytically, and it holds under certain conditions [3].

2.5 Engine Identification and Stochastic Control: Problem Definition

The problem of deriving the optimal values of the controllable variables for engine operating transitions involves two major sub-problems. The first is exploitation of the information acquired from the engine output to identify its behavior. That is, how an engine representation can be built by observing engine operating point transitions is the state estimation and system identification problem. The second is assessment of the engine output with respect to alternative values of the controllable variables (control policies), and selecting those that optimize specified engine performance criteria, e.g., fuel economy, emissions, engine power, etc. The latter forms a stochastic control problem. Although computational considerations in many instances lead us to treat these three aspects separately, in our approach they are considered simultaneously in solving the engine calibration problem in real time, while the engine is running the vehicle.

The stochastic system model, Eq. (2.9), can provide a systematic treatment of the general engine identification and stochastic control problem. The model adapted to the engine, as illustrated in FIG. 2.1, is repeated here for easy reference $$s_{k+1} = f_k(s_k, a_k, w_k), k = 0, 1, \ldots, M-1,$$

$$y_k = h_k(s_k, v_k), \quad (2.27)$$

where $s_k$ represents the engine operating point, which belongs to the finite engine operating space S, and $a_k$ represent the values of the controllable variables at time k. These values belong to some feasible action set $A(s_k)$, which is a subset of the control space A. The sequence $\{w_k, k \geq 0\}$ is an unknown disturbance representing the driver while commanding the engine through the gas pedal position. This sequence is treated as a stochastic process with an unknown probability distribution; $y_k$ is the observation or engine's output, and $v_k$ is the measurement sensor error or noise. The sequence $\{v_k, k \geq 0\}$ is a stochastic process with unknown probability distribution.

The initial engine operating point $s_0$ along with the sequences of gas pedal position $\{w_k, k \geq 0\}$, and the sensor error $\{v_k, k \geq 0\}$ are assumed to be independent, which is a reasonable assumption in reality. In this context, the engine is treated as a stochastic system and engine operation can be considered as a stochastic process $\{s_k, k \geq 0\}$ which satisfies the condition of Eq. (2.15). Consequently, engine operation can be modeled as a Markov decision process with the cost function at each state (engine operating point) transition to be represented by the engine output (e.g., fuel economy, emissions, and engine power). The problem of engine calibration is thus formulated as a sequential decision-making problem under uncertainty.

At each decision epoch k, the engine operates at a given state $s_k$ designated partly by the driver $w_{k-1}$, and partly by the controllable variable $a_{k-1}$ at time k−1. On that basis the self-learning controller selects a value $a_k$. One decision epoch later, the engine transits to a new state $s_{k+1}$ and the controller observes the engine output $y_{k+1}=h_{k+1}(s_{k+1},v_{k+1})=R_k(s_{k+1}|s_k,a_k)$ associated with this state transition, as illustrated in FIG. 2.2.

The controller (decision maker) is faced with the problem of influencing engine operation as it evolves over time by selecting values of the controllable variables. The goal of the controller is to select the optimal control policy (optimum values of the controllable variables) for the sequences of engine operating point transitions, corresponding to the driver's driving style, that cause the engine to perform optimally with respect to some predetermined performance criterion (cost function).

A key aspect of this process is that decisions are not viewed in isolation since the controller simultaneously solves the state estimation and system identification subproblem by using the conditional probabilities of the sequence $\{s_k, k \geq 0\}$ given the sequence $\{a_k, k \geq 0\}$. Consequently, in the stochastic control problem the self-learning controller can select those values that balance the desire to minimize the cost function of the next engine operating transition against the desire to avoid future operating point transitions where high cost is inevitable. This approach aims to provide engine calibration that can capture transient engine designated by the driver's driving style.

CHAPTER 3

Real-Time, Self-Learning System Identification

The following references are referenced in this Chapter:
[1] Bertsekas, D. P. and Shreve, S. E., Stochastic Optimal Control: The Discrete-Time Case, 1$^{st}$ edition, Athena Scientific, February 2007.
[2] Gosavi, A., "Reinforcement Learning for Long-Run Average Cost," European Journal of Operational Research, vol. 155, pp. 654-74, 2004.
[3] Bertsekas, D. P. and Tsitsiklis, J. N., Neuro-Dynamic Programming (Optimization and Neural Computation Series, 3), 1$^{st}$ edition, Athena Scientific, May 1996.
[4] Sutton, R. S. and Barto, A. G., Reinforcement Learning: An Introduction (Adaptive Computation and Machine Learning), The MIT Press, March 1998.
[5] Borkar, V. S., "A Learning Algorithm for Discrete-Time Stochastic Control," Probability in the Engineering and Information Sciences, vol. 14, pp. 243-258, 2000.
[6] Samuel, A. L., "Some Studies in Machine Learning Using the Game of Checkers," IBM Journal of Research and Development, vol. 3, pp. 210-229, 1959.
[7] Samuel, A. L., "Some Studies in Machine Learning Using the Game of Checkers. II-Recent progress," IBM Journal of Research and Development, vol. 11, pp. 601-617, 1967.
[8] Sutton, R. S., Temporal Credit Assignment in Reinforcement Learning, PhD Thesis, University of Massachusetts, Amherst, Mass., 1984.
[9] Sutton, R. S., "Learning to Predict by the Methods of Temporal Difference," Machine Learning, vol. 3, pp. 9-44, 1988.
[10] Watkins, C. J., Learning from Delayed Rewards, PhD Thesis, Kings College, Cambridge, England, May 1989.
[11] Kaelbling, L. P., Littman, M. L., and Moore, A. W., "Reinforcement Learning: a Survey," Journal of Artificial Intelligence Research, vol. 4, 1996.
[12] Schwartz, A., "A Reinforcement Learning Method for Maximizing Undiscounted Rewards," Proceedings of the Tenth International Conference on Machine Learning, pp. 298-305, Amherst, Mass., 1993.
[13] Mahadevan, S., "Average Reward Reinforcement Learning: Foundations, Algorithms, and Empirical Results," Machine Learning, vol. 22, pp. 159-195, 1996.
[14] Sutton, R. S., "Integrated Architectures for Learning, Planning, and Reacting Based on Approximating Dynamic Programming," Proceedings of the Seventh International Conference on Machine Learning, pp. 216-224, Austin, Tex., USA, 1990.
[15] Sutton, R. S., "Planning by Incremental Dynamic Programming," Proceedings of the Eighth International Workshop on Machine Learning (ML91), pp. 353-357, Evanston, Ill., USA, 1991.
[16] Peng, J. and Williams, R. J., "Efficient Learning and Planning Within the Dyna Framework," Proceedings of the IEEE International Conference on Neural Networks (Cat. No. 93CH3274-8), pp. 168-74, San Francisco, Calif., USA, 1993.
[17] Kumar, P. R. and Varaiya, P., Stochastic Systems, Prentice Hall, June 1986.
[18] Mandl, P., "Estimation and Control in Markov Chains," Advances in Applied Probability, vol. 6, pp. 40-60, 1974.
[19] Borkar, V. and Varaiya, P., "Adaptive control of Markov chains. I. Finite parameter set," IEEE Transactions on Automatic Control, vol. AC-24, pp. 953-7, 1979.
[20] Borkar, V. and Varaiya, P., "Identification and adaptive control of Markov chains," SIAM Journal on Control and Optimization, vol. 20, pp. 470-89, 1982.
[21] Kumar, P. R., "Adaptive Control With a Compact Parameter Set," SIAM Journal on Control and Optimization, vol. 20, pp. 9-13, 1982.
[22] Doshi, B. and Shreve, S. E., "Strong Consistency of a Modified Maximum Likelihood Estimator for Controlled Markov Chains," Journal of Applied Probability, vol. 17, pp. 726-34, 1980.
[23] Kumar, P. R. and Becker, A., "A new Family of Optimal Adaptive Controllers for Markov Chains," IEEE Transactions on Automatic Control, vol. AC-27, pp. 137-46, 1982.
[24] Kumar, P. R. and Lin, W., "Optimal Adaptive Controllers for Unknown Markov Chains," IEEE Transactions on Automatic Control, vol. AC-27, pp. 765-74, 1982.
[25] Sato, M., Abe, K., and Takeda, H., "Learning Control of Finite Markov Chains with Unknown Transition Probabilities," IEEE Transactions on Automatic Control, vol. AC-27, pp. 502-5, 1982.
[26] Sato, M., Abe, K., and Takeda, H., "An Asymptotically Optimal Learning Controller for Finite Markov Chains with Unknown Transition Probabilities," IEEE Transactions on Automatic Control, vol. AC-30, pp. 1147-9, 1985.
[27] Sato, M., Abe, K., and Takeda, H., "Learning Control of Finite Markov Chains with an Explicit Trade-off Between Estimation and Control," IEEE Transactions on Systems, Man and Cybernetics, vol. 18, pp. 677-84, 1988.
[28] Kumar, P. R., "A Survey of Some Results in Stochastic Adaptive Control," SIAM Journal on Control and Optimization, vol. 23, pp. 329-80, 1985.
[29] Varaiya, P., "Adaptive Control of Markov Chains: A Survey," Proceedings of the IFAC Symposium, pp. 89-93, New Delhi, India, 1982.
[30] Lai, T. L. and Robbins, H., "Asymptotically Efficient Adaptive Allocation Rules," Advances Appl. Math., vol. 6, pp. 4-22, 1985.
[31] Anantharam, V., Varaiya, P., and Walrand, J., "Asymptotically Efficient Allocation Rules for the Multiarmed Bandit Problem with Multiple Plays. I. IID Rewards," IEEE Transactions on Automatic Control, vol. AC-32, pp. 968-76, 1987.

[32] Agrawal, R., Hedge, M. V., and Teneketzis, D., "Asymptotically Efficient Adaptive Allocation Rules for the Multiarmed Bandit Problem With Switching Cost," IEEE Transactions on Automatic Control, vol. 33, pp. 899-906, 1988.

[33] Agrawal, R., Teneketzis, D., and Anantharam, V., "Asymptotically Efficient Adaptive Allocation Schemes for Controlled Markov Chains: Finite Parameter Space," IEEE Transactions on Automatic Control, vol. 34, pp. 1249-59, 1989.

[34] Agrawal, R., Teneketzis, D., and Anantharam, V., "Asymptotically Efficient Adaptive Allocation Schemes for Controlled I.I.D. Processes: Finite Parameter Space," IEEE Transactions on Automatic Control, vol. 34, pp. 258-267, 1989.

[35] Graves, T. L. and Tze Leung, L., "Asymptotically Efficient Adaptive Choice of Control Laws in Controlled Markov Chains," SIAM Journal on Control and Optimization, vol. 35, pp. 715-43, 1997.

[36] Agrawal, R. and Teneketzis, D., "Certainty Equivalence Control with Forcing: Revisited," Proceedings of, pp. 2107, Tampa, Fla., USA, 1989.

[37] Gubner, J. A., Probability and Random Processes for Electrical and Computer Engineers, 1st edition, Cambridge University Press, Jun. 5, 2006.

[38] Grimmett, G. R. and Stirzaker, D. R., Probability and Random Processes, $3^{rd}$ edition, Oxford University Press, Jul. 16, 2001.

[39] Krishnan, V., Probability and Random Processes, 1st edition, Wiley-Interscience, Jul. 11, 2006.

[40] Malikopoulos, A. A., Papalambros, P. Y., and Assanis, D. N., "A State-Space Representation Model and Learning Algorithm for Real-Time Decision-Making Under Uncertainty," Proceedings of the 2007 ASME International Mechanical Engineering Congress and Exposition, Seattle, Wash., Nov. 11-15, 2007.

[41] Malikopoulos, A. A., Papalambros, P. Y., and Assanis, D. N., "A Learning Algorithm for Optimal Internal Combustion Engine Calibration in Real Time," Proceedings of the ASME 2007 International Design Engineering Technical Conferences Computers and Information in Engineering Conference, Las Vegas, Nev., Sep. 4-7, 2007.

[42] Malikopoulos, A. A., Assanis, D. N., and Papalambros, P. Y., "Real-Time, Self-Learning Optimization of Diesel Engine Calibration," Proceedings of the 2007 Fall Technical Conference of the ASME Internal Combustion Engine Division, Charleston, S.C., Oct. 14-17, 2007.

[43] Iwata, K., Ito, N., Yamauchi, K., and Ishii, N., "Combining Exploitation-Based and Exploration-Based Approach in Reinforcement Learning," Proceedings of the Intelligent Data Engineering and Automated—IDEAL 2000, pp. 326-31, Hong Kong, China, 2000.

[44] Ishii, S., Yoshida, W., and Yoshimoto, J., "Control of Exploitation-Exploration Meta-Parameter in Reinforcement Learning," Journal of Neural Networks, vol. 15, pp. 665-87, 2002.

[45] Chan-Geon, P. and Sung-Bong, Y., "Implementation of the Agent Using Universal On-Line Q-learning by Balancing Exploration and Exploitation in Reinforcement Learning," Journal of KISS: Software and Applications, vol. 30, pp. 672-80, 2003.

[46] Miyazaki, K. and Yamamura, M., "Marco Polo: a Reinforcement Learning System Considering Tradeoff Exploitation and Exploration under Markovian Environments," Journal of Japanese Society for Artificial Intelligence, vol. 12, pp. 78-89, 1997.

[47] Hernandez-Aguirre, A., Buckles, B. P., and Martinez-Alcantara, A., "The Probably Approximately Correct (PAC) Population Size of a Genetic Algorithm," $12^{th}$ IEEE Internationals Conference on Tools with Artificial Intelligence, pp. 199-202, 2000.

Modeling dynamic systems incurring stochastic disturbances for deriving a control policy is a ubiquitous task in engineering. However, in some instances obtaining a model of a system may be impractical or impossible. Alternative approaches employ a simulation-based stochastic framework, in which the system interacts with its environment in real time and obtains information that can be processed to produce an optimal control policy. In this context, the problem of developing a policy for controlling the system's behavior is formulated as a sequential decision-making problem under uncertainty. This problem involves two major sub-problems: (a) the state estimation and system identification problem, and (b) the stochastic control problem. The first is exploitation of the information acquired from the system output to identify its behavior, that is, how a state representation can be built by observing the system's state transitions. The second is assessment of the system output with respect to alternative control policies, and selecting those that optimize specified performance criteria.

A computational model suitable to solve the state estimation and system identification sub-problem is disclosed herein. The evolution of the system is modeled as a Markov Decision Process (MDP). A state-space representation is constructed through a learning mechanism which can then be used in solving the stochastic control problem. The model allows decision making based on gradually enhanced knowledge of system response as it transitions from one state to another, in conjunction with actions taken at each state.

3.1 Reinforcement Learning Algorithms

Deriving a control policy for dynamic systems is an off-line process in which various methods from control theory are utilized iteratively. These methods aim to determine the policy that satisfies the system's physical constraints while optimizing specific performance criteria. A challenging task in this process is to derive a mathematical model of the system's dynamics that can adequately predict the response of the physical system to all anticipated inputs. Exact modeling of complex engineering systems, however, may be infeasible or expensive. Alternative methods have been developed enabling the real-time implementation of control policies for systems when an accurate model is not available. In this framework, the system interacts with its environment, and obtains information enabling it to improve its future performance by means of costs (or rewards) associated with control actions taken. This interaction portrays the learning process conveyed by the progressive enhancement of the system's "knowledge" regarding the course of action (control policy) that maximizes the accumulated rewards with respect to the system's operating point (state) transitions. The environment is assumed to be non-deterministic; namely, taking the same action in the same state on two different decision time steps (decision epochs or stages), the system may transit to a different state and incur a dissimilar cost in the subsequent step. Consequently, the problem of developing a policy for controlling the system's behavior is formulated as a sequential decision-making problem under uncertainty.

Dynamic programming (DP) has been widely employed as the principal method for analysis of sequential decision-making problems [1]. Algorithms, such as value iteration and policy iteration, have been extensively utilized in solving deterministic and stochastic optimal control problems, Markov and semi-Markov decision problems, minimax control problems, and sequential games. However, the computational complexity of these algorithms in some occasions may be prohibitive and can grow intractably with the size of the problem and its related data, referred to as the DP "curse of dimensionality" [2]. In addition, DP algorithms require the realization of the conditional probabilities of state transitions and the associated costs, implying a priori knowledge of the system dynamics. However, even if the transition probabilities are known, the problem of analytic computation might be too hard, and one might seek an approximation method that exploits the possibilities of simulation.

Simulation-based methods for solving sequential decision-making problems under uncertainty have been primarily developed in the field of Reinforcement Learning (RL) [2-4]. RL has aimed to provide algorithms, founded on DP, for learning control policies when analytical methods cannot be used effectively, or the system's state transition probabilities are not known [5]. A major influence on research leading to current RL algorithms has been Samuel's method [6, 7], used to modify a heuristic evaluation function for deriving optimal board positions in the game of checkers. In this algorithm, Samuel represented the evaluation function as a weighted sum of numerical features and adjusted the weights based on an error derived from comparing evaluations of current and predicted board positions. This approach was refined and extended by Sutton [8, 9] to introduce a class of incremental learning algorithms, Temporal Difference (TD). TD algorithms are specialized for deriving optimal policies for incompletely known systems, using past experience to predict their future behavior. Watkins [10] extended Sutton's TD algorithms and developed an algorithm for systems to learn how to act optimally in controlled Markov domains by explicitly utilizing the theory of DP. A strong condition implicit in the convergence of Q-learning to an optimal control policy is that the sequence of decision epochs that forms the basis of learning must include an infinite number of decision epochs for each initial state and action. Q-learning is considered the most popular and efficient model-free learning algorithm in deriving optimal control policies in Markov domains [11]. Schwartz [12] explored the potential of adapting Q-learning to an average-cost framework with his R-learning algorithm; Bertsekas and Tsitsiklis [3] presented a similar to Q-learning average-cost algorithm. Mahadevan [13] surveyed reinforcement-learning average-cost algorithms and showed that these algorithms do not always produce bias-optimal control policies.

The aforementioned algorithms consist of evaluation functions attempting to successively approximate the Bellman equation. These evaluation functions assign to each state the total cost expected to accumulate over time starting from a given state when a policy $\pi$ is employed. Although many of these algorithms are eventually guaranteed to find suboptimal policies in sequential decision-making problems under uncertainty, their use of the accumulated data acquired over the learning process is inefficient, and they require a significant amount of experience to achieve acceptable performance [11]. This requirement arises due to the formation of these algorithms in deriving optimal policies without learning the system models en route; that is they do not solve the state estimation and system identification problem simultaneously.

Algorithms for computing optimal policies by learning the models are especially important in applications in which real-world experience is considered expensive. Sutton's Dyna architecture [14, 15] exploits strategies which simultaneously utilize experience in building the model and adjust the derived policy. Prioritized sweeping [11] and Queue-Dyna [16] are similar methods concentrating on the interesting subspaces of the state-action space. Barto et al. [4] developed another method, called Real-Time Dynamic Programming (RTDP), referring to the cases in which concurrently executing DP and control processes influence one another. RTDP focuses the computational effort on the state-subspace that the system is most likely to occupy. However, these methods are specific to problems in which the system needs to achieve particular goal states and the initial cost of every goal state is zero.

3.2 Identification and Stochastic Adaptive Control

Adaptive control algorithms provide a systematic treatment in deriving optimal control policies in stochastic systems where exact modeling is not available a priori. In this context, the evolution of the system is modeled as a countable state controlled Markov chain whose transition probability is specified up to an unknown parameter taking values in a compact metric space.

In general, the analysis of optimal control in dynamic systems starts with a given state space model $$s_{k+1} = f_k(s_k, a_k, w_k), \quad (3.1)$$

$$y_k = h_k(s_k, v_k). \quad (3.2)$$

Stating that the model is given implies that the functions $f_k, h_k$, and the probability distribution of the basic random variables $s_0, w_0, w_1, \ldots, v_0, v_1, \ldots$, are all known. Moreover, the conditional distributions of $(s_{k+1}, y_k)$ given $(s_k, a_k)$ are also known. This is the off-line information in contrast to the on-line one which at time k consists of the observations $z^k = (y^k, a^{k-1})$. Consequently, the off-line information specifies a unique system. However, the off-line information is often insufficient to characterize a model completely; that is, the system model is not known initially. In this context, we are faced with the problem of how to make a rational choice of the control values $a_0, a_1, \ldots$, when the model is unspecified. This problem can be reformulated as a problem with partial observation. Nevertheless, the resulting computational burden increases making this formulation impractical except in the case when the unspecified system model is known to belong to a finite set.

Suppose the system model is unknown. As we make more observations $z^k$, i.e., as k increases, we ought to be able to characterize better the system model. The abstract framework that describes and analyzes this learning process is quite simple. A particular model is specified by a triple [17]

$$M := (f, h, P), \quad (3.3)$$

where $f$ is the function in the state equation, h is the function in the observation equation, and P is the probability distribution of the basic random variables. It is assumed that the off-line information is such as to guarantee that the true system model belongs to the family of models $M^\theta := (f^\theta, h^\theta, P^\theta)$ parameterized by the finite-dimensional vector $\theta$ which is known to belong to the set $\Theta$. Consequently, it is known a priori that the true system model corresponds to some true parameter $\theta° \in \Theta$, which is unidentified initially. At time k, an estimation $\hat{\theta}_k$ of the true parameter is made based on the on-line observation $z^k$. If the estimation or identification procedure is sufficient then $\hat{\theta}_k$ should approach $\theta°$ as k increases.

The initial uncertainty about the system is reflected in the parameterization, i.e., the function $\theta \to (f^\theta, h^\theta, P^\theta)$, and the size of the parameter set $\Theta$. This size may be large or small, and the parameterization may be more or less complex, i.e., linear vs. nonlinear, one-to-one vs. many-to-one. In practice, however, the set of models $\{M^\theta\}$ can only approximately represent the true system. Better approximations will lead to more complex parameterizations and a larger model set $\Theta$ making the identification problem more complicated. Consequently, the choice of parameterization must keep a balance between the demand for accuracy and the need to limit the computational burden.

The stochastic adaptive control problem has been extensively reported in the literature. Mandl [18] considered an adaptive control scheme providing a minimum contrast estimate of the unknown model of the systems at each decision epoch (stage), and then applying the optimal feedback control corresponding to this estimate. If the system satisfies a certain "identifiability condition," the sequence of parameter estimates converges almost surely to the true parameter. Borkar and Variaya [19] removed this identifiability condition and showed that when $\Theta$ is finite, the maximum likelihood estimate $\hat{\theta}_k$ converges almost surely to a random variable. Borkar and Variaya [20], and Kumar [21] examined the performance of the adaptive control scheme of Mandl without the "identifiability condition," but under varying degrees of generality of the state, control, and model spaces with the attention restricted to the maximum likelihood estimate. Doshi and Shreve [22] proved that if the set of allowed control laws is generalized to include the set of randomized controls, then the cost of using this scheme will almost surely equal to the optimal cost achievable if the true parameter were known. Kumar and Becker [23] implemented a novel approach to the adaptive control problem when a set of possible models is given including a new criterion for selecting a parameter estimate. This criterion is obtained by a deliberate biasing of the maximum likelihood criterion in favor of parameters with lower optimal costs. These results were extended by assuming that a finite set of possible models is not available [24]. Sato, Abe, and Takeda [25-27] proposed a learning controller for Markovian decision problems with unknown probabilities. The controller was designed to be asymptotically optimal considering a conflict between estimation and control for determination of a control policy. Kumar [28], and Varaiya [29] have provided comprehensive surveys of the aforementioned research efforts.

Certainty Equivalence Control (CEC) [17, 28] is a common approach in addressing stochastic adaptive control problems. The unknown system parameter is estimated at each decision epoch while assuming that the decision maker selects a control action as if the estimated parameter is the true one. The major drawback of this approach is that the decision maker may get locked in a false parameter when there is a conflict between learning and control. Forcing controls, different actions from those imposed by the certainty equivalence control, at some random decision epochs are often utilized to address this issue. The certainty equivalence control employing a forcing strategy is optimal in stochastic adaptive optimization problems with the average-cost-per-unit-time criterion.

Various stochastic adaptive control schemes have considered the classical example of the multi-armed bandit problem. Lai and Robbins [30] developed a solution methodology for bandits with independent identically distributed arms by introducing the average-cost-per-unit-time criterion. Ananthanam, Varaiya, and Walrand [31], and Agrawal, Hedge, and Teneketzis [32] generalized this result by developing various extensions of the Lai-Robbins formulation in the multi-armed bandit problem. Agrawal, Teneketzis, and Ananthanam [33] developed a "translation scheme" which along with the construction of an "extended probability space" solved the controlled Markov chain problem by converting it to a form similar to that for the controlled Markov independent sequence problem [34]. These results were utilized by Graves and Lai [35] to develop adaptive control rules considering compact parameter set and general state-space while assuming finite set of admissible policies. In these adaptive control schemes, the best possible performance depends on the on-line forcing strategy. Agrawal and Teneketzis [36] studied the rate of forcing to assess the performance of a certainty equivalence control with forcing for the multi-armed bandit problem and the adaptive control of Markov chains.

Although the aforementioned research work has successfully led to asymptotically optimal adaptive control schemes, their underlying framework imposes limitations in implementing these schemes on the engine calibration problem defined as a sequential decision-making problem under uncertainty in Chapter 2. In particular, in the engine calibration problem, the engine model is assumed to be completely unknown, and thus, parameterization cannot be developed. Moreover, the requirement of real-time derivation of the values of the engine controllable variables over an unknown horizon imposes an additional computational burden in implementing such control schemes. In this chapter, a computational model suited for real-time sequential decision-making under uncertainty modeled as controlled Markov chain is proposed. The model consists of a new state-space representation that addresses the state estimation and system identification sub-problem for the entire system (engine) operating domain. Furthermore, it utilizes an evaluation function suitable for lookahead control algorithms, and thus, for real-time implementation.

3.3 Finite State Controlled Markov Chains

The evolution of the system (engine) is modeled as a Markov Decision Process with a finite state space (engine operating domain) S and action space (values of the engine controllable variables) A. So, a discrete-time Markov process $\{s_k, k \geq 0\}$ is considered that takes values in some countable set S, that is, the state belongs to a finite state space $S = \{1, 2, \ldots, N\}, N \in \mathbb{N}$. The control action $a_k$ takes values in a pre-specified space A. Consequently, the process is a controlled Markov chain. The transition probabilities are specified by the N×N matrix valued function on A, $$a \to P(a) := \{P_{ij}(a), \forall i, j \in S\}, \forall a \in A \quad (3.4)$$

with the interpretation $$\text{Prob}\{s_{k+1} = j | s_k = i, s_{k-1}, \ldots, s_0, a_k, \ldots, a_0\} = P_{ij}(a_k) = p_{ij}, \quad k \geq 0, \forall i, j \in S \quad (3.5)$$

Definition 3.1 [37]. The chain $\{s_k, k \geq 0\}$ is called homogeneous if $$P_{ij}(s_{k+1} = j | s_k = i) = P_{ij}(s_1 = j | s_0 = i), \forall k \geq 0, \forall i, j \in S. \quad (3.6)$$

Theorem 3.1 [38]. The transition probability matrix P(a) is a stochastic matrix, that is (a) P(a) has non-negative entries, or $p_{ij} \geq 0, \forall i, j \in S$, (b) the sum of its rows is equal to one, or $$\sum_{j \in S} p_{ij} = 1, \forall i \in S.$$

Proof. The proof is provided by Grimmett and Stirzaker [38].

Definition 3.2 [39]. The n-step transition probability matrix $P_{ij}^{(m,m+n)}(a_k)$ is the matrix of n-step transition probabilities $P_{ij}^{(m,m+n)}(a_k) = P_{ij}^{(m,m+n)}(s_{m+n} = j | s_m = i)$.

The n-step transition probability matrix satisfies the Chapman-Kolmogorov equation, $$p_{ij}^{(m,m+n)} = \sum_{l \in S} p_{il}^{(m)} \cdot p_{lj}^{(n)}, \qquad (3.7)$$

or $\mathbb{P}_a^{(m,m+n)}(a_k) = \mathbb{P}_a^n$.

3.3.1 Classification of States in a Markov Chain

The evolution of a Markov chain can be seen as the motion of a notional particle which jumps between the states of the state space $i \in S$ at each decision epoch. The classification of the states in a Markov chain aims to provide insight towards modeling appropriately the evolution of a controlled dynamic system.

Definition 3.3 [38]. A Markov state $i \in S$ is called recurrent (or persistent), if $$P_{ij}(s_k=i \text{ for some } k \geq 0 | s_0 = i) = 1, \qquad (3.8)$$

that is, the probability of eventual return to state i, having started from i, is one.

The first time the chain $\{s_k, k \geq 0\}$ visits a state $i \in S$ is given by $$T_1(i) := \min\{k \geq 1 : s_k = i\}. \qquad (3.9)$$

$T_1(i)$ is called the first entrance time or first passage time of state i. It may happen that $s_k \neq i$ for any $k \geq 1$. In this case, $T_1(i) = \min \emptyset$, which is taken to be $\infty$. Consequently, if the chain never visits state i for any time $k \geq 1$, $T_1(i) = \infty$. Given that the chain starts in state i, the conditional probability that the chain returns to state i in finite time is $$f_{ii} := P(T_1(i) < \infty | s_0 = i). \qquad (3.10)$$

Consequently, for a recurrent state i $f_{ii} = 1$. Furthermore, if the expected time for the chain to return to a recurrent state i is finite, the state is said to be positive recurrent; otherwise, the state is said to be null recurrent. The nth entrance time of state i is given by $$T_n(i) := \min\{k \geq T_{n-1}(i) : s_k = i\}. \qquad (3.11)$$

Definition 3.4 [38]. The mean recurrence time $\mu_i$ of a state i is defined as $$\mu_i := E\{T_1(i) | s_0 = i\}. \qquad (3.12)$$

Definition 3.5 [38]. The period d(i) of a state i is defined by $$d(i) := gcd\{n : T_n(i) > 0\}, \qquad (3.13)$$

that is, the greatest common divisor of the decision epochs at which return is possible. The state i is periodic if d(i)>1 and aperiodic if d(i)=1.

Definition 3.6 [38]. A Markov state is called ergodic, if it is positive recurrent, and aperiodic.

Definition 3.7 [38]. If the chain started from state i and visits state j, that is $P_{ij}^{(n)}(s_n=j|s_0=i) > 0$ for some n>0, it is said that i communicates with j, and it is denoted $i \rightarrow j$. It is said that i and j intercommunicate if $i \rightarrow j$ and $j \rightarrow i$, in which case it is denoted $i \leftrightarrow j$.

Definition 3.8 [39]. A Markov chain is called irreducible if all states intercommunicate in a finite number of decision epochs, that is, $P_{ij}^{(n)}(s_n=j|s_0=i) > 0, \forall i, j \in S$.

3.4 The Predictive Optimal Decision-Making Computational Model

The Predictive Optimal Decision-making (POD) [40] learning model implemented herein consists of a new state-space system representation. The state-space representation accumulates gradually enhanced knowledge of the system's transition from each state to another in conjunction with actions taken for each state. This knowledge is expressed in terms of transition probabilities and an expected evaluation function associated with each Markov state. The major differences between the proposed computational model and the existing RL methods are: (a) the model solves the state estimation and system identification sub-problem for the entire system's operating domain by learning the transition probability and cost matrices, and (b) the model utilizes an evaluation function suitable for lookahead control algorithms, and thus, for real-time implementation. While the model's knowledge regarding the transition probabilities is advanced, a real-time lookahead control algorithm, which is developed in Chapter 4, can realize the control actions in the stochastic control sub-problem. This approach is especially appealing to learning engineering systems in which the initial state is not fixed [41, 42], and recursive updates of the evaluation functions to approximate the Bellman equation would demand a huge number of iterations to achieve the desired system performance.

The model considers controlled systems that their evolution is modeled as a Markov chain, with the following assumptions.

Assumption 3.1. The Markov chain is homogeneous.

Assumption 3.2. The Markov chain is ergodic, that is, the states are positive recurrent and aperiodic.

Assumption 3.3. The Markov chain is irreducible. Consequently, each state i of the Markov chain intercommunicates with each other $i \leftrightarrow j, \forall i, j \in S$, that is, each system's state can be reached with a positive probability from any other state in finite decision epochs.

3.4.1 Construction of the POD State Space Representation

The new state-space representation defines the POD domain $\tilde{S}$, which is implemented by a mapping H from the Cartesian product of the finite state space and action space of the Markov chain $\{s_k, k \geq 0\}$ $$H: S \times A \times S \rightarrow \tilde{S}, \qquad (3.14)$$

where $S = \{1, 2, \ldots, N\}$, $N \in \mathbb{N}$ denotes the Markov state space, and $$A = \bigcup_{s_k \in S} A(s_k), \forall s_k = i \in S$$

stands for the finite action space. Each state of the POD domain represents a Markov state transition from $s_k = i \in S$ to $s_{k+1} = j \in S$ for all $k \geq 0$, as illustrated in FIG. 3.1, that is $$\tilde{S} := \left\{ \begin{array}{l} \tilde{s}_{k+1}^{ij} \mid \tilde{s}_{k+1}^{ij} \equiv s_k = i \xrightarrow[\mu(s_k) \in A(s_k)]{} s_{k+1} = j, \\ \sum_{j=1}^{N} p(s_{k+1} = j \mid s_k = i, a_k) = 1, N = |S| \end{array} \right\}, \qquad (3.15)$$

$$\forall i, j \in S, \forall \mu(s_k) \in A(s_k).$$

Definition 3.9. The mapping H generates an indexed family of subsets, $\tilde{S}_i$, for each Markov state $s_k = i \in S$, defined as Predictive Representation Nodes (PRNs). Each PRN is constituted by the set of POD states $\tilde{s}_{k+1}^{ij} \in \tilde{S}_i$ representing the state transitions from the state $s_k = i \in S$ to all other Markov states $$\tilde{S}_i = \left\{ \tilde{s}_{k+1}^{ij} \mid s_k = i \xrightarrow[\mu(s_k) \in A(s_k)]{} s_{k+1} = j, \forall j \in S \right\}. \quad (3.16)$$

PRNs partition the POD domain insofar as the POD underlying structure captures the state transitions in the Markov domain as depicted in FIG. 3.2, namely $$\tilde{S} = \cup_{\tilde{s}_k^{ij} \in \tilde{S}_i} \tilde{S}_i, \text{with} \quad (3.17)$$

$$\cap_{\tilde{s}_k^{ij} \in \tilde{S}_i} \tilde{S}_i = \varnothing.$$

PRNs, constituting the fundamental aspect of the POD state representation, provide an assessment of the Markov state transitions along with the actions executed at each state. This assessment aims to establish a necessary embedded property of the new state representation so as to consider the potential transitions that can occur in subsequent decision epochs. The assessment is expressed by means of the PRN value, $\overline{R}_i(\tilde{s}_{k+1}^{ij} \mid \mu(s_i))$, which accounts for the minimum expected cost that can be achieved by transitions occurring inside a PRN.

Definition 3.10. The PRN value $\overline{R}_i(\tilde{s}_{k+1}^{ij} \mid \mu(s_i))$ is defined as $$\overline{R}_i(\tilde{s}_{k+1}^{ij} \mid \mu(s_k = i)) := \quad (3.18)$$

$$\min_{\mu(s_k) \in A} \sum_{j=1}^{N} p(s_{k+1} = j \mid s_k = i, \mu(s_k)) \cdot R(s_{k+1} = j \mid s_k = i, \mu(s_k)),$$

$$\forall \tilde{s}_{k+1}^{ij} \in \tilde{S}, \forall i, j \in S, \forall \mu(s_k) \in A(s_k), \text{ and } N = |S|.$$

The PRN value is exploited by POD state representation as an evaluation metric to estimate the subsequent Markov state transitions. The estimation property is founded on the assessment of POD states by means of an expected evaluation function, $R_{PRN}^i(\tilde{s}_{k+1}^{ij}, \mu(s_k))$, defined as $$R_{PRN}^i(\tilde{s}_{k+1}^{ij}, \mu(s_k)) = \quad (3.19)$$

$$\{p(s_{k+1} = j \mid s_k = i, \mu(s_k)) \cdot R(s_{k+1} = j \mid s_k = i, \mu(s_k)) + +$$

$$\overline{R}_j(\tilde{s}_{k+2}^{jm} \mid \mu(s_{k+1}))\},$$

$$\forall \tilde{s}_{k+2}^{jm} \in \tilde{S}, \forall i, j, m \in S, \forall \mu(s_k),$$

$$\in A(s_k), \forall \mu(s_{k+1}) \in A(s_{k+1}).$$

Consequently, employing the POD evaluation function through Eq. (3.19), each POD state, $\tilde{s}_{k+1}^{ij} \in \tilde{S}_i$, is comprised of an overall cost corresponding to: (a) the expected cost of transiting from state $s_k=i$ to $s_{k+1}=j$ (implying also the transition from the PRN $\tilde{S}_i$ to $\tilde{S}_j$); and (b) the minimum expected cost when transiting from $s_{k+1}=j$ to any other Markov state at k+2 (transition occurring into $\tilde{S}_j$.

3.4.2 Self-Learning System Identification

While the system interacts with its environment, the POD model learns the system dynamics in terms of the Markov state transitions. The POD state representation attempts to provide a process in realizing the sequences of state transitions that occurred in the Markov domain, as infused in PRNs. The different sequences of the Markov state transitions are captured by the POD states and evaluated through the expected evaluation functions given in Eq. (3.19). Consequently, the lowest value of the expected evaluation function at each POD state essentially estimates the subsequent Markov state transitions with respect to the actions taken. As the process is stochastic, however, the real-time learning method still has to build a decision-making mechanism of how to select actions, namely, how to solve the stochastic control problem. This problem is addressed in Chapter 4.

The learning performance is closely related to the exploration-exploitation strategy of the action space. More precisely, the decision maker has to exploit what is already known regarding the correlation involving the admissible state-action pairs that minimize the costs, and also to explore those actions that have not yet been tried for these pairs to assess whether these actions may result in lower costs. A balance between an exhaustive exploration of the environment and the exploitation of the learned policy is fundamental to reach nearly optimal solutions in a few decision epochs and, thus, to enhance the learning performance. This exploration-exploitation dilemma has been extensively reported in the literature. Iwata et al. [43] proposed a model-based learning method extending Q-learning and introducing two separated functions based on statistics and on information by applying exploration and exploitation strategies. Ishii et al. [44] developed a model-based reinforcement learning method utilizing a balance parameter, controlled through variation of action rewards and perception of environmental change. Chan-Geon et al. [45] proposed an exploration-exploitation policy in Q-learning consisting of an auxiliary Markov process and the original Markov process. Miyazaki et al. [46] developed a unified learning system realizing the tradeoff between exploration and exploitation. Hernandez-Aguirre et al. [47] analyzed the problem of exploration-exploitation in the context of the approximately correct framework and studied whether it is possible to set bounds on the complexity of the exploration needed to achieve a fixed approximation error over the action value function with a given probability.

An exhaustive exploration of the environment is necessary to evade premature convergence on a sub-optimal solution even if this may result in both sacrificing the system's performance in the short run and increasing the learning time. In our case it is assumed that, for any state $s_k=i \in S$, all actions of the feasible action set $\mu(s_k=i) \in A(s_k=i)$ are selected by the decision maker at least once. At the early decision epochs and until full exploration of the action set $A(s_k=i)$, $\forall i \in S$ occurs, the mapping from the states to probabilities of selecting the actions is constant; namely, the actions for each state are selected randomly with the same probability $$p(\mu(i) \mid i) = \frac{1}{|A(i)|}, \forall \mu(i) \in A(i), \forall i \in S. \quad (3.20)$$

When the exploration phase is complete, a lookahead control algorithm can be utilized to build up the decision-making mechanism.

3.4.3 Stationary Distributions and the Limit Theorem

The behavior of a Markov chain after a long time k has elapsed is described by the stationary distributions and the limit theorem. The sequence $\{s_k, k \geq 0\}$ does not converge to some particular state $i \in S$ since it enjoys the inherent random fluctuation which is specified by the transition probability matrix. Subject to certain conditions, the distribution of $\{s_k, k \geq 0\}$ settles down.

Definition 3.11 [38]. The vector $\rho$ is called a stationary distribution of the chain if $\rho$ has entries $(\rho_i, i \in S)$ such that:

(a) $\rho_i \geq 0$ for all i, and $$\sum_{i \in S} \rho_i = 1,$$

(b) $\rho = \rho \cdot P$, that is $$\rho_i = \sum_{j \in S} \rho_j \cdot P_{ji},$$

where $P_{ji}$ is the transition probability $P_{ji}(s_{k+1}=i|s_k=j)$, for all i.

If the transition probability matrix of a Markov chain $P_{ij}$ is raised to a higher power, the resulting matrix is also a transition probability matrix. If the matrix is kept raising to higher powers, then the elements in any given column start converging to the same number. This property can be illustrated further in the following simple example. Let us consider a Markov chain with two states $S=\{1,2\}$ and a transition probability matrix $$\mathbb{P} = \begin{bmatrix} 0.7 & 0.3 \\ 0.4 & 0.6 \end{bmatrix}.$$

This matrix represents the one-step transition probabilities of the states. Consequently, if the chain is at state 1 there is a probability of 0.7 that it will remain there and of 0.3 that it will transit to state 2. Similarly, if the chain is at state 2, there is a probability of 0.4 that it will transit to state 1 and of 0.6 that it will remain at state 2. If this matrix is raised to the second order, the resulting matrix yields the two-step transition probabilities $$\mathbb{P}^2 \begin{bmatrix} 0.7 & 0.3 \\ 0.4 & 0.6 \end{bmatrix} \cdot \begin{bmatrix} 0.7 & 0.3 \\ 0.4 & 0.6 \end{bmatrix} = \begin{bmatrix} 0.61 & 0.39 \\ 0.52 & 0.48 \end{bmatrix}.$$

The elements of the two-step transition probability matrix essentially return the conditional probability that the chain will transit to a particular state within two decision epochs. Consequently, the value $P_{12}^2(s_{k+1}=2|s_k=1)=0.39$ in the above matrix is the conditional probability that the chain will go from state 1 to state 2 in two decision epochs. If the one-step transition probability matrix is raised to the $8^{th}$ power, it is noticed that the elements in any given column start converging to 0.57 and 0.43, respectively, namely, $$\mathbb{P}^8 = \begin{bmatrix} 0.5715 & 0.4285 \\ 0.5714 & 0.4286 \end{bmatrix}.$$

These numbers constitute the stationary distribution of the chain, vector $\rho$, that is, $$\rho = \begin{bmatrix} \rho_1 \\ \rho_2 \end{bmatrix} = \begin{bmatrix} 0.57 \\ 0.43 \end{bmatrix}.$$

The limit theorem states that if a chain is irreducible with positive recurrent states, the following limit exists $$\rho_j = \lim_{n \to \infty} P_{ij}^n(s_{k+1} = j | s_k = i) = P(s_n = j).$$

Theorem 3.2 ("Limit Theorem") [38]. An irreducible Markov chain has a stationary distribution $\rho$ if and only if all the states are positive recurrent. Furthermore, $\rho$ is the unique stationary distribution and is given by $\rho_i = \mu_i^{-1}$ for each i∈S, where $\mu_i$ is the mean recurrence time of i.

Proof. The proof is provided by Grimmett and Stirzaker [38].

Stationary distributions have the following property $$\rho = \rho \cdot P^n, \forall n \geq 0 \quad (3.22)$$

3.4.4 Convergence of POD Model

As the system interacts with its environment, the POD state representation realizes the sequences of state transitions that occurred in the Markov domain, as infused in PRNs. In this section, it is shown that this realization determines the stationary distribution of the Markov chain.

Definition 3.12. Given a set $C \subset \mathbb{R}$ and a variable x, the indicator function, denoted by $I_C(x)$, is defined by $$I_C(x) := \begin{cases} 1, & x \in C \\ 0, & x \notin C \end{cases} \quad (3.23)$$

Lemma 3.1. Each PRN is irreducible, that is $\tilde{S}_i \leftrightarrow \tilde{S}_j$, $\forall i, j \in S$.

Proof. At the decision epoch k, the state transition from i to j corresponds to the $\tilde{s}_k^{ij}$ inside the PRN $\tilde{S}_i$. The next state transition will occur from the state j to any other Markov state. Consequently, by Definition 3.9, the next state transition will occur in $\tilde{S}_j$. By Assumption 3.3, all states intercommunicate with each other, that is, $i \leftrightarrow j, \forall i, j \in S$. So PRNs intercommunicate and thus they are irreducible. The lemma is proved.

The number of visits of the chain to the state j∈S between two successive visits to state i∈S at the decision epoch k=M, that is, the number of visits of the POD state $\tilde{s}_M^{ij} \in \tilde{S}$, is given by $$V(\tilde{s}_M^{ij}) := \sum_{k=1}^{M} I_{\{s_k = j\} \cap \{T_1(i) \geq k\}}(s_k) \quad (3.24)$$

where $T_1(i)$ is the time of the first return to state i∈S.

Definition 3.13. The mean number of visits of the chain to the state j∈S between two successive visits to state i∈S is $$\overline{V}(\tilde{s}_M^{ij}) := E\{V(\tilde{s}_M^{ij}) | s_k = i\}, \quad (3.25)$$

$$\text{or } \overline{V}(\tilde{s}_M^{ij}) := \sum_{k=1}^{M} P(s_k = j, T_1(i) \geq k | s_0 = i).$$

Definition 3.14. The mean recurrence time $\mu_{\tilde{s}_i}$ that the chain spends at the PRN $\tilde{S}_i$ is $$\mu_{\tilde{s}_i} := \sum_{j \in S} \overline{V}(\tilde{s}_M^{ij}) = \sum_{j \in S} \sum_{k=1}^{M} P(s_k = j, T_1(i) \geq k | s_0 = i). \quad (3.26)$$

Lemma 3.2. The mean recurrence time of each PRN $\tilde{S}_i, \mu_{\tilde{S}_i}$ is equal to the mean recurrence time of state $i \in S$, $\mu_i$.

Proof. It was shown (Lemma 3.1) that each time the Markov chain transits from one state $i \in S$ to a state $j \in S$ there is a corresponding transition from the PRN $\tilde{S}_i$ to $\tilde{S}_j$. Consequently, the number of visits of the chain to the state $i \in S$ is equal to the number of visits to the PRN $\tilde{S}_i$. Taken the expectation of this number yields the mean recurrence time, by Definition 3.13. The lemma is proved.

Proposition 3.1. If A, B, and C are some events and $$P(A|B \cap C) = P(A|B), \quad (3.27)$$

then $$P(A \cap C|B) = P(A|B) \cdot P(C|B) \quad (3.28)$$

Proof.

$$P(A \cap C | B) = \frac{P(A \cap B \cap C)}{P(B)} \quad (3.29)$$

using the identity $P(A|B) \cdot P(B) = P(A \cap B)$, Eq. (3.29) yields $$\frac{P(A | C \cap B) \cdot P(C \cap B)}{P(B)} = \frac{P(A) | B) \cdot P(C \cap B)}{P(B)} \quad \text{by using Eq. (3.27)}$$

$$= \frac{P(A | B) \cdot P(C \cap B)}{P(B)}$$

$$= \frac{P(A | B) \cdot P(C | B) \cdot P(B)}{P(B)}$$

$$= P(A | B) \cdot P(C | B).$$

It remains to present the main result of the POD computational model, namely, that the realization of the sequences of state transitions that occurred in the Markov domain as infused by the PRNs determines the stationary distribution of the Markov chain.

Theorem 3.3. The POD state representation generates the stationary distribution $\rho$ of the Markov chain. Moreover, the stationary probability is given by the mean recurrence time of each PRN $\tilde{S}_i, \rho_i = \mu_{\tilde{S}_i}^{-1}$.

Proof. Since the chain is ergodic with irreducible states, it is guaranteed that the chain has a unique stationary distribution, and for each state $i \in S$ the stationary probability is equal to $\rho_i = \mu_i^{-1}$.

$$\rho_i \cdot \mu_i == \rho_i \cdot \mu_{\tilde{S}_i} \quad \text{by Lemma 3.2}$$

$$= \sum_{j \in S} \sum_{k=1}^{M} P(s_k = j, T_1(i) \geq k | s_0 = i) \cdot P(s_0 = i) \quad (3.30)$$

$$= \sum_{j \in S} \sum_{k=1}^{M} P(s_k = j, T_1(i) \geq k, s_0 = i) \quad (3.31)$$

by using the identity $P(A|B) \cdot P(B) = P(A \cap B)$.
For k=1, Eq. (3.31) yields $$\sum_{j \in S} P(s_k = j, T_1(i) \geq 1, s_0 = i) = 1. \quad (3.32)$$

For k≥2, Eq. (3.30) yields $$\sum_{j \in S} \sum_{k=1}^{M} P(s_k = j, T_1(i) \geq k | s_0 = i) \cdot P(s_0 = i) = \quad (3.33)$$

$$\sum_{j \in S} \sum_{k=1}^{M} P(s_k = j, s_m \neq i \text{ for } 1 \leq m \leq k-1, s_0 = i)$$

$$= \sum_{j \in S} \sum_{k=1}^{M} P(s_k = j | s_0 = i) \cdot \quad (3.34)$$

$$P(s_m \neq i \text{ for } 1 \leq m \leq k=1 | s_0 = i) \cdot P(s_0 = i)$$

$$= \sum_{j \in S} \sum_{k=1}^{M} P(s_k = j | s_0 = i) \cdot P(s_m \neq i \text{ for } 1 \leq m \leq k-1, s_0 = i)$$

$$= \sum_{k=1}^{M} \left( \sum_{j \in S} P(s_k = j | s_0 = i) \right) \cdot P(s_m \neq i \text{ for } 1 \leq m \leq k-1, s_0 = i)$$

$$= \sum_{K=1}^{M} P(s_m \neq i \text{ for } 1 \leq m \leq k-1, s_0 = i)$$

by using the identity $P(A \cup B) = P(A) + P(B) - P(A \cap B)$, Eq. (3.34) becomes $$\sum_{k=1}^{M} P(s_0 = i) + P(s_m \neq i \text{ for } 1 \leq m \leq k-1) - P(s_m \neq i \text{ for } 0 \leq m \leq k-1)$$

Since the Markov chain is homogeneous (Assumption 3.1)

$$= \sum_{k=1}^{M} \{P(s_0 = i) + P(s_0 \neq i) + P(s_m \neq i \text{ for } 0 \leq m \leq k-3) - \quad (3.35)$$

$$P(s_m \neq i \text{ for } 0 \leq m \leq k-1)\}$$

$$= \sum_{k=1}^{M} \{P(s_0 = i) + P(s_0 \neq i)\} + \lim_{k \to \infty} (P(s_m \neq i \text{ for } 0 \leq m \leq k-3)) -$$

$$\lim_{k \to \infty} (P(s_m \neq i \text{ for } 0 \leq m \leq k-1)),$$

since the Markov states are irreducible (Assumption 3.3)

$$\lim_{k \to \infty} (P(s_m \neq i \text{ for } 0 \leq m \leq k-3)) = 0, \text{ and}$$

$$\lim_{k \to \infty} (P(s_m \neq i \text{ for } 0 \leq m \leq k-1)) = 0.$$

Eq. (3.35) becomes $$= \sum_{k=1}^{M} \{P(s_0 = i) + P(s_0 \neq i)\} = \sum_{k=1}^{M} \{1\} = 1.$$

We have shown that $$\rho_i \cdot \mu_i = \rho_i \cdot \mu_{\tilde{S}_i} = 1.$$

Consequently, the stationary distribution is given by the mean recurrence time of each PRN $\tilde{S}_i, \mu_{\tilde{S}_i}$ $$\rho_i = \frac{1}{\mu_{\tilde{S}_i}}.$$

3.5 Concluding Remarks

In this chapter, a computational model suited for real-time sequential decision-making under uncertainty was implemented. The evolution of the system was modeled as a Markov chain. A state-space representation was constructed through a learning mechanism and used in solving the state estimation and system identification problem. The model accumulates gradually enhanced knowledge of system response as it transitions from one state to another, in conjunction with actions taken at each state. As the system interacts with its environment, the state representation of the model realizes the sequences of state transitions that occurred in the Markov domain, as infused in the Predictive Representation Nodes (PRNs). It was shown that this realization determines the stationary distribution of the Markov chain (Theorem 3.3). Utilizing this model, a lookahead control algorithm can be employed simultaneously to address the stochastic control problem in real time. This problem is addressed in Chapter 4.

CHAPTER 4

Real-Time Stochastic Control

The following references may be referenced in this Chapter:

[1] Bertsekas, D. P., Dynamic Programming and Optimal Control (Volumes 1 and 2), Athena Scientific, September 2001.
[2] Anderson, C. W., "Learning to Control an Inverted Pendulum Using Neural Networks," IEEE Control Systems Magazine, vol. 9, pp. 31-7, 1989.
[3] Williams, V. and Matsuoka, K., "Learning to Balance the Inverted Pendulum Using Neural Networks," Proceedings of the 1991 IEEE International Joint Conference on Neural Networks (Cat. No. 91CH3065-0), pp. 214-19, Singapore, 1991.
[4] Zhidong, D., Zaixing, Z., and Peifa, J., "A Neural-Fuzzy BOXES Control System with Reinforcement Learning and its Applications to Inverted Pendulum," Proceedings of the 1995 IEEE International Conference on Systems, Man and Cybernetics. Intelligent Systems for the 21st Century (Cat. No. 95CH3576-7), pp. 1250-4, Vancouver, BC, Canada, 1995.
[5] Jeen-Shing, W. and McLaren, R., "A Modified Defuzzifier for Control of the Inverted Pendulum Using Learning," Proceedings of the 1997 Annual Meeting of the North American Fuzzy Information Processing Society—NAFIPS (Cat. No. 97TH8297), pp. 118-23, Syracuse, N.Y., USA, 1997.
[6] Mustapha, S. M. and Lachiver, G., "A Modified Actor-Critic Reinforcement Learning Algorithm," Proceedings of the 2000 Canadian Conference on Electrical and Computer Engineering, pp. 605-9, Halifax, NS, Canada, 2000.
[7] Khamsi, M. A. and Kirk, W. A., An Introduction to Metric Spaces and Fixed Point Theory, 1$^{st}$ edition, Wiley-Interscience, Mar. 6, 2001.
[8] Zhang, B. S., Leigh, I., and Leigh, J. R., "Learning Control Based on Pattern Recognition Applied to Vehicle Cruise Control Systems," Proceedings of the the American Control Conference, pp. 3101-3105, Seattle, Wash., USA, 1995.
[9] Shahdi, S. A. and Shouraki, S. B., "Use of Active Learning Method to Develop an Intelligent Stop and Go Cruise Control," Proceedings of the IASTED International Conference on Intelligent Systems and Control, pp. 87-90, Salzburg, Austria, 2003.
[10] TESIS, <http://www.tesis.de/en/>.
[11] Heywood, J., Internal Combustion Engine Fundamentals, 1 edition, McGraw-Hill Science/Engineering/Math, April 1988.
[12] Malikopoulos, A. A., Papalambros, P. Y., and Assanis, D. N., "A Learning Algorithm for Optimal Internal Combustion Engine Calibration in Real Time," Proceedings of the ASME 2007 International Design Engineering Technical Conferences Computers and Information in Engineering Conference, Las Vegas, Nev., Sep. 4-7, 2007.
[13] Panait, L. and Luke, S., "Cooperative Multi-Agent Learning: The State of the Art," Autonomous Agents and Multi-Agent Systems, vol. 11, pp. 387-434, 2005.

This chapter presents the algorithmic implementation that provides the decision-making mechanism suitable for real-time implementation. The algorithm solves the stochastic control sub-problem by utilizing accumulated data acquired over the learning process of the POD model developed in Chapter 3. A lookahead control algorithm is proposed that assigns at each state the control actions that minimize the transition cost of the next two decision epochs. The principle of the algorithm is founded on the theory of stochastic control problems known as games against nature. The efficiency of the POD model and the lookahead algorithm is demonstrated on four applications: (a) the single cart-pole balancing problem; (b) a vehicle cruise-control problem; (c) a gasoline engine that learns the optimal spark advance over aggressive acceleration profiles; and (d) a diesel engine that learns the optimal injection timing in a segment of a driving cycle.

4.1 The Predictive Optimal Stochastic Control Algorithm

The POD state representation attempts to provide an efficient process in realizing the state transitions that occurred in the Markov domain. The different sequences of the state transitions are captured by the POD states and evaluated through the expected evaluation functions. Consequently, the lowest value of the expected evaluation function at each PRN essentially estimates the Markov state transitions that will occur. As the process is stochastic, however, it is still necessary for the decision maker to build a decision-making mechanism for making decisions (selecting control actions). The Predictive Optimal Stochastic Control Algorithm (POSCA), proposed herein, aims to provide this mechanism.

The principle of POSCA is founded on the theory of stochastic control problems with unknown disturbance distribution, also known as games against nature. The decision-making mechanism is modeled as a stochastic game between the decision maker (controller) and an "opponent" (environment). The solution of this game is derived utilizing the mini-max theorem. Each POD state $\tilde{S}_{k+1}{}^{ij} \in \tilde{S}_i$ corresponds to a completed game that started at the Markov state $s_k = i \in S$ and ended up at $s_k = i \in S$ and ended up at $s_{k+1} = j \in S$. At state $s_k = i$, the decision maker has a set of strategies (control actions) $\mu(s_k) \in A(s_k)$ available to play. Similarly, the environment's set of strategies are the Markov states $S = \{1, 2, \ldots, N\}$, $N \in \mathbb{N}$. During the learning process of the POD model, this game has been played insofar as the decision maker forms a belief about the environment's behavior by fully exploring all available strategies, $\mu(s_k) \in A(s_k)$. This property arises when the state representation converges to the stationary distribution of the Markov chain. Consequently, at state $s_k=i \in S$, the decision maker can select those control actions by means of the PRN expected evaluation functions, $R_{PRN}{}^i(\tilde{s}_{k+1}{}^{ij},\mu(s_k))$. However, to handle the uncertainty of this prediction, the decision maker seeks a policy $\pi^* \in \pi$, which guarantees the best performance in the worst possible situation, namely, $$\pi^*(s_k) = \underset{\mu_k(s_k) \in A(s_k)}{\operatorname{argmin}} \left\{ \max_{s_{k+1} \in S} [R_{PRN}^i(\tilde{s}_{k+1}^{ij}, \mu(s_k))] \right\}. \quad (4.1)$$

This approach is especially appealing for real-time implementation when the time between decision epochs is small. In this situation, the controller needs to select control actions quickly and there is not enough time to search for an optimal policy for a relatively distant future.

The implementation of the POD model and POSCA is illustrated in FIG. 4.1. At each decision epoch k, the POD model observes the system's state $s_k=i \in S$ and control action $a_k \in A(s_k)$ selected from the feasible action set $A(s_k)$, which is a subset of some control space A. At the next decision epoch, the system transits to another state $s_{k+1}=j \in S$ imposed by the transition probability $P_{ij}(\cdot)$, and receives a numerical cost $R_{ij}(\cdot)$. The POD state representation realizes the sequences of state transitions $P_{ij}(\cdot)$ that occurred in the Markov domain and the associated costs $R_{ij}(\cdot)$. When the POD model converges to the stationary distribution, POSCA is employed to derive the control policy $\pi^*$ by means of Eq. (4.1).

4.1.1 Performance Bound of POSCA

This section evaluates the performance bound of POSCA in terms of the accumulated cost over the decision epochs. The following Lemma aims to provide a useful step toward presenting the main result (Theorem 4.1).

Lemma 4.1 [1]. Let $f: S \to [-\infty,\infty]$ and $g: S \times A \to [-\infty,\infty]$ be two functions such that $$\min_{a \in A}(g(i, a)) > -\infty, \forall i \in S. \quad (4.2)$$

Then we have $$\min_{\mu(i) \in A} \max_{i \in S}[f(i) + g(i, \mu(i))] = \max_{i \in S}\left[ f(i) + \min_{a \in A} g(i, a) \right],$$

where $\mu: S \to A$, such that $a=\mu(i)$, and S,A are some sets.

Proof. The proof is provided by Bertsekas [1].

Assumption 4.1. The accumulated cost incurred at each decision epoch k is bounded, that is, $\exists \delta > 0$ such that $J_k(s_k) < \delta$.

Theorem 4.1. The accumulated cost $\tilde{J}_k(s_k)$ incurred by the two step lookahead policy $\bar{\pi}=\{\bar{\mu}_0,\bar{\mu}_1,\ldots,\bar{\mu}_{M-1}\}$ of POSCA $$\bar{\pi}(s_k) = \underset{\mu_k(s_k) \in A(s_k)}{\operatorname{argmin}} \left[ \max_{s_{k+1} \in S} \left[ R(s_{k+1} \mid s_k, \alpha_k) + \min_{a_{k+1} \in A(s_{k+1})} \underset{s_{k+2} \in S}{E}\{R(s_{k+2} \mid s_{k+1}, \alpha_{k+1})\} \right] \right]. \quad (4.3)$$

is bounded by the accumulated cost $J_k(s_k)$ incurred by the minimax control policy $\pi=\{\mu_0,\mu_1,\ldots,\mu_{M-1}\}$ of Dynamic Programming (DP), namely, $$\pi = \underset{\mu_k(s_k) \in A(s_k)}{\operatorname{argmin}} \max_{s_{k+1} \in S} [R(s_{k+1} \mid s_k, \alpha_k) + J_{k+1}(s_{k+1})]. \quad (4.4)$$

with probability 1.

Proof. Suppose that the chain starts at a state $s_0=i, i \in S$ at time k=0 and ends up at k=M. We consider the problem of finding a policy $\pi=\{\mu_0,\mu_1,\ldots,\mu_{M-1}\}$ with $\mu_k(s_k) \in A$ for all $s_k \in S$ and k that minimizes the cost function $$J^\pi(s_k) = \max_{s_{k+1} \in S}\left[ \begin{array}{l} R_M(s_M \mid s_{M-1}, a_{M-1}) + \\ \sum_{k=0}^{M-2} R_k(s_{k+1} \mid s_k, a_k) \end{array} \right]. \quad (4.5)$$

The DP algorithm for this problem takes the following form starting from the tail sup-problem $$J_M(s_M) = \min_{\mu_M(s_M) \in A(s_M)} \max_{s_{M+1} \in S} [R_M(s_{M+1} \mid s_M, a_m)] \quad (4.6)$$
$$= R_M(s_M), \text{ and}$$

$$J_k(s_k) = \min_{\mu_k(s_k) \in A(s_k)} \max_{s_{k+1} \in S} [R(s_{k+1} \mid s_k, \alpha_k) + J_{k+1}(s_{k+1})], \quad (4.7)$$

where $R_M(s_M)$ is the cost of the terminal decision epoch.

Following the steps of the DP algorithm proposed by Bertsekas [1], the optimal accumulated cost $J^{\pi^*}(s_0)$ starting from the last decision epoch and moving backwards is $$J^{\pi^*}(s_0) = \min_{\mu_0(s_0) \in A(s_0)} \ldots \min_{\mu_{M-1}(s_{M-1}) \in A(s_{M-1})} \max_{s_0 \in S} \ldots \quad (4.8)$$
$$\max_{s_M \in S}\left[ R_M(s_M \mid s_{M-1}, a_{M-1}) + \sum_{k=0}^{M-2} R_k(s_{k+1} \mid s_k, a_k) \right].$$

By applying Lemma 4.1, we can interchange the min over $\mu_{M-1}$ and the max over $s_0,\ldots,s_{M-2}$. The required assumption of Lemma 4.1 (Eq. (4.2)) is implied by Assumption 4.1. Eq. (4.8) yields $$J^{\pi^*}(s_0) = \min_{\mu_0(s_0) \in A(s_0)} \ldots \quad (4.9)$$

$$\min_{\mu_{M-2}(s_{M-2}) \in A(s_{M-2})} \left[ \max_{s_{M-2} \in S} \left[ \begin{array}{c} \max_{s_0 \in S} \ldots \\ \sum_{k=0}^{M-3} R_k(s_{k+1} \mid s_k, a_k) + \\ \max_{s_{M-1} \in S} \left[ R_{M-1}\left( \begin{array}{c} s_{M-1} \mid s_{M-2}, \\ a_{M-2} \end{array} \right) + \\ J_M(s_M) \end{array} \right] \right] \right] =$$

$$\min_{\mu_0(s_0) \in A(s_0)} \ldots$$

$$\min_{\mu_{M-2}(s_{M-2}) \in A(s_{M-2})} \left[ \max_{s_{M-2} \in S} \left[ \begin{array}{c} \max_{s_0 \in S} \ldots \\ \sum_{k=0}^{M-3} R_k(s_{k+1} \mid s_k, a_k) + \\ J_{M-1}(s_{M-1}) \end{array} \right] \right].$$

By continuing backwards in similar way we obtain $$J^{\pi*}(s_0)=J_0(s_0). \quad (4.10)$$

Consequently, an optimal policy for the minimax problem can be constructed by minimizing the RHS of Eq. (4.5).

The cost incurred by policy $\bar{\pi}=\{\bar{\mu}_0,\bar{\mu}_1,\ldots,\bar{\mu}_{M-1}\}$ of POSCA at each decision epoch k is $$\bar{J}_M(s_M) = \quad (4.11)$$

$$= \min_{\bar{\mu}_M(s_M) \in A(s_M)} \max_{s_{M+1} \in S} \left[ R_M(s_{M+1} \mid s_M, \alpha_M) + \min_{a_{M+1} \in A(s_{M+1})} \max_{s_{M+2} \in S} E\{R_{M+1}(s_{M+2} \mid s_{M+1}, a_{M+1})\} \right] \quad (4.12)$$

$$= R_M(s_{M+1} \mid s_M, a_M) = R_M(s_M),$$

since the terminal decision epoch is at k=M, and thus, $$R_{M+1}(s_{M+2} \mid s_{M+1}, a_{M+1}) = 0.$$

$$\bar{J}_{M-1}(s_{M-1}) == \quad (4.13)$$

$$\min_{\bar{\mu}_{M-1}(s_{M-1}) \in A(s_{M-1})} \max_{s_M \in S} \left[ \begin{array}{c} R_{M-1}(s_M \mid s_{M-1}, \alpha_{M-1}) + \\ \min_{a_M \in A(s_M)} \max_{s_{M+1} \in S} E\{R_M(s_{M+1} \mid s_M, \alpha_M)\} \end{array} \right],$$

$$\bar{J}_{M-2}(s_{M-2}) == \quad (4.14)$$

$$\min_{\bar{\mu}_{M-2}(s_{M-2}) \in A(s_{M-2})} \max_{s_{M-1} \in S} \left[ \begin{array}{c} R_{M-2}(s_{M-1} \mid s_{M-2}, a_{M-2}) + \\ \min_{a_{M-1} \in A(s_{M-1})} E_{s_M \in S} \\ \{R_{M-1}(s_M \mid s_{M-1}, a_{M-1})\} \end{array} \right],$$

$$\ldots$$

$$\bar{J}_0(s_0) = \min_{\bar{\mu}_0(s_0) \in A(s_0)} \max_{s_1 \in S} \left[ \begin{array}{c} R_0(s_1 \mid s_0, a_0) + \\ \min_{a_1 \in A(s_1)} E_{s_2 \in S}\{R_1(s_2 \mid s_1, a_1)\} \end{array} \right]. \quad (4.15)$$

Performing the same task as we did with DP algorithm by starting from the last epoch of the decision-making process and moving backwards, the accumulated cost incurred by POSCA $\tilde{J}_k(s_k)$ is $$\tilde{J}_M(s_M) == \min_{\bar{\mu}_M(s_M) \in A(s_M)} \max_{s_{M+1} \in S} \left[ \begin{array}{c} R_M(s_{M+1} \mid s_M, a_M) + \\ \min_{a_{M+1} \in A(s_{M+1})} E_{s_{M+2} \in S} \\ \{R_{M+1}(s_{M+2} \mid s_{M+1}, a_{M+1})\} \end{array} \right] = \quad (4.16)$$

$$R_M(s_{M+1} \mid s_M, a_M) = R_M(s_M) = J_M(s_M),$$

$$\tilde{J}_{M-1}(s_{M-1}) == \quad (4.17)$$

$$\min_{\bar{\mu}_{M-1}(s_{M-1}) \in A(s_{M-1})} \max_{s_M \in S} \left[ \begin{array}{c} R_{M-1}(s_M \mid s_{M-1}, a_{M-1}) + \\ \min_{a_M \in A(s_M)} E_{s_{M+1} \in S} \\ \{R_M(s_{M+1} \mid s_M, a_M)\} \end{array} \right] + \tilde{J}_M(s_M)$$

$$= \min_{\bar{\mu}_{M-1}(s_{M-1}) \in A(s_{M-1})} \max_{s_M \in S} [R_{M-1}(s_M \mid s_{M-1}, a_{M-1})] + \tilde{J}_M(s_M), \quad (4.18)$$

since $R_M(s_{M+1} \mid s_M, \alpha_M)=0$.

$$\tilde{J}_{M-1}(s_{M-1}) = \min_{\bar{\mu}_M(s_M) \in A(s_M)} \max_{s_{M+1} \in S} \quad (4.19)$$

$$[R(s_{M+1} \mid s_M, a_M) + \tilde{J}_M(s_M)]$$

$$= J_{M-1}(s_{M-1}),$$

since $\tilde{J}_M(s_M)$ is a constant quantity.

$$\tilde{J}_{M-2}(s_{M-2}) == \quad (4.20)$$

$$\min_{\bar{\mu}_{M-2}(s_{M-2}) \in A(s_{M-2})} \max_{s_{M-1} \in S} \left[ \begin{array}{c} R_{M-2}(s_{M-1} \mid s_{M-2}, a_{M-2}) + \\ \min_{a_{M-1} \in A(s_{M-1})} E_{s_M \in S} \\ \{R_{M-1}(s_M \mid s_{M-1}, a_{M-1})\} \end{array} \right] ++$$

$$\tilde{J}_{M-1}(s_{M-1}).$$

However, $$\min_{\bar{\mu}_{M-2}(s_{M-2}) \in A(s_{M-2})} \max_{s_{M-1} \in S} \left[ \begin{array}{c} R_{M-2}(s_{M-1} \mid s_{M-2}, a_{M-2}) + \\ \min_{a_{M-1} \in A(s_{M-1})} E_{s_M \in S} \\ \{R_M(s_M \mid s_{M-1}, a_{M-1})\} \end{array} \right] \leq \quad (4.21)$$

$$\min_{\bar{\mu}_{M-2}(s_{M-2}) \in A(s_{M-2})} \max_{s_{M-1} \in S} [R_{M-1}(s_{M-1} \mid s_{M-2}, a_{M-2})],$$

since the LHS of the inequality will return a cost $R_{M-2}(\cdot \mid \cdot, \cdot)$ which is not only maximum over when the chain transits from $s_{M-2}$ to $s_{M-1}$ but also minimum when the chain transits from $s_{M-1}$ to $s_M$. So, the LHS can be at most equal to the cost which is maximum over the transition from $s_{M-2}$ to $s_{M-1}$. Consequently, comparing the accumulated cost of POSCA in Eq. (4.20) with the one resulted from the DP at the same decision epoch, namely, $$J_{M-2}(s_{M-2}) = \quad (4.22)$$

$$\min_{\mu_{M-2}(s_{M-2}) \in A(s_{M-2})} \max_{s_{M-1} \in S} \left[ \begin{array}{c} R_{M-1}(s_{M-1} \mid s_{M-2}, a_{M-2}) + \\ J_{M-1}(s_{M-1}) \end{array} \right],$$

we conclude that $$\tilde{J}_{M-2}(s_{M-2}) \leq J_{M-2}(s_{M-2}). \quad (4.23)$$

By continuing backward with similar arguments we have $$\tilde{J}_0(s_0) \leq J_0(s_0) = J^{\pi*}(s_0). \quad (4.24)$$

Consequently, the accumulated cost resulting from the control policy $\bar{\pi}=\{\bar{\mu}_0,\bar{\mu}_1,\ldots,\bar{\mu}_{M-1}\}$ of POSCA is bounded by the accumulated cost of the optimal minimax control policy of DP with probability 1.

4.2 Real-Time, Self-Learning Optimization of Engine Calibration

In this section, the POD model and POSCA are applied to make the engine an autonomous intelligent system that can learn the values of the controllable variables in real time for each engine operating point transition that optimize specified engine performance criteria, e.g., engine power, fuel economy, or pollutant emissions. The learning process transpires while the engine is running the vehicle and interacting with the driver. Taken in conjunction with assigning values of the controllable variables from the feasible action space, A, this interaction portrays the progressive enhancement of the controller's "knowledge" of the driver's driving style with respect to the controllable variables. This property arises due to the learning process required by the POD state representation to capture the stationary distribution of the engine operation with respect to the driver's driving style. More precisely, at each of a sequence of decision epochs k=0,1,2, ..., M, the driver introduces a state $s_k=i \in S$ (engine operating point) to the engine's self-learning controller, and on that basis the controller selects an action, $a_k \in A(s_k)$ (values of the controllable variables). This state arises as a result of the driver's driving style corresponding to particular engine operating points. One decision epoch later, as a consequence of its action, the engine receives a numerical cost, $R_{k+1} \in \mathbb{R}$, and transits to a new state $s_{k+1}=j$, $j \in S$ as illustrated in FIG. 4.11.

The POD state-space representation $\tilde{S}$, is implemented by a mapping H from the Cartesian product of the finite state space and action space of the Markov chain $$H: S \times A \times S \to \tilde{S}, \qquad (4.38)$$

where $S=\{1,2, \ldots, N\}$, $N \in \mathbb{N}$ denotes the engine operating domain, and $A = \cup_{s_k \in S} A(s_k), \forall s_k = i \in S$ stands for the values of the controllable variables. Each state of the POD domain represents a Markov state transition from $s_k=i \in S$ to $s_{k+1}=j \in S$ for all $k \geq 0$, that is $$\tilde{S} := \left\{ \begin{array}{l} \tilde{s}_{k+1}^{ij} \mid \tilde{s}_{k+1}^{ij} \equiv s_k = i \xrightarrow[\mu(s_k) \in A(s_k)]{} s_{k+1} = j, \\ \sum_{j=1}^{N} p(s_{k+1} = j \mid s_k = i, a_k) = 1, N = |S| \end{array} \right\}, \qquad (4.39)$$

$$\forall i, j \in S, \forall \mu(s_k) \in A(s_k).$$

At each decision epoch, the controller implements a mapping from the Cartesian product of the state space and action space to the set of real numbers, $S \times A \times S \to \mathbb{R}$, by means of the costs that it receives $R(s_{k+1}=j \mid s_k=i, \alpha_k)$. Similarly, another mapping from the Cartesian product of the state space and action space to the closed set [0,1] is executed, $S \times A \times S \to [0, 1]$, that provides the realization of the engine operating point transitions $p(s_{k+1}=j \mid s_k=i, \alpha_k)$. The implementation of these two mappings aims POSCA to compute the optimal control policy $\bar{\pi}$ of the self-learning controller $$\bar{\pi}(s_k) = \operatorname*{argmin}_{\overline{\mu}_k(s_k) \in A(s_k)} \left\{ \max_{s_{k+1} \in S} [R_{PRN}^i(\tilde{s}_{k+1}^{ij}, \mu(s_k))] \right\}, \qquad (4.40)$$

where $$R_{PRN}^i(\tilde{s}_{k+1}^{ij}, \mu(s_k)) = \left\{ \begin{array}{l} p(s_{k+1}=j \mid s_k=i, \mu(s_k)) \cdot \\ R(s_{k+1}=j \mid s_k=i, \mu(s_k)) + + \\ \overline{R}_j(\tilde{s}_{k+2}^{jm} \mid \mu(s_{k+1})) \end{array} \right\}, \qquad (4.41)$$

where $$\overline{R}_j(\tilde{s}_{k+2}^{jm} \mid \mu(s_{k+1})) := := \min_{\mu(s_{k+1}) \in A} \sum_{j=1}^{N} p(s_{k+2}=m \mid s_{k+1}=j, \mu(s_{k+1})) \cdot \qquad (4.42)$$

$$R(s_{k+2}=m \mid s_{k+1}=j, \mu(s_{k+1})),$$

$$\forall \tilde{s}_{k+2}^{jm} \in \tilde{S}, \forall i, j \in S, \forall \mu(s_k), \text{ and } N=|S|.$$

4.3 Application: Self-Learning Spark Ignition in a Gasoline Engine

An example of real-time, self-learning optimization of the calibration with respect to spark ignition timing in a spark ignition engine is presented in this section. In spark ignition engines the fuel and air mixture is prepared in advance before it is ignited by the spark discharge. The major objectives for the spark ignition are to initiate a stable combustion and to ignite the air-fuel mixture at the crank angle resulting in maximum efficiency, while fulfilling emissions standards and preventing the engine from knocking. Simultaneous achievement of the aforementioned objectives is sometimes inconsistent; for instance, at high engine loads the ignition timing for maximum efficiency has to be abandoned in favor of prevention of engine destruction by way of engine knock. Two essential parameters are controlled with the spark ignition: ignition energy and ignition timing. Control of ignition energy is important for assuring combustion initiation, but the focus here is on the spark timing that maximizes engine efficiency. Ignition timing influences nearly all engine outputs and is essential for efficiency, drivability, and emissions. The optimum spark ignition timing generating the maximum engine brake torque is defined as Maximum Brake Torque (MBT) timing [11]. Any ignition timing that deviates from MBT lowers the engine's output torque as illustrated in FIG. 4.2. A useful parameter for evaluating fuel consumption of an engine is the Brake-Specific Fuel Consumption (BSFC), defined as the fuel flow rate per unit power output. This parameter evaluates how efficiently an engine is utilizing the fuel supplied to produce work $$bsfc (g/kW \cdot h) = \frac{\dot{m}_f \, (g/h)}{P \, (kW)}, \qquad (4.43)$$

where $\dot{m}_f$ is the fuel mass flow rate per unit time and P is engine's power output. Continuous engine operation at MBT ensures optimum fuel economy with respect to the spark ignition timing.

For a successful engine calibration with respect to spark ignition timing, the engine should realize the MBT timing for each engine operating point (steady-state and transient) dictated by the driving style of a driver. Consequently, by achieving MBT timing for all steady-state and transient operating points an overall improvement of the BSFC is expected. Aspects of preventing knocking are not considered in this example; however, they can be easily incorporated by defining the spark ignition space to include the maximum allowable values.

The software package enDYNA is employed for the implementation or real-time, self-learning optimization of engine calibration. The software utilizes thermodynamic models of the gas path and is well suited for testing and development of Electronic Control Units (ECUs). In the example, a four-cylinder gasoline engine is used from the enDYNA model database. The software's static correlation involving spark ignition timing and engine operating points is bypassed to incorporate the self-learning controller. This correlation is designated by the baseline calibration that enDYNA model is accompanied by, and is included in, the engine's ECU.

The control actions, $a_k$, correspond to the spark ignition timing that can take values from the feasible set A, defined as $$A=A(s_k=i)=[5°, 35°], \qquad (4.44)$$

where i=1,2, ..., N, N=|S|.

The engine model is run repeatedly over the same driving style represented by the pedal position. Every run over this driving style constitutes one complete simulation. To evaluate the efficiency of our approach in both steady-state and transient engine operation, the pedal position rate is chosen to represent an aggressive acceleration, as illustrated in FIG. 4.3.

4.3.1 Simulation Results

After completing the learning process, the self-learning controller specified the optimal policy in terms of the spark ignition timing, as shown in FIG. 4.4, and compared with the spark ignition timing designated by the baseline calibration of the enDYNA model. The optimal policy resulted in higher engine brake torque compared to the baseline calibration as shown in FIG. 4.5 and FIG. 4.6. This improvement indicates that the engine with self-learning calibration was able to operate closer to MBT timing. Having the engine operate at MBT timing resulted in an overall minimization of the BSFC, illustrated in FIG. 4.7. FIG. 4.8 compares the velocity of the two vehicles, one carrying the engine with the baseline calibration and the other with the self-calibrated one.

The two vehicles were simulated for the same driving style, namely, the same pedal-position rate. The vehicle carrying the engine with the self-learning calibration demonstrated higher velocity, since the engine produced higher brake torque for the same gas-pedal position rate. Consequently, if the driver wishes to follow a specific vehicle's speed profile, this can now be achieved by stepping on the gas-pedal more lightly than required in the engine with the baseline calibration and, therefore, directly enabling in additional benefits in fuel economy.

To evaluate the efficiency of the algorithm in learning, the vehicles were simulated for three additional acceleration profiles, shown in FIG. 4.9. The algorithm specified successfully the optimal policy in terms of the spark ignition timing minimizing the BSFC compared to the baseline calibration, as illustrated in FIGS. 4.10-4.12.

4.4 Application: Self-Learning Injection Timing in a Diesel Engine

The objective of this study is to evaluate the efficiency of the self-learning controller in deriving the optimal control policy (injection timing) during transient engine operation. A desired speed profile, shown in FIG. 4.13, including an acceleration and deceleration segment designated by a hypothetical driver, was selected. The model with the baseline ECU and the model with the self-learning controller are run repeatedly over the same profile. The first model incorporates a static calibration map for injection timing corresponding to steady-state operating points. Before initiating the first simulation, the model with the self-learning controller has no knowledge regarding the particular transient engine operation and injection timing associated with it.

The control actions, $a_k$, correspond to the injection timing that can take values from the feasible set A, defined as $$A = A(s_k = i) = [-2°, 18°], \quad (4.45)$$

where $i = 1, 2, \ldots, N$, $N = |S|$.

4.4.1 Simulation Results

After completing the exploration phase, the self-learning controller derived the values of injection timing, shown in FIG. 4.14. The significant variation of injection timing is attributed to the engine behavior during the transient period before steady-state operation occurs. During this period, the maximum brake torque (MBT), and thus, brake-specific fuel consumption and emissions, are varied for the same engine operating point [12]. These values, corresponding to a particular operating point, highly depend on the previous operating points from which they have been arrived. Consequently, start of injection at steady-state operating points is not optimal for the same points when transiting one from another.

The injection timing computed by the self-learning controller maximized engine torque during transient operation, and the desired speed profile was achieved requiring lower pedal position rates for the same engine speed as illustrated in FIG. 4.15 and FIG. 4.16. The implication is that injection timing altered the brake mean effective pressure (BMEP) for this range of engine speed, and engine operation was modified as shown in FIG. 4.17. Lower pedal position rates required less injected fuel mass into the cylinders since injection duration was reduced (FIG. 4.18), resulting in minimization of fuel consumption as illustrated in FIG. 4.19.

While the fuel mass injected into the cylinders is reduced, the mass air flow was kept almost constant (FIG. 4.20) providing excess of air. These conditions degraded the formation of HC, CO and PM as illustrated in FIGS. 4.21-4.23. The injection timing of the baseline ECU provided higher emission temperatures in the exhaust manifold, shown in FIG. 4.24, and consequently, $NO_x$ formation was progressed much faster as depicted in FIG. 4.25.

Table 1 summarizes the quantitative assessment of the improvement of fuel consumption, and emissions, by employing the self-learning controller in ECU development.

TABLE 1

Quantification assessment of benefits in fuel consumption and emissions compared to baseline ECU.

| Engine Performance Indices | Improvement [%] |
|---|---|
| Fuel consumption | 8.4 |
| $NO_x$ | 7.7 |
| HC | 32.9 |
| CO | 5.0 |
| PM | 9.8 |

4.5 Concluding Remarks

This chapter has presented the algorithmic implementation that provides the decision-making mechanism suitable for real-time implementation. The algorithm solves the stochastic control sub-problem by utilizing accumulated data acquired over the learning process of the POD model. The solution of the algorithm exhibits performance bound that is superior compared to the solution provided by the minimax control policy of the dynamic programming algorithm (Theorem 4.1).

The overall performance of the POD model and POSCA in deriving an optimal control policy was evaluated through application to several examples. In the cart-pole balancing problem, POD and POSCA realized the balancing control policy for an inverted pendulum when the pendulum was released from any angle between 3° and −3°. In implementing the real-time cruise controller, POD and POSCA maintained the desired vehicle's speed at any road grade between 0° and 10°. The engine calibration problem demonstrated that the POD model and POSCA can make the engine of a vehicle an autonomous intelligent system. The engine can learn by means of a self-learning controller the optimal values of the controllable variables in real time while the driver drives the vehicle. The longer the engine runs during a particular driving style, the better the engine's specified performance indices will be. This property arises due to the learning process required by the state representation to capture the stationary distribution of the engine operation with respect to the driver's driving style. The engine's ability to learn its optimum calibration is not limited, however, to a particular driving style. The engine can learn to operate optimally for different drivers by assigning the transition probability $P(\bullet, \bullet)$, and cost matrices $R(\bullet, \bullet)$ for each driver. The drivers should indicate their identities before starting the vehicle to denote the pair of these matrices that the engine should employ. The engine can then adjust its operation to be optimal for a particular driver based on what it has learned in the past regarding his/her driving style.

CHAPTER 5

Decentralized Learning

The following references are referenced in this Chapter:
[1] Wheeler, R. and Narenda, K., "Decentralized Learning in Finite Markov Chains," IEEE Transactions on Automatic Control, vol. 31(6), pp. 373-376, 1986.
[2] Tsypkin, Y. Z., Adaptation and Learning in Automatic Systems. New York, Academic Press, 1971.
[3] Moore, A. W. and Atkinson, C. G., "Prioritized Sweeping: Reinforcement Learning with Less Data and Less Time," Machine Learning, vol. 13, pp. 103-30, 1993.
[4] Bush, R. R. and Mosteler, F., Stochastic Models for Learning. New York, John Wiley, 1958.
[5] Narendra, K. S. and Wheeler, R. M., Jr., "N-Player Sequential Stochastic Game with Identical Payoffs," IEEE Transactions on Systems, Man and Cybernetics, vol. SMC-13, pp. 1154-1158, 1983.
[6] Srikantakumar, P. R. and Narendra, K. S., "A Learning Model for Routing in Telephone Networks," SIAM Journal on Control and Optimization, vol. 20, pp. 34-57, 1982.
[7] Zheng, Y., Luo, S., Lv, Z., and Wu, L., "Control Parallel Double Inverted Pendulum by Hierarchical Reinforcement Learning," Proceedings of the 2004 $7^{th}$ International Conference on Signal Processing Proceedings (IEEE Cat. No. 04TH8739), pp. 1614-17, Beijing, China, 2004.
[8] Szer, D. and Charpillet, F., "Improving Coordination with Communication in Multi-Agent Reinforcement Learning," Proceedings of the $16^{th}$ IEEE International Conference on Tools with Artificial Intelligence, ICTAI 2004, pp. 436-440, Boca Raton, Fla., United States, 2004.
[9] Scherrer, B. and Charpillet, F., "Cooperative Co-Learning: a Model-Based Approach for Solving Multi-Agent Reinforcement Problems," Proceedings of the $14^{th}$ IEEE International Conference on Tools with Artificial Intelligence, pp. 463-8, Washington, D.C., USA, 2002.
[10] Beynier, A. and Mouaddib, A.-I., "An Iterative Algorithm for Solving Constrained Decentralized Markov Decision Processes," Proceedings of the $21^{st}$ National Conference on Artificial Intelligence and the $18^{th}$ Innovative Applications of Artificial Intelligence Conference, AAAI-06/IAAI-06, pp. 1089-1094, Boston, Mass., United States, 2006.
[11] Yagan, D. and Chen-Khong, T., "Coordinated Reinforcement Learning for Decentralized Optimal Control," Proceedings of the 2007 First IEEE International Symposium on Approximate Dynamic Programming and Reinforcement Learning (IEEE Cat. No. 07EX1572), pp. 7 pp., Honolulu, Hi., USA, 2007.
[12] Shen, D., Chen, G., Cruz, J. B., Jr., Kwan, C., and Kruger, M., "An Adaptive Markov Game Model for Threat Intent Inference," Proceedings of the IEEE Aerospace Conference, pp. 4161613, Big Sky, Mont., United States, 2007.
[13] Myerson, R. B., Game Theory: Analysis of Conflict, Harvard University Press, Sep. 15, 1997.
[14] Osborne, M. J. and Rubinstein, A., A Course in Game Theory, The MIT Press, Jul. 12, 1994.
[15] Fudenberg, D. and Tirole, J., Game Theory, The MIT Press, Aug. 29, 1991.
[16] Neumann, J. v., Morgenstern, O., Rubinstein, A., and Kuhn, H. W., Theory of Games and Economic Behavior, Princeton University Press, March 2007.
[17] Nash, J. F., "Equilibrium Points in N-Person Games," Proceedings of the National Academy of Sciences, 18, 1950.
[18] Khamsi, M. A. and Kirk, W. A., An Introduction to Metric Spaces and Fixed Point Theory, 1st edition, Wiley-Interscience, Mar. 6, 2001.
[19] Malikopoulos, A. A., Assanis, D. N., and Papalambros, P. Y., "Real-Time, Self-Learning Optimization of Diesel Engine Calibration," Proceedings of the 2007 Fall Technical Conference of the ASME Internal Combustion Engine Division, Charleston, S.C., Oct. 14-17, 2007.
[20] Heywood, J., Internal Combustion Engine Fundamentals, 1 edition, McGraw-Hill Science/Engineering/Math, April 1988.
[21] TESIS, <http://www.tesis.de/en/>.

This chapter proposes a decentralized learning control scheme in finite Markov chains that aims to address the problem of dimensionality, when more than one decision makers are engaged. This scheme draws from multi-agent learning research in a range of areas including reinforcement learning, and game theory to coordinate optimal behavior among the decision makers. The solution of the decentralized scheme attempts to provide a Nash equilibrium coordinated control policy.

In applying this scheme to the engine calibration problem, the engine is treated as a cooperative multi-agent system, in which the subsystems, i.e., controllable variables, are considered autonomous intelligent agents who strive interactively and jointly to optimize engine performance criteria.

5.1 Decentralized Learning in Finite Markov Chains

Decentralized decision making requiring limited information is a highly desirable feature of large complex systems. It is necessary when complete information among decision makers, which is required in centralized decision making, is impractical due to the increase of the problem's dimensionality. Moreover, decentralized decision making can often be useful in complex systems with uncertainties regarding their behavior and the nature of external events [1]. Even in the absence of such uncertainties the coordination of decentralized decision makers is still a formidable problem; local optimality and global optimality are often inconsistent. Uncertainty adds to the difficulty of an identification problem, the feature that motivates the use of a learning approach. Mathematical learning theory has been developed in systems to address the modeling and control aspects of sequential decision making under uncertainty [2-4]. Learning automata have been applied to network routing in which decentralization is attractive and large uncertainties are present [5, 6]. The resulting system performance has demonstrated that decentralized learning schemes can be successful while the problem's dimensionality remains tractable.

The problem of decentralized iterative control for a class of large scale interconnected dynamic systems in continuous time domain was studied by Wu [7]. In this off-line approach, it is assumed that the considered systems are linear time varying, and the interconnections between each subsystem are unknown. Szer et al. [8] proposed a model-free distributed reinforcement learning algorithm that utilizes communication to improve learning among the decision makers in a Markov decision process formalism. Scherre et al. [9] developed a general iterative heuristic approach in which at each decision epoch the focus is on a sub-group of decision makers and their policies given the rest of the decision makers have fixed plans. Beynier et al. [10] introduced the notion of expected opportunity cost to better assess the influence of a local decision of an agent on the others. An iterative version of the algorithm was implemented to incrementally improve the policies of agents leading to higher quality solutions in some settings. Yagan et al. [11] implemented a model-free coordinated reinforcement learning for decentralized optimal control assuming that each decision maker can partially observe the state condition. This decentralized scheme is suited for partially observable Markov decision processes. Shen et al. [12] developed a decentralized Markov game model to estimate the belief among the decision makers. In the proposed model, the model-free Qlearning algorithm was employed to adjust dynamically the payoff function of each player.

Although many of these algorithms addressed the decentralized learning problem their use of the accumulated data acquired over the learning process is inefficient, and they require a significant amount of experience to achieve acceptable performance. This requirement arises due to the formation of these algorithms in deriving optimal policies without learning the system models en route; that is, they do not solve the state estimation and system identification problem simultaneously.

The study of interacting decision makers inevitably entails game theory [13-16]. The use of learning schemes by players does not circumvent the basic complexities of N-player games. In general, rational behavior is not well defined even when the payoff structure is known to all players. Wheeler et al. [1] employed a game-theoretic approach and developed a decentralized learning control scheme in finite Markov chains with unknown transition probabilities and costs. In this scheme, the decision makers demonstrate a myopic behavior, namely, they are unaware of the surrounding world. In attempting to improve his/her performance, each decision maker selects a control action, observes the corresponding cost associated with the occupied state, and then updates the action.

The decentralized learning control scheme proposed herein differs from Wheeler's scheme: Here the decision makers do not demonstrate myopic behavior explicitly. On the contrary, a random hierarchy among them is assumed, based on which each one observes the control actions of the other. In particular, POSCA is employed to derive the control actions of the first member in the hierarchy of decision makers with respect to the sequence of state transitions. At the same time, the algorithm is engaged separately to derive the control actions of the second member in the hierarchy of decision makers with respect to the optimal policy as being learned from the first one. Similarly, the algorithm is employed to derive the control actions of the third decision maker with respect to the second one and so forth.

This decentralized learning scheme entails a game-theoretic approach. In particular, the interaction among the controllers is modeled as an identical payoff game. The game involves $\Sigma \in \mathbb{N}$ players (controllers) interacting through a stationary random environment. At each decision epoch k, the environment presents a state $s_k = i \in S$ to the players, and on that basis each player selects a strategy (control action) from his/her feasible set of strategies $A^r(s_k)$, $\{r=1, \ldots, \Sigma\}$. The players seek a Nash equilibrium strategy that exists under certain conditions.

5.2 Game Theory

Game theory is defined as the study of mathematical models of conflict and cooperation between intelligent rational decision makers. Game theory provides the mathematical framework for analyzing situations in which two or more individuals make decisions that will influence one another's welfare. A game refers to any situation involving two or more decision makers who are called players.

There is a main assumption that game theorists generally make about the players: they are rational and intelligent. A decision maker is rational if he makes decisions consistently in pursuit of his own objectives. In game theory, building on the fundamental results of decision theory, it is assumed that each player's objective is to maximize the expected value of his/her own payoff, which is measured in some utility scale.

Formally, a game $\Gamma$ in the strategic form is represented by $$\Gamma := (\Sigma, (A^r)_{r \in \Sigma}, (R^r)_{r \in \Sigma}), \tag{5.1}$$

where $\Sigma$ is the set of players, $A^r$ is the set of feasible strategies for each player r, and $R^r$ is the payoff function of each player that implements a mapping from the Cartesian product of the state space S (stationary environment) and the set of feasible strategies of each player $A^r$ to the set of real numbers, $R^r$: $S \times A^1 \times \ldots \times A^\Sigma \to \mathbb{R}$.

5.3 The Decentralized Learning Control Scheme in POD Domain

In the proposed decentralized learning scheme, the interaction among the controllers is modeled as an identical payoff game. First, a random hierarchy among the controllers is assumed, based on which each one observes the control actions (strategies) of the other. More precisely, the first member in the hierarchy of the decision makers observes the sequence of state transitions. At the same time, the second member in the hierarchy of the decision makers observes the control actions as being learned from the first one and so forth. The game between the first controller and the environment is defined $$\Gamma_1 = ((S, a^1), A^1(i), R^r(i, a^1, a^2, \ldots, a^\Sigma)), \forall i \in S, \tag{5.2}$$

where S is the state space, $a^1$ is the action of the first controller, $A^1(i)$ is the feasible set of strategies (control actions), and $R^r(i, a^1, a^2, \ldots, a^\Sigma)$ is the common payoff that all controllers receive when they select control actions at a particular state $i \in S$. The second game between the second controller in the hierarchy and the first one is defined as $$\Gamma_2 = ((a^1, a^2), A^2(a^1), R^r(i, a^1, a^2, \ldots, a^\Sigma)), \forall i \in S, \tag{5.3}$$

where $a^2$ denotes the action of the second controller, and $A^2(a^1)$ is its feasible set of control actions with respect to the control actions of the first controller $a^1$. Similarly, the game between the last two in the hierarchy of controllers is defined as $$\Gamma_\Sigma = ((a^{\Sigma-1}, a^\Sigma), A^\Sigma(a^{\Sigma-1}), R^r(i, a^1, a^2, \ldots, a^\Sigma)), \forall i \in S. \tag{5.4}$$

These games are played simultaneously at each decision epoch k, while the chain $\{s_k, k \geq 0\}$ visits a state $s_k = i \in S$. The POD state representation is employed to provide the realization of the state transitions that occurred in the Markov domain. The different sequences of the state transitions are captured by the POD states and evaluated through the expected evaluation functions that correspond to the common payoff $R^r(i, a^1, a^2, \ldots, a^\Sigma)$. POSCA selects the lookahead policy that determines the control actions at each decision epoch.

Definition 5.1 ("Nash Equilibrium") [14]. In a strategic game, an action a* is called Nash equilibrium if no player r has an action yielding an outcome that he/she prefers to that generated when he/she chooses $a^{*r}$, given that every other player $l \in \Sigma$ chooses his/her equilibrium actions $a^{*l}$. Briefly, no player can profitably deviate, given the actions of the other players.

The decentralized learning control scheme seeks to reach a Nash equilibrium strategy $(a^{*1}, a^{*2}, \ldots, a^{*\Sigma})$ for all players that is guaranteed the maximum common payoff $R^r(i, a^1, a^2, \ldots, a^\Sigma)$.

Definition 5.2. For each controller r, the function $F^r$ is defined as $$F^r = \max\{0, R^r(i, a^1, a^2, \ldots, a^r, \ldots, a^\Sigma) - R^{*r}(i, a^{*1}, a^{*2}, \ldots, a^{*r}, \ldots, a^{*\Sigma})\}, \forall i \in S, \quad (5.5)$$

where $a^r \in A(a^{r-1})$ is the action of the controller r from the feasible set of actions, and $R^{*r}$ is the maximum common payoff at the current decision epoch when all controllers believe that their Nash equilibrium control actions is $(a^{*1}, a^{*2}, \ldots, a^{*r}, \ldots, a^{*\Sigma})$.

Definition 5.3. For each controller r, the function $R'_r$ is defined as the mapping $R'_r: \mathbb{R} \to \mathbb{R}$, namely, $$R'_r = \frac{R^{*r}(i, a^{*1}, a^{*2}, \ldots, a^{*r}, \ldots, a^{*\Sigma}) + F^r \cdot R^r(i, a^1, a^2, \ldots, a^r, \ldots, a^\Sigma)}{1 + F^r}, \forall i \in S. \quad (5.6)$$

The decentralized learning scheme seeks the control actions that provide the fixed point of the mapping $R'_r: \mathbb{R} \to \mathbb{R}$.

Suppose that during the learning process the belief of the controllers for the Nash equilibrium control actions is $(a^{*1}, a^{*2}, \ldots, a^{*r}, \ldots, a^{*\Sigma})$, which results in a common payoff equal to $R^{*r}(i, a^{*1}, a^{*2}, \ldots, a^{*r}, \ldots, a^{*\Sigma})$. Suppose that at the next decision epoch, they switch to any $\Sigma$-tuple $(a^1, a^2, \ldots, a^r, \ldots, a^\Sigma)$ with a payoff $R^r(i, a^1, a^2, \ldots, a^r, \ldots, a^\Sigma)$. If this payoff is less than $R^{*r}(i, a^{*1}, a^{*2}, \ldots, a^{*r}, \ldots, a^{*\Sigma})$, then the function $F^r$ in Eq. (5.5) becomes zero. This means that no controller can improve the payoff by changing its control action, and thus the Nash equilibrium control actions $(a^{*1}, a^{*2}, \ldots, a^{*r}, \ldots, a^{*\Sigma})$ vanishes all functions $F^r$ for each controller, and makes $(a^{*1}, a^{*2}, \ldots, a^{*r}, \ldots, a^{*\Sigma})$ fixed under the mapping $R'_r: \mathbb{R} \to \mathbb{R}$. On the other hand, if the $\Sigma$-tuple $(a^1, a^2, \ldots, a^r, \ldots, a^\Sigma)$ yields a payoff higher than $R^{*r}(i, a^{*1}, a^{*2}, \ldots, a^{*r}, \ldots, a^{*\Sigma})$, then the controller change their belief and make this tuple to be the Nash equilibrium control actions for that decision epoch and on.

5.3.1 Existence of a Nash Equilibrium

The conditions under which a Nash equilibrium of a game exists have been extensively reported in the literature. An existence result has two purposes. First, if a game satisfies the hypothesis of the result, then it is known that our effort to find an equilibrium will meet with success. Second, the existence of an equilibrium shows that the game is consistent with a steady state solution. Nash [17] proved that every finite game that has at least on equilibrium strategy.

Kakutani's Fixed Point Theorem gives conditions on the mapping $R'_r: \mathbb{R} \to \mathbb{R}$ under which there indeed exists a Nash equilibrium.

Theorem 5.1 ("Kakutani's Fixed Point Theorem") [18]. Let X be a compact convex subset of $\mathbb{R}^n$ and let $f: X \to X$ be a set-valued function for which 1. For all $x \in X$ the set $f(x)$ is nonempty and convex,
2. the graph of $f$ is closed.

Then there exists $x^* \in X$ such that $x \in f(x^*)$, or $x^* = f(x^*)$.

Proof. The proof is provided by Khamsi and Kirk [18].

If the mapping $R'_r: \mathbb{R} \to \mathbb{R}$ in Eq. (5.6) satisfies the conditions imposed in Theorem 5.1, then it is guaranteed that a Nash equilibrium control action for the controllers exists.

The decentralized learning scheme is illustrated with a simple example including a state space with two states $S=\{1, 2\}$, and two controllers $a^1$ and $a^2$. Each controller has available two control actions, that is, $a^1=\{a_1^1, a_2^1\}$ and $a^2=\{a_1^2, a_2^2\}$. In the centralized form the game with the corresponding common payoffs is formalized as follows

| | Actions | | | | |
|---|---|---|---|---|---|
| States | $a_1^1, a_1^2$ | $a_1^1, a_2^2$ | $a_2^1, a_1^2$ | $a_2^1, a_2^2$ | |
| 1 | 10 | 8 | 2 | 40 | (5.7) |
| 2 | 9 | 7 | 20 | 3 | |

Obviously, at state 1 the optimal control actions are the pair $a_2^1, a_2^2$, whereas at state 2 the optimal actions are $a_2^1, a_1^2$ that maximize the common payoffs. In the proposed decentralized learning scheme, two games are formed. The first one is between the environment and controller 1,

| | Controller 1 | |
|---|---|---|
| States | $a_1^1$ | $a_2^1$ |
| 1 | ? | ? |
| 2 | ? | ? |

(5.8)

and the second game is between the two controllers.

| | Controller 2 | |
|---|---|---|
| Controller 1 | $a_1^2$ | $a_1^2$ |
| $a_1^1$ | ? | ? |
| $a_2^1$ | ? | ? |

(5.9)

The states appear with an unknown probability distribution that is captured by the POD state representation. The controllers should explore their action space to learn the corresponding payoffs, and eventually, find the control actions resulting in the maximum payoffs.

5.4 Decentralized Learning in Engine Calibration

The decentralized learning method [19] establishes a learning process that enables the derivation of the optimal values of the controllable variables to occur in parallel phases. The algorithm is employed to derive the optimal policy of one controllable variable with respect to the sequence of state transitions imposed by the driver's driving style. Concurrently, the algorithm is also engaged separately to derive the optimal policy of the second controllable variable with respect to the optimal policy being learned for the first one. In case of more than two controllable variables, the algorithm is employed in a similar fashion, namely, the third variable with respect to the second one and so forth.

For instance, in implementing a diesel engine calibration with respect to the injection timing, $\alpha$, and VGT vane position, $\beta$, a feasible set of values, A and B, for each controllable variable is defined. The decentralized learning enables the engine to implement two different mappings in parallel. In the first, injection timing is mapped to the states as a result of the correspondence of the driver's driving style to particular engine operating points, i.e., $S \times A \to \mathbb{R}$. In the second, VGT is mapped to the injection timing, i.e., $A \times B \to \mathbb{R}$. The learning algorithm utilizes these two mappings to derive the optimal policies, $\pi^*_\alpha \in A$, and $\pi^*_\beta \in B$ (optimal values of injection timing and VGT) for the driver's driving style as expressed by the incidence in which particular states or particular sequences of states arise.

The decentralized learning process of the engine transpires at each stage k in conjunction with the injection timing $\alpha_k \in A$ taken for each state $s_k=i \in S$, and VGT vane position $\beta_k \in B$ for each $\alpha_k \in A$. At the early stages, and until full exploration of the feasible sets A and B occurs, the mapping from states to probabilities of selecting a particular value of injection timing $\alpha_k \in A$, and the mapping from $\alpha_k \in A$ to probabilities of selecting VGT $\beta_k \in B$ are constant; namely, the values of each controllable variable are selected randomly with the same probability $$p(\alpha_k \mid s_k = i) = \frac{1}{|A|}, \forall \alpha_k \in A, \forall i \in S, \text{ and} \qquad (5.10)$$

$$p(\beta_k \mid \alpha_k) = \frac{1}{|B|}, \forall \alpha \in A, \forall \beta \in B,$$

$$i = 1, 2, \ldots, N, N = |S|. \qquad (5.11)$$

Exploration of the entire feasible set for each variable is important to evade suboptimal solutions. POSCA is thus used after the exploration phase to realize the optimal policies, $\pi^*_\alpha$, and $\pi^*_\beta$ by means of the expected costs, $V(s_{k+1}|s_k,a_k)$ and $V^*\alpha_{k+1}|(\alpha_k,\beta_k)$, generated by the mappings $S \times A \to \mathbb{R}$, and $A \times B \to \mathbb{R}$, respectively. The expected costs are defined to be $$V(s_{k+1} = j \mid s_k = i, a_k) = \qquad (5.12)$$
$$p(s_{k+1} = j \mid s_k = i, a_k) \cdot R(s_{k+1} = j \mid s_k = i, a_k) + +$$
$$\min_{a_{k+1} \in A} \left[ \sum_{l=1}^{N} p(s_{k+2} = l \mid s_{k+1} = j, a_{k+1}) \cdot R(s_{k+1} = l \mid s_k = j, a_{k+1}) \right], \text{ and}$$

$$V(\alpha_{k+1} = m \mid \alpha_k = n, \beta_k) = \qquad (5.13)$$
$$p(\alpha_{k+1} = m \mid \alpha_k = n, \beta_k) \cdot R(\alpha_{k+1} = m \mid \alpha_k = n, \beta_k) + +$$
$$\max_{\beta_{k+1} \in B} \left[ \sum_{p=1}^{\Lambda} p(\alpha_{k+2} = p \mid \alpha_{k+1} = m, \beta_{k+1}) \cdot R(\alpha_{k+2} = p \mid \alpha_{k+1} = m, \beta_{k+1}) \right],$$

$$i, j = 1, 2, \ldots, N, N = |S|, \text{ and}$$
$$m, n = 1, 2, \ldots, \Lambda, \Lambda = |A|.$$

In deriving the optimal policies of the injection timing and VGT in self-learning calibration, which is treated in a stochastic framework, all uncertain quantities are described by probability distributions. The optimal policies, $\pi^*_\alpha$, and $\pi^*_\beta$ are based on the minimax control approach, whereby the worst possible values of the uncertain quantities within the given set are assumed to occur. This is a pessimistic point of view that essentially assures the optimal policies will result in at least a minimum overall cost value. Consequently, at state $s_k=i$, the algorithm predicts the optimal policy $\pi^*_\alpha$ in terms of the values of injection timing $\alpha$ as $$\pi^*_\alpha(s_k) = \operatorname*{argmin}_{\pi_k(s_k) \in A(s_k)} \max_{p_{k+1} \in S} [V(s_{k+1} = j \mid s_k = i, a_k)], \qquad (5.14)$$

$$\forall i, j \in S.$$

For this optimal policy $\pi^*_\alpha$ the algorithm predicts the optimal policy $\pi^*_\beta$ in terms of the values of the VGT vane position $\beta$ as $$\pi^*_\beta(\alpha_k) = \operatorname*{argmin}_{\beta_k(\alpha_k) \in B(\alpha_k)} \max_{p_{k+1} \in A} [V(a_{k+1} = m \mid a_k = n, \beta_k)], \qquad (5.15)$$

$$\forall m, n \in A.$$

Employing decentralized learning, the derivation of the optimal values of more than one controllable variable can be achieved while the problem's dimensionality remains tractable.

5.5 Application: Decentralized Learning in a Diesel Engine

The decentralized learning introduced in the previous section is now applied to a four-cylinder, 1.9-liter turbocharged diesel engine. The objective is to find the optimal injection timing and VGT vane position, while the engine is running the vehicle, that maximize the engine brake torque. Injection timing is an important controllable variable in the combustion process, and affects performance and emissions [20]. The major objective of injection timing is to initiate the start of the fuel injection at the crank angle resulting in the maximum brake torque (MBT). It designates the ignition delay defined to be the crank angle between the start of injection (SOI) and the start of combustion (SOC). The VGT technology was originally considered to increase engine brake torque at tip-ins and reduce turbo-lag. VGT has a system of movable guide vanes located on the turbine stator. By adjusting the guide vanes, the exhaust gas energy to the turbocharger can be regulated, and thus the compressor mass airflow and exhaust manifold pressure can be controlled.

The software package enDYNA Themos CRTD by TESIS [21] suitable for realtime simulation of diesel engines is employed. In the example, the existing static correlation involving injection timing and VGT is bypassed to incorporate the learning method and is used as a baseline comparison. The engine models with the baseline and self-learning calibration are run repeatedly over the same driving style represented by a segment of the FTP-75 driving cycle, illustrated in FIG. 5.1. Every run over this driving style constitutes one complete simulation. Before initiating the first simulation of the engine model, the elements of the transition probability and cost matrix are assigned to be zero. That is, the engine at the beginning has no knowledge regarding the particular driving style and the values of the costs associated with the controllable variables (injection timing and VGT).

5.5.1 Simulation Results

Applying the decentralized learning method, the vehicle with the self-learning calibration was able to follow the segment of the driving cycle requiring lower gas pedal position rates for the same engine speed, as illustrated in FIGS. 5.2-5.4. The implication is that the derived policy of injection timing and VGT resulted in higher engine torque compared to the baseline calibration. The injection timing (before top dead center BTDC) for both vehicles is illustrated in FIGS. 5.5 and 5.6. While the baseline calibration interpolates values of the injection timing of steady-state operating points, the injection timing derived by the learning algorithm corresponded to the engine operating point transitions imposed by the driver's driving style, and thus, self-learning calibration was able to capture transient engine operation. Lower gas pedal position rates resulted in reducing the fuel mass injection duration, shown in FIG. 5.7, and consequently, less fuel mass was injected into the cylinders, as illustrated in FIG. 5.8 (in zoom-in for clarity). In the decentralized learning of the engine, the injection timing was mapped to the engine operating points (states) while the VGT vane position was mapped to the optimal injection timing. The derived VGT policy is illustrated in FIG. 5.9—5.10.

Having the engine operate at the maximum brake torque, a 9.3% overall improvement of fuel economy was accomplished, as illustrated in FIG. 5.11, compared to the baseline calibration. FIGS. 5.12 and 5.13 show a decrease in the temperature and NOx concentration of the exhaust gas; this is due to the earlier injection determined for the engine operating transitions of the particular driver's driving style. Table 2 summarizes the quantitative assessment of the improvement of fuel economy, and $NO_x$, by employing the self-learning controller in ECU development.

TABLE 2

Quantification assessment of benefits with self-learning controller compared to baseline ECU.

| Engine Performance Indices | Improvement [%] |
|---|---|
| Fuel consumption | 9.1 |
| $NO_x$ | 8.6 |

5.6 Concluding Remarks

This chapter has proposed a decentralized learning scheme suitable for finite Markov chains. In this scheme, the decision makers do not demonstrate myopic behavior explicitly. Instead, a random hierarchy among them is assumed, based on which each one observes the control actions of the other while attempting to select a Nash equilibrium coordinated control policy. Decentralization is a common and often necessary aspect of large sequential decision-making problems. It is necessary when complete information among decision makers is impractical due to the increase of the problem's dimensionality.

In applying the proposed decentralized scheme to the engine calibration problem, a learning process was established that enables the derivation of the values of the controllable variables to occur in parallel phases. The values for more than one controllable variable can thus be determined while keeping the problem's dimensionality tractable. The example presented an application of this scheme in real-time, self-learning calibration of a diesel engine with respect to injection timing and VGT vane position. The engine was able to realize the optimal values of injection timing and VGT for a driving style represented by a segment of the FTP-75 driving cycle, thus, optimizing fuel economy.

The proposed method, in conjunction with the POD model and POSCA, can guarantee optimal calibration for steady-state and transient engine operating points resulting from the driver's driving style. This capability can be valuable in engines utilized in hybrid-electric powertrain configurations when real-time optimization of the power management is considered.

CHAPTER 6

Conclusions 6.1 Summary

Theory and algorithms toward making the engine of a vehicle an autonomous intelligent system that can learn the optimal values of various controllable variables in real time while the driver drives the vehicle are disclosed herein. Through this approach, engine calibration is optimized with respect to both steady-state and transient operation designated by the driver's driving style. Consequently, every driver can realize optimal fuel economy and pollutant emissions as fully as possible.

The engine was treated as a controlled stochastic system, and engine calibration was formulated as a sequential decision-making problem under uncertainty. This problem involved two major sub-problems: (a) the state estimation and system identification problem, and (b) the stochastic control problem. In Chapter 2, the underlying theory for building computational models suitable for sequential decision-making under uncertainty was reviewed. These models constitute an essential framework for making intelligent systems able to learn the control actions that optimize their long-term performance. In Chapter 3, a real-time computational learning model was implemented suitable for solution of the state estimation and system identification sub-problem. A state-space representation was constructed through a learning mechanism that can be employed simultaneously with a lookahead control algorithm in solving the stochastic control problem. The model allows decision making based on gradually enhanced knowledge of system response as it transitions from one state to another, in conjunction with control actions taken at each state.

To enable the engine to select the optimal values of various controllable variables in real time, a lookahead control algorithm was developed in Chapter 4. The algorithm solves the stochastic control sub-problem by utilizing accumulated data acquired over the learning process of the state-space representation. The combination of the state-space representation and control algorithm make the engine progressively perceive the driver's driving style and eventually learn its optimal calibration for this driving style. The longer the engine runs during a particular driving style, the better the engine's specified performance indices will be. This property arises due to the learning process required by the state representation to capture the stationary distribution of the engine operation with respect to the driver's driving style. The engine can learn its optimal calibration for any other driver who indicates his or her identity before starting the vehicle by assigning the transition probability P(•,•), and cost (or reward) matrices R(•,•) for each driver.

The enhancement of the problem's dimensionality, when more than one controllable variable is considered, was addressed by the development of a decentralized learning control scheme, presented in Chapter 5. This scheme draws from multi-agent learning research in a range of areas, including reinforcement learning, and game theory, to coordinate optimal behavior among the various controllable variables. The engine was modeled as a cooperative multi-agent system, in which the subsystems, i.e., controllable variables, were treated as autonomous intelligent agents who strive interactively and jointly to optimize engine performance criteria. In summary, the invention disclosed herein has taken steps toward development engine calibration that can capture transient engine operation designated by the driver's driving style. Each individual driving style is different and rarely meets those driving conditions of testing for which the engine is calibrated to operate optimally by means of the state-of-the-art calibration methods. The implementation of the proposed approach in a vehicle is expected to significantly reduce the discrepancy between the gas mileage estimate displayed on the window sticker or featured in advertisements and the actual gas mileage of the vehicle.

6.2 Summary of Contributions

Three distinct steps were taken toward making the engine an autonomous intelligent system:

1. A computational model suitable for real-time sequential decision-making under uncertainty was implemented. A state-space representation was constructed through a learning mechanism and utilized in solving the state estimation and system identification sub-problem. The model accumulates gradually enhanced knowledge of system response as it transitions from one state to another, in conjunction with actions taken at each state. As the system interacts with its environment, the state representation realizes the sequences of state transitions that occurred in the Markov domain. This realization converges to the stationary distribution of the Markov chain (Theorem 3.3).

2. A lookahead control algorithm was developed that addresses the stochastic control sub-problem in real time by utilizing accumulated data acquired over the learning process of the state-space representation. The principle of the algorithm is founded on the theory of stochastic control problems with unknown disturbance distribution, also known as games against nature. The solution of the algorithm exhibits performance bounds that are better than the solution of any minimax control policy provided by dynamic programming (Theorem 4.1).

3. A decentralized learning control scheme was proposed to coordinate optimal behavior among various decision makers for mutual benefit. The solution of the decentralized scheme provides a Nash equilibrium coordinated control policy.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A powertrain system controller comprising:
a processor; and
a storage device having processor-readable code embodied thereon for programming the processor to perform a method comprising:
generating a sequence of system operating point transitions based on an operating style of an operator of a drivable passenger vehicle while the system is powering the vehicle and while the operator is driving the vehicle, wherein the operating style is defined by at least one of an accelerator pedal position and a brake torque timing;
learning a set of predictive optimum values of controllable system variables in real-time during the step of generating based on the sequence of system operating point transitions and predetermined engine performance criteria for the system; and
generating control signals based on the set of optimum values to control operation of the system.

2. The controller as claimed in claim 1, wherein the step of learning includes the step of learning first and second controllable system variables of the set in parallel phases.

3. The controller as claimed in claim 1, wherein the storage device contains a processor-readable base set of system operating points and corresponding values of the controllable system variables wherein the step of learning is also based on the base set.

4. The controller as claimed in claim 1, wherein the step of learning is at least partially performed utilizing a decentralized learning control algorithm.

5. The controller as claimed in claim 1, wherein the step of learning is at least partially performed utilizing a predictive optimal stochastic control algorithm.

6. The controller as claimed in claim 1, wherein the system includes an internal combustion engine and wherein the vehicle is one of a land traversing vehicle, watercraft and aircraft.

7. The controller as claimed in claim 1, wherein the step of learning is at least partially performed utilizing a lookahead algorithm.

* * * * *